(12) United States Patent
Clarens et al.

(10) Patent No.: US 12,209,053 B2
(45) Date of Patent: Jan. 28, 2025

(54) CEMENTITIOUS MATERIALS AND METHODS OF MAKING AND USING THEREOF

(71) Applicant: UNIVERSITY OF VIRGINIA PATENT FOUNDATION, Charlottesville, VA (US)

(72) Inventors: Andres F. Clarens, Charlottesville, VA (US); Dan A. Plattenberger, Waxhaw, NC (US)

(73) Assignee: University of Virginia Patent Foundation, Charlottesville, VA (US)

( * ) Notice: Subject to any disclaimer, the term of this patent is extended or adjusted under 35 U.S.C. 154(b) by 649 days.

(21) Appl. No.: 17/294,309

(22) PCT Filed: Nov. 15, 2019

(86) PCT No.: PCT/US2019/061809
§ 371 (c)(1),
(2) Date: May 14, 2021

(87) PCT Pub. No.: WO2020/102724
PCT Pub. Date: May 22, 2020

(65) Prior Publication Data
US 2022/0002203 A1   Jan. 6, 2022

Related U.S. Application Data

(60) Provisional application No. 62/767,586, filed on Nov. 15, 2018.

(51) Int. Cl.
C04B 28/18 (2006.01)
C04B 22/06 (2006.01)
C04B 40/02 (2006.01)

(52) U.S. Cl.
CPC .......... C04B 28/188 (2013.01); C04B 22/062 (2013.01); C04B 40/0231 (2013.01)

(58) Field of Classification Search
CPC . C04B 28/188; C04B 22/062; C04B 40/0231; Y02P 40/18; Y02W 30/91
See application file for complete search history.

(56) References Cited

U.S. PATENT DOCUMENTS

| 5,518,540 A | 5/1996 | Jones |
| 9,216,926 B2 | 12/2015 | Riman et al. |
| 9,926,235 B2 | 3/2018 | Sahu et al. |
| 10,173,927 B2 | 1/2019 | Atakan et al. |
| 10,196,311 B2 | 2/2019 | Quinn et al. |
| 2017/0260096 A1 | 9/2017 | Sahu et al. |

FOREIGN PATENT DOCUMENTS

| WO | 2016/022485 A1 | 2/2016 | |
| WO | WO-2016061251 A1 * | 4/2016 | ........... B28B 11/245 |
| WO | WO-2018136667 A1 * | 7/2018 | ............. C01B 33/26 |

OTHER PUBLICATIONS

International Search Report and Written Opinion for International Application No. PCT/US2019/061809 dated Jan. 31, 2020.
Plattenberger et al., Calcium Silicate Crystal Structure Impacts Reactivity with CO2 and Precipitate Chemistry, Environmental Science & Technology Letters, vol. 5, Aug. 24, 2018, pp. 558-563.
Matsuyama et al., Effects of pH on precipitation of quasi-crystalline calcium silicate hydrate in aqueous solution, Advances in Cement Research, vol. 12, No. 1, Jan. 2000.
Canadian Patent Office. Office Action issued in CA Application No. 3,120,081 on Dec. 21, 2023, 5 pages.
Plattenberger, et al., "Calcium Silicate Crystal Structure Impacts Reactivity with CO2 and Precipitate Chemistry", Environ. Sci. Technol. Lett. 2018, 5, 558-563.
International Search Report and Written Opinion issued by the International Searching Authority (ISA/US) in PCT Application No. PCT/US2019/061809 on Jan. 31, 2020. 10 pages.
Matsuyama, et al., "Effects of pH on Precipitation of Quasi-Crystalline Calcium Silicate Hydrate in Aqueous Solution," Advances in Cement Research, 2020, 12(1): 29-33.

* cited by examiner

*Primary Examiner* — Anthony J Green
(74) *Attorney, Agent, or Firm* — Meunier Carlin & Curfman LLC

(57) ABSTRACT

Disclosed are cementitious materials as well as methods of forming cured cementitious materials. In one aspect, provided are methods of forming a cured cementitious material that comprise (a) contacting a cementitious material comprising a calcium silicate precursor with water and carbon dioxide under conditions effective to form crystalline calcium silicate hydrates within the cementitious material; and (b) allowing the cementitious material to harden to form the cured cementitious material.

21 Claims, 28 Drawing Sheets

CEMENTITIOUS MATERIALS AND METHODS OF MAKING AND USING THEREOF

CROSS-REFERENCE TO RELATED APPLICATIONS

This Application is a national stage application filed under 35 U.S.C. § 371 of PCT/US2019/061809 filed Nov. 15, 2019, which claims benefit of U.S. Provisional Application No. 62/767,586, filed Nov. 15, 2018, which are hereby incorporated herein by reference in their entireties.

BACKGROUND

Concrete is the most consumed man-made material in the world. A typical concrete is made by mixing Portland cement, water and aggregates such as sand and crushed stone. Portland cement is a synthetic material made by burning a mixture of ground limestone and clay, or materials of similar composition in a rotary kiln at a sintering temperature of 1450° C. Portland cement manufacturing is not only an energy-intensive process, but one which releases considerable quantities of greenhouse gas ($CO_2$). The cement industry accounts for approximately 5% of global anthropogenic $CO_2$ emissions. More than 60% of this $CO_2$ comes from the chemical decomposition, or calcination of limestone.

There has been growing effort to reduce total $CO_2$ emissions within the cement industry. According to a proposal by the International Energy Agency, the cement industry needs to reduce its $CO_2$ emissions from 2.0 Gt in 2007 to 1.55 Gt by 2050. This represents a daunting task because, over this same period, cement production is projected to grow from 2.6 Gt to 4.4 Gt.

To meet this formidable challenge, revolutionary approaches to cement production are needed that significantly reduce the energy requirements and $CO_2$ emissions associated with cement production. Ideally, the new approach preferably offers the ability to permanently and safely sequester $CO_2$ while being adaptable and flexible in equipment and production requirements, allowing manufacturers of conventional cement to easily convert to the new platform.

SUMMARY

Provided herein are methods for forming cured cementitious materials. These methods build on an understanding of the reactivity of pseudowollastonite (a calcium silicate (Ca-$SiO_3$) polymorph with an isolated trisilicate ring crystal structure) to provide cementitious materials that form crystalline calcium silicate hydrate (CCSH) mineral phases during the carbonation of a calcium silicate precursor. These plate-like crystalline phases possess similarities to those that give ancient Roman cement much of its remarkable strength and durability. Further, these product phases (and by extension the properties of the resulting cured cementitious material) can be varied by controlling process parameters, including temperature, pH, pressure, partial pressure of carbon dioxide, and humidity. Accordingly, these methods can be used to prepared cementitious materials which exhibit higher-strength, lower permeability, and higher chemical stability even under low pH conditions than ordinary Portland cement (OPC). Further, these cementitious materials can trap and sequester carbon dioxide during curing.

In one aspect, provided are methods of forming a cured cementitious material that comprise (a) contacting a cementitious material comprising a calcium silicate precursor with water and carbon dioxide under conditions effective to form crystalline calcium silicate hydrates within the cementitious material; and (b) allowing the cementitious material to harden to form the cured cementitious material. These methods can be used to form precast articles formed from the cured cementitious material, including building materials.

In some embodiments, the calcium silicate precursor can comprise a discrete calcium silicate phase that exhibits congruent dissolution (also referred to as stoichiometric dissolution) in water, such dissolution of the calcium silicate precursor releases Ca and Si in approximately equimolar amounts during dissolution.

In some embodiments, the calcium silicate precursor comprises a molar ratio of elemental Ca to elemental Si of from about 0.90 to about 1.10.

In some embodiments, the discrete calcium silicate phase can comprise pseudowollastonite. The pseudowollastonite can be natural or synthetic. In some embodiments, the pseudowollastonite can comprise synthetic pseudowollastonite. Synthetic pseudowollastonites can be made, for example, by mixing limestone and fumed silica and calcining the mixture to form the synthetic pseudowollastonite; reacting a calcia-rich calcium silicate, such as rankinite ($3CaO \cdot 2SiO_2$), hatruite ($3CaO \cdot SiO_2$), or a combination thereof with silica to form the synthetic pseudowollastonite; or by reacting an industrial waste material, such as coal ash, slags from iron processing, or a combination thereof to form the synthetic pseudowollastonite.

In some embodiments, the calcium silicate precursor comprises an industrial waste material, such as fly ash, incinerated ash, slag, or any combination thereof.

In some embodiments, step (a) can comprise (i) mixing the cementitious material with water; (ii) introducing the cementitious material into a mold; and (iii) incubating the cementitious material at a temperature of at least about 50° C. and at an elevated pressure of $CO_2$ gas for a period of time effective to solidify the cementitious material.

In some cases, the water can further comprise an alkali agent, such as NaOH. In some cases, the water can have a pH of from 7.5 to 12, such as a pH of from 8 to 11.

In some embodiments, step (iii) can comprise incubating the cementitious material at a temperature of from about 50° C. to about 250° C., such as a temperature of from about 90° C. to about 250° C., a temperature of about 90° C. to about 200° C., or a temperature of about 90° C. to about 150° C.

In some embodiments, step (iii) can comprise incubating the cementitious material at a partial pressure of $CO_2$ of from greater than 0 psi to 200 psi.

In some embodiments, step (iii) can comprise incubating the cementitious material at a pressure of from 15 psi to 500 psi.

In some embodiments, step (a) further comprises (iv) demolding the cementitious material following incubating step (iii).

In some embodiments, step (b) can comprise a wet-curing phase, a dry-curing phase, or any combination thereof. In certain cases, step (b) can comprise a wet-curing phase followed by a dry-curing phase.

The wet-curing phase can comprise aqueous carbonation of the cementitious material. For example, the wet-curing phase comprises immersing the cementitious material in an aqueous solution of carbon dioxide. The aqueous solution of carbon dioxide can further comprise an alkali agent, such as NaOH. In some embodiments, the aqueous solution of carbon dioxide can have a pH of from 7.5 to 12, such as a pH of from 8 to 11. In some embodiments, the wet-curing phase can comprise immersing the cementitious material in an aqueous solution of carbon dioxide at a temperature of at least about 50° C., such as a temperature of from about 50° C. to about 250° C., a temperature of from about 90° C. to about 250° C., a temperature of about 90° C. to about 200° C., or a temperature of about 90° C. to about 150° C.

The dry-curing phase can comprise incubating the cementitious material at a temperature of at least about 50° C., at an elevated pressure of $CO_2$ gas, or a combination thereof.

In some embodiments, the crystalline calcium silicate hydrates can comprise plate-like crystals.

In some embodiments, the crystalline calcium silicate hydrates can comprise k-phase, nekoite, truscottite, gyrolite, tobermorite (e.g., tobermorite 14 Å), xonotlite, afwillite, jaffeite, scawtite, spurrite, magadiite, or any combination thereof.

In some embodiments, the cementitious material can further comprise $Al_2O_3$. In these embodiments, step (a) can comprise contacting the cementitious material with water and carbon dioxide under conditions effective to form crystalline calcium silicate hydrates and calcium alumino silicate hydrates within the cementitious material.

Cured cementitious materials made by these methods can exhibit improved performance relative to existing cementitious materials, including ordinary Portland cement.

For example, in some embodiments, the cured cementitious material exhibits a compressive strength of at least 1450 psi, such as a compressive strength of from 1450 psi to 7500 psi, or a compressive strength of from 2500 psi to 7500 psi, as measured using the standard method described in ASTM C109/C109M-16a entitled "Standard Test Method for Compressive Strength of Hydraulic Cement Mortars Using 2-in. or [50-mm] Cube Specimens" (2016).

In some embodiments, the cured cementitious material exhibits a compressive strength of at least 1450 psi, such as a compressive strength of from 1450 psi to 7500 psi, or a compressive strength of from 2500 psi to 7500 psi, as measured using the standard method described in ASTM C39/C39M-18 entitled "Standard Test Method for Compressive Strength of Cylindrical Concrete Specimens" (2018).

In some embodiments, the cured cementitious material can be 20% less permeable to chloride ion penetration than ordinary Portland cement, as measured using the standard method described in ASTM C1202-19 entitled "Standard Test Method for Electrical Indication of Concrete's Ability to Resist Chloride Ion Penetration" (2019).

In some embodiments, the cured cementitious material can exhibit less than a 5% reduction in compressive strength following immersion in an aqueous solution having a pH of 5 for 90 days.

In some embodiments, the cured cementitious material can exhibit less than a 10% reduction in mass following immersion in an aqueous solution having a pH of 5 for 7 days.

In some embodiments, the cured cementitious material can comprise at least 1% by weight carbon, such as from 1% by weight to 5% by weight carbon, based on the total weight of the cured cementitious material.

Also provided are cured cementitious materials, including composite materials made by the methods described herein.

DETAILED DESCRIPTION

Definitions

Figure 1:
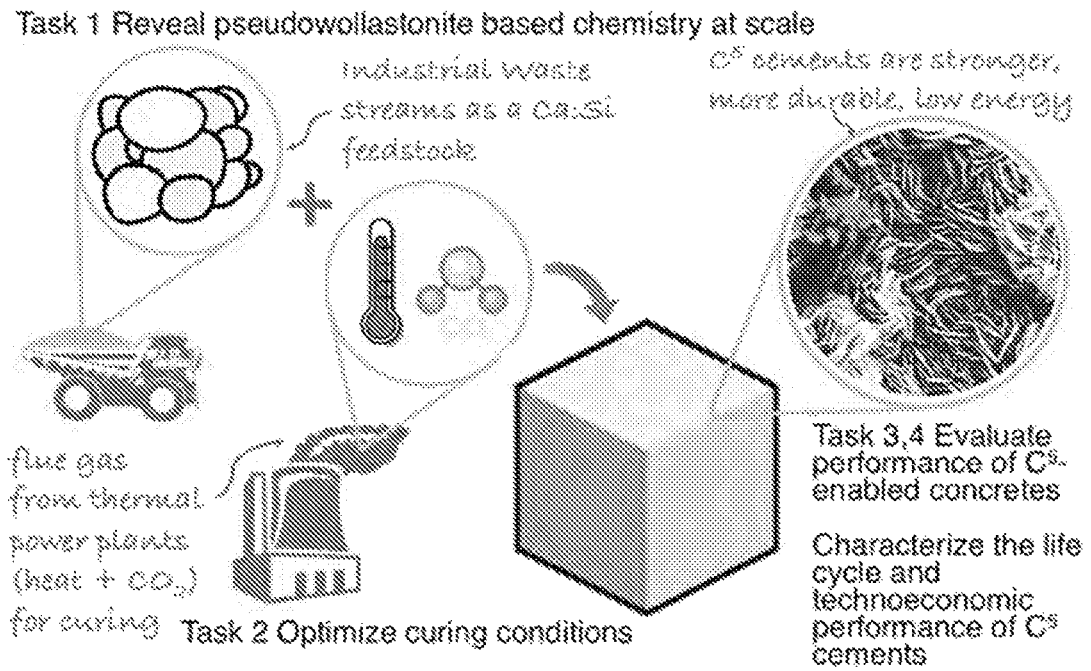
FIG. 1 is a schematic illustration of formulations and curing techniques that can be used to produce cementitious $C^5$ materials with low energy and high performance.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

As used herein, the singular forms "a", "an" and "the" are intended to include the plural forms as well, unless the context clearly indicates otherwise. The use of "or" is intended to include "and/or", unless the context clearly indicates otherwise. Additionally, the use of "and" is intended to encompass "and/or," unless the context clear indicates otherwise.

As used herein, "about" is a term of approximation and is intended to include minor variations in the literally stated amounts, as would be understood by those skilled in the art. Such variations include, for example, standard deviations associated with techniques commonly used to measure the recited amounts.

All of the numerical values contained in this disclosure are to be construed as being characterized by the above-described modifier "about," are also intended to include the exact numerical values disclosed herein. The ranges disclosed herein should be construed to encompass all values within the upper and lower limits of the ranges, unless indicated otherwise. Moreover, all ranges include the upper and lower limits.

As used herein, the term "calcium silicate" refers to naturally-occurring minerals or synthetic materials that are comprised of one or more of a group of calcium-silicon-containing compounds including $CaSiO_3$ (also known as "Wollastonite" or "pseudo-wollastonite" and sometimes formulated as $CaO \cdot SiO_2$), $Ca_3Si_2O_7$ (also known as "Rankinite" and sometimes formulated as $3CaO \cdot 2SiO_2$), $Ca_2SiO_4$ (also known as "Belite" and sometimes formulated as $2CaO \cdot SiO_2$), $Ca_3SiO_5$ (also known as "Alite" and sometimes formulated as $3CaO \cdot SiO_2$), and $Ca_5(SiO_4)_2CO_3$ (also known as "Spurrite" and sometimes formulated as $2Ca_2SiO_4 \cdot CaCO_3$), each of which materials may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight.

As used herein, "cementitious" means a material that includes reactive filler material like vitreous calcium alumino silicate, fly ash, slag and ordinary Portland cement (OPC), non-reactive filler like fine limestone powder, silica fume and glass powder.

By "contact" or other forms of the word, such as "contacted" or "contacting," is meant to add, combine, or mix two or more compounds, compositions, components, or materials under appropriate conditions to produce a desired product or effect (e.g., to induce a particular chemical reaction). The term "react" is sometimes used when "contacting" results in a chemical reaction.

Methods and Compositions

Provided are methods of forming a cured cementitious material that comprise (a) contacting a cementitious material comprising a calcium silicate precursor with water and carbon dioxide under conditions effective to form crystalline calcium silicate hydrates within the cementitious material; and (b) allowing the cementitious material to harden to form the cured cementitious material.

The calcium silicate precursor can comprise any suitable calcium silicate or blend of calcium silicates which exhibit congruent dissolution (also referred to as stoichiometric dissolution) in water. Calcium silicates will be said to exhibit congruent dissolution in water when dissolution of the calcium silicate in water releases Ca and Si in approximately equimolar amounts throughout dissolution.

In some embodiments, the calcium silicate precursor can comprise a molar ratio of elemental Ca to elemental Si of at least about 0.50 (e.g., at least about 0.55, at least about 0.60, at least about 0.65, at least about 0.70, at least about 0.75, at least about 0.80, at least about 0.85, at least about 0.90, at least about 0.95, at least about 1.0, at least about 1.05, at least about 1.10, at least about 1.15, at least about 1.20, at least about 1.25, at least about 1.30, at least about 1.35, at least about 1.40, or at least about 1.45. In some embodiments, the calcium silicate precursor can comprise a molar ratio of elemental Ca to elemental Si of about 1.50 or less (e.g., about 1.45 or less, about 1.40 or less, about 1.35 or less, about 1.30 or less, about 1.25 or less, about 1.20 or less, about 1.15 or less, about 1.10 or less, about 1.05 or less, about 1.00 or less, about 0.95 or less, about 0.90 or less, about 0.85 or less, about 0.80 or less, about 0.75 or less, about 0.70 or less, about 0.65 or less, about 0.60 or less, or about 0.55 or less).

The calcium silicate precursor can comprise a molar ratio of elemental Ca to elemental Si ranging from any of the minimum values described above to any of the maximum values described above. For example, in some embodiments, the calcium silicate precursor can comprise a molar ratio of elemental Ca to elemental Si of from about 0.50 to about 1.50 (e.g., from about 0.75 to about 1.25, or from about 0.90 to about 1.10).

In some embodiments, the calcium silicate precursor can comprise a discrete calcium silicate phase that exhibits congruent dissolution (also referred to as stoichiometric dissolution) in water, such dissolution of the calcium silicate precursor releases Ca and Si in approximately equimolar amounts during dissolution. For example, the discrete calcium silicate phase can comprise pseudowollastonite.

The pseudowollastonite can be natural or synthetic. In some embodiments, the pseudowollastonite can comprise synthetic pseudowollastonite. Synthetic pseudowollastonites can be made by a variety of methods. For example, in one embodiment, the calcium silicate precursor can comprise a synthetic pseudowollastonite formed by mixing limestone and fumed silica and calcining the mixture. In another example, the calcium silicate precursor can comprise synthetic pseudowollastonite formed by reacting a calcia-rich calcium silicate, such as rankinite ($3CaO \cdot 2SiO_2$), hatruite ($3CaO \cdot SiO_2$), or a combination thereof with silica. In another example, the calcium silicate precursor can comprise synthetic pseudowollastonite formed by reacting an industrial waste material, such as coal ash, slags from iron processing, or a combination thereof to form the synthetic pseudowollastonite. In embodiments where a synthetic pseudowollastonite is used, methods can optionally further comprise synthesizing the pseudowollastonite.

In some embodiments, the calcium silicate precursor comprises an industrial waste material, such as fly ash, incinerated ash, slag, or any combination thereof.

In some embodiments, the calcium silicate precursor comprises less than about 5% by weight wollastonite (e.g., less than about 2% by weight wollastonite, less than about 1% by weight wollastonite, or less than 0.5% by weight wollastonite), based on the total weight of all calcium silicates present in the cementitious material.

If desired for a particular application, the cementitious material can further comprise an aggregate. Any suitable aggregate(s) may be used. Exemplary aggregates include inert materials such as rock (e.g., trap rock), sand (e.g., construction sand), and gravel (e.g., pea-gravel). In certain embodiments, lightweight aggregates such as perlite or vermiculite may also be used as aggregates. Materials such as industrial waste materials (e.g., fly ash, slag, silica fume) may also be used as fine fillers.

When present, the aggregate(s) may have any suitable mean particle size and size distribution. In certain embodiments, the aggregate(s) can have a mean particle size in the range from about 0.25 mm to about 25 mm (e.g., about 5 mm to about 20 mm, about 5 mm to about 18 mm, about 5 mm to about 15 mm, about 5 mm to about 12 mm, about 7 mm to about 20 mm, about 10 mm to about 20 mm, about ⅛", about ¼", about ⅜", about ½", about ¾").

Chemical admixtures may also be included in the cementitious material; for example, plasticizers, retarders, accelerators, dispersants and other rheology-modifying agents. Certain commercially available chemical admixtures such as Glenium™ 7500 by BASF® Chemicals and Acumer™ by Dow Chemical Company may also be included. In certain embodiments, one or more pigments may be evenly dispersed or substantially unevenly dispersed in the cementitious material, depending on the desired cured cementitious material. The pigment may be any suitable pigment including, for example, oxides of various metals (e.g., black iron oxide, cobalt oxide and chromium oxide). The pigment may be of any color or colors, for example, selected from black, white, blue, gray, pink, green, red, yellow and brown. The pigment may be present in any suitable amount depending on the desired cementitious material, for example in an amount ranging from about 0.0% to about 10% by weight.

In some embodiments, step (a) can comprise (i) mixing the cementitious material with water; (ii) introducing the cementitious material into a vessel (e.g., a mold), and (iii) incubating the cementitious material at a temperature of at least about 50° C. and at an elevated pressure of $CO_2$ gas for a period of time effective to solidify the cementitious material.

In some cases, the water can further comprise an alkali agent, such as NaOH. In some cases, the water can have a pH of from 7.5 to 12, such as a pH of from 8 to 11.

In some embodiments, step (iii) can comprise incubating the cementitious material at a temperature of from about 50° C. to about 250° C., such as a temperature of from about 90° C. to about 250° C., a temperature of about 90° C. to about 200° C., or a temperature of about 90° C. to about 150° C.

In some embodiments, step (iii) can comprise incubating the cementitious material at a partial pressure of CO2 of at least about 5 psi (e.g., at least about 10 psi, at least about 25 psi, at least about 50 psi, at least about 75 psi, at least about 100 psi, at least about 125 psi, at least about 150 psi, or at least about 175 psi). In some embodiments, step (iii) can comprise incubating the cementitious material at a partial pressure of CO2 of about 200 psi or less (e.g., about 175 psi or less, about 150 psi or less, about 125 psi or less, about 100 psi or less, about 75 psi or less, about 50 psi or less, about 25 psi or less, or about 10 psi or less).

Step (iii) can comprise incubating the cementitious material at a partial pressure of $CO_2$ ranging from any of the minimum values described above to any of the maximum values described above. For example, in some embodiments, step (iii) can comprise incubating the cementitious material at a partial pressure of CO2 of from greater than 0 psi to about 200 psi.

In some embodiments, step (iii) can comprise incubating the cementitious material at a pressure of at least about 15 psi (e.g., at least about 25 psi, at least about 50 psi, at least about 75 psi, at least about 100 psi, at least about 150 psi, at least about 200 psi, at least about 250 psi, at least about 300 psi, or at least about 400 psi). In some embodiments, step (iii) can comprise incubating the cementitious material at a pressure of about 500 psi or less (e.g., about 400 psi or less, about 300 psi or less, about 250 psi or less, about 200 psi or less, about 150 psi or less, about 100 psi or less, about 75 psi or less, about 50 psi or less, or about 25 psi or less).

Step (iii) can comprise incubating the cementitious material at a pressure ranging from any of the minimum values described above to any of the maximum values described above. For example, in some embodiments, step (iii) can comprise incubating the cementitious material at a pressure of from about 15 psi to about 500 psi.

In some embodiments, step (a) further comprises (iv) demolding the cementitious material following incubating step (iii).

In some embodiments, step (b) can comprise a wet-curing phase, a dry-curing phase, or any combination thereof. In certain cases, step (b) can comprise only a wet-curing phase. In certain cases, step (b) can comprise a wet-curing phase followed by a dry-curing phase.

The wet-curing phase can comprise aqueous carbonation of the cementitious material. For example, the wet-curing phase comprises immersing the cementitious material in an aqueous solution of carbon dioxide. The aqueous solution of carbon dioxide can further comprise an alkali agent, such as NaOH. In some embodiments, the aqueous solution of carbon dioxide can have a pH of from 7.5 to 12, such as a pH of from 8 to 11. In some embodiments, the wet-curing phase can comprise immersing the cementitious material in an aqueous solution of carbon dioxide at a temperature of at least about 50° C., such as a temperature of from about 50° C. to about 250° C., a temperature of from about 90° C. to about 250° C., a temperature of about 90° C. to about 200° C., or a temperature of about 90° C. to about 150° C.

The dry-curing phase can comprise incubating the cementitious material at a temperature of at least about 50° C., at an elevated pressure of $CO_2$ gas, or a combination thereof.

The crystalline calcium silicate hydrates can comprise plate-like crystals. In some embodiments, crystalline calcium silicate hydrates can comprise a mixture of different crystalline calcium silicate hydrate phases. The crystalline calcium silicate hydrates can comprise, for example, a phyllosilicate (e.g., k-phase, nekoite, truscottite, gyrolite, or a combination thereof), an inosilicate (e.g., tobermorite 14 Å, xonotlite, or a combination thereof), a nesosilicate (e.g., afwillite), a sorosilicate (e.g., jaffeite), or any combination thereof. In some embodiments, the crystalline calcium silicate hydrates can comprise k-phase, nekoite, truscottite, gyrolite, tobermorite (e.g., tobermorite 14 Å), xonotlite, afwillite, jaffeite, scawtite, spurrite, magadiite, or any combination thereof.

In some embodiments, the cementitious material can further comprise $Al_2O_3$. In these embodiments, step (a) can comprise contacting the cementitious material with water and carbon dioxide under conditions effective to form crystalline calcium silicate hydrates and calcium alumino silicate hydrates within the cementitious material.

Cured cementitious materials made by these methods can exhibit improved performance relative to existing cementitious materials, including ordinary Portland cement.

For example, in some embodiments, the cured cementitious material can exhibit a compressive strength of at least 1450 psi (e.g., at least 1500 psi, at least 1750 psi, at least 2000 psi, at least 2250 psi, at least 2500 psi, at least 2750 psi, at least 3000 psi, at least 3500 psi, at least 4000 psi, at least 4500 psi, at least 5000 psi, at least 5500 psi, at least 6000 psi, at least 6500 psi, or at least 7000 psi). For example, in some embodiments, the cured cementitious material can exhibit a compressive strength of 7500 psi or less (e.g., 7000 psi or less, 6500 psi or less, 6000 psi or less, 5500 psi or less, 5000 psi or less, 4500 psi or less, 4000 psi or less, 3500 psi or less, 3000 psi or less, 2750 psi or less, 2500 psi or less, 2250 psi or less, 2000 psi or less, 1750 psi or less, or 1500 psi or less).

The cured cementitious material can exhibit a compressive strength ranging from any of the minimum values described above to any of the maximum values described above. For example, in some embodiments, the cured cementitious material can exhibit a compressive strength of from 1450 psi to 7500 psi, or a compressive strength of from 2500 psi to 7500 psi. In these embodiments, compressive strength can be measured using the standard method described in ASTM C109/C109M-16a entitled "Standard Test Method for Compressive Strength of Hydraulic Cement Mortars Using 2-in. or [50-mm] Cube Specimens" (2016), or the standard method described in ASTM C39/C39M-18 entitled "Standard Test Method for Compressive Strength of Cylindrical Concrete Specimens" (2018).

In some embodiments, the cured cementitious material can be 20% less permeable (e.g., 25% less permeable, 30% less permeable, 35% less permeable, 40% less permeable, 45% less permeable, 50% less permeable, 55% less permeable, 60% less permeable, 65% less permeable, 70% less permeable, or 75% less permeable) to chloride ion penetration than ordinary Portland cement, as measured using the standard method described in ASTM C1202-19 entitled "Standard Test Method for Electrical Indication of Concrete's Ability to Resist Chloride Ion Penetration" (2019).

In some embodiments, the cured cementitious material can exhibit less than a 10% reduction in compressive strength (e.g., less than a 5% reduction in compressive strength, less than a 4% reduction in compressive strength, less than a 3% reduction in compressive strength, less than a 2% reduction in compressive strength, or less than a 1% reduction in compressive strength) following immersion in an aqueous solution having a pH of 5 for 90 days. In these embodiments, compressive strength can be measured using the standard method described in ASTM C109/C109M-16a entitled "Standard Test Method for Compressive Strength of Hydraulic Cement Mortars Using 2-in. or [50-mm] Cube Specimens" (2016), or the standard method described in ASTM C39/C39M-18 entitled "Standard Test Method for Compressive Strength of Cylindrical Concrete Specimens" (2018).

In some embodiments, the cured cementitious material can exhibit less than a 10% reduction in mass (e.g., less than a 9% reduction in mass, less than a 8% reduction in mass, less than a 7% reduction in mass, less than a 6% reduction in mass, or less than a 5% reduction in mass) following immersion in an aqueous solution having a pH of 5 for 7 days.

In some embodiments, the cured cementitious material can comprise at least 1% by weight carbon, such as from 1% by weight to 5% by weight carbon, based on the total weight of the cured cementitious material.

These methods can be used to form precast articles formed from the cured cementitious material.

EXAMPLES

The invention will be described in greater detail by way of specific examples. The following examples are offered for illustrative purposes, and are not intended to limit the invention in any manner Those of skill in the art will readily recognize a variety of non-critical parameters which can be changed or modified to yield essentially the same results.

Example 1. Methods and Systems for Carbonation-Enabled Mineralization

The examples provide high-performance cements that can be used for the manufacture of precast concrete products using a fraction of the energy needed to make conventional cement. Ordinary Portland cement (OPC) production is the second most energy intensive industrial sector in the United States (after electricity production) because of the extremely high temperatures (~1450° C.) that are required to treat the limestone feedstock.

Efforts to understand the reactivity of pseudowollastonite (a calcium silicate ($CaSiO_3$) polymorph with an isolated trisilicate ring crystal structure) have produced calcium silicate hydrate (CSH) mineral phases with some similarities to those that give ancient Roman cements much of its remarkable strength and durability. These product phases are abundant when the parent mineral is cured at intermediate temperatures (~120° C.), high humidity, under alkaline conditions and high partial pressures of $CO_2$. The materials, referred to as congruent calcium concentration via controlled carbonation ($C^5$) cements (also referred to as PWOL cements and CCSH cements), have been shown in preliminary studies to have higher-strength, lower permeability, and higher chemical-stability even under low pH conditions than OPC (FIG. 1). Efforts have and will continue to focus on flask-to-field scaling by developing the understanding needed to apply the pseudowollastonite reaction mechanism at large scale using inexpensive mineral feedstocks and waste materials such as industrial slag, fly ash, and/or waste heat and $CO_2$ in flue gas streams. In doing so, the connection between feedstock properties, curing techniques, and material performance can be elucidated. Similarly, technoeconomic and life cycle modeling can be performed to inform the commercial viability of proposed materials. Studies to date suggest that $C^5$ cements are well-suited for disrupting the rapidly growing pre-cast cement structures industry where curing conditions can be controlled and material strength is important.

Innovation and Impact

The cement industry is the most energy intensive manufacturing sector in the US economy. To achieve deep reductions in energy intensity while improving the performance over commercially available formulations, a class of materials called $C^5$ cements ($C^5$=congruent calcium concentration via controlled carbonation) have been developed. The development of $C^5$ cements is an outgrowth of two innovations.

The first innovation involves control of the concentration and ratio of calcium and silica available in the feedstock materials used to make the cement blend. Calcium and silica ratios can impact the development of the daughter compound phases that give cement its strength, but efforts have shown that the rate at which these ions are introduced into a mixture can dramatically alter the molecular structure of the precipitates. These precipitates control macroscale mechanical strength, permeability, chemical resistivity and durability. The second innovation involves the curing conditions used to set and strengthen the cement mixture. $C^5$ cements can be cured at intermediate temperatures, elevated $CO_2$ concentrations, under alkaline conditions, and in the presence of nucleation sites. Most common forms of cement (e.g., ordinary Portland cement (OPC)) are hydraulic cements, which means that they (1) harden when they react with water; and (2) following hardening, they form a semi-impermeable barrier to water. In contrast, $C^5$ cements do not cure exclusively in water. As a consequence, $C^5$ cements have a much lower permeability (and as a result possess more durability).

Figure 2:
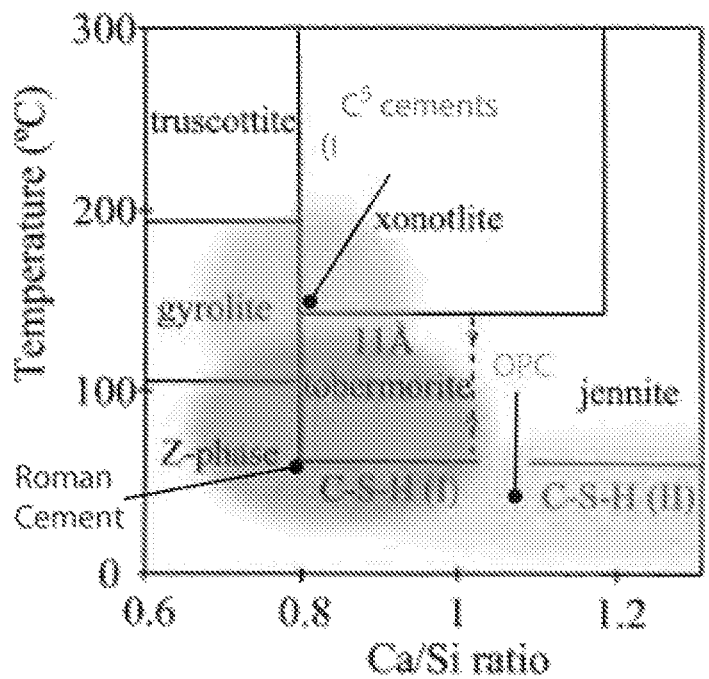
FIG. 2 is a schematic illustration of the mineral phases generated during the hydration of calcium silicates under hydrothermal conditions.

FIG. 2 illustrates the connection between Ca/Si ratio and temperature of formation that are at the center of the first innovation. OPC (shown at the bottom right in FIG. 2) derives its strength from calcium silicate hydrate (CSH) gels, which are complex and varied in chemical structure and are generally classified by their ratio of CaO to $SiO_2$ (Ca/Si). The products of OPC hydration result in CSH phases with a high ratio of Ca/Si (1.7 on average). The basic molecular phases of these CSH phases have been investigated, demonstrating that sparse and lower Ca/Si phases like tobermorite have higher mechanical properties. Centuries ago, Roman engineers generated famously durable hydraulic cements which typically contained lower Ca/Si ratios (FIG. 2), resulting in different phases such as tobermorite. Unfortunately, manufacturing Roman cements requires raw materials that are not common outside of volcanically active regions. To produce hydraulic cements, feedstocks must be heated to extreme temperatures in excess of 1450° C. for OPC in order to dehydrate the material. To cure the cements, the material is hydrated over time at ambient temperatures.

With respect to the second innovation, $C^5$ cements can be cured at temperatures higher than 90° C., which results in different mineral precipitates than those found in OPC. When pseudowollastonite ($CaSiO_3$) is cured at intermediate temperatures 90-150° C., it forms hydrated sheet silicates with exceptional mechanical strength and chemical stability. This suggests that these materials can both eliminate the need for extremely high temperatures (as in OPC manufacturing) while generating materials with high performance (e.g., high compressive strength).

BACKGROUND

Nearly $10^8$ tons of OPC are consumed in the United States each year with between 10-20% of that used to manufacture pre-cast concrete products. Worldwide production is much higher with developing countries driving most of the $>3\times10^{10}$ tons/year of global demand. To produce cement at this scale requires an enormous amount of energy and water. To put the energy and environmental impacts in context, cement manufacturing consumes 10-11 exajoules of energy annually (~3% of global energy use) and is responsible for over 5% of global $CO_2$ emissions. The manufacturing of one ton of OPC requires approximately 60-130 kg of fuel oil, 110 kWh of electricity and generates one ton of $CO_2$ from the calcination of limestone ($CaCO_3$) alone Mining of raw materials and transport is responsible for additional energy consumption and emissions. Cement manufacturing can also produce hazardous regional air emissions including hexavalent chromium and dioxins.

In use, the degradation of OPC is problematic because it increases the product's lifecycle impact in a range of engineering applications where dissolved magnesium, sulfate, sodium or carbonate ions penetrate the cement and react with calcium hydroxide and CSH gels. The resulting precipitates will often sorb water or have a larger molar volume than the parent phases, which can generate internal pressures that lead to cracking. This cracking is a positive feedback that leads to deeper penetration of the dissolved ions, which further cracks the OPC or generates flow paths to rebar or other internal reinforcement of the material. The resulting networks of cracks also hold water which can impact the mechanical integrity of cements subject to freeze/thaw cycles. Over time these processes lead to the degradation and failure of the cement.

To overcome some of the limitations faced by conventional poured-in-place OPC, the market for precast concrete structure has been growing at the rapid pace of 6.1%/year over the past several years. This growth is driven by the potential to control mixing and processing conditions enabling quality control and consistency that is expanding the uses for concrete in construction and infrastructure. $C^5$ cements stand to make a significant impact in improving the performance of pre-cast cement structures while simultaneously reducing the energy use and environmental burdens of the sector dramatically. Because of the rapid growth of the pre-cast concrete industry and the growing interest to create value add techniques to reduce emissions from certain industries (e.g., electric power), the deployment of $C^5$ cements have a huge potential for scale-up and adoption.

Given the size and importance of the OPC market, some efforts have been made to develop alternatives to OPC which possess either higher performance (e.g., improved mechanical strength obtained by incorporating an additive such as particles or fibers) or a lower energy/environmental footprint (e.g., which cure in the presence of $CO_2$). Some are working to develop cements with the characteristics of ancient Roman cements, which strengthen over time, even in corrosive coastal environments. However, few (if any) materials have been developed that have both higher performance (in terms of mechanical strength, corrosion resistance) and lower environmental impact (by avoiding the energy intensive processes needed to make OPC). Others have investigated calcite-based cements. The calcium silicate feedstocks used to make these cement (e.g., cements made by Solidia Technologies, Inc.) are produced at >900° C., which offers some reduction in energy consumption relative to OPC (~1450° C.). Further, these cement products are cured in gas phase $CO_2$, which reacts with the calcium silicate to produce calcite. In use, the material will continue to sequester $CO_2$ but critically, it is chemically unstable and will dissolve in acidic conditions. Table 1 provides a comparison of different competing approaches for making cements and their alternatives that contextualizes the characteristics of C5 cements relative to competitors.

TABLE 1

Qualitative comparison of concretes made using different cement types.

| Cement Type | Ordinary Portland Cement | Solidia Technologies Cements | Roman Cements | $C^5$ Cements |
|---|---|---|---|---|
| Principal Ingredients | $Ca_3SiO_5$, $Ca_2SiO_4$, $Al_2O_3$, $Fe_2O_3$, sand, and larger aggregate | wollastonite ($CaSiO_3$) and $CO_2$ | CaO, pozzolana (Porous $SiO_2$ with Al, Na, Cl, K, Ca, Mg), large aggregate | pseudowollastonite ($CaSiO_3$), $CO_2$, $Na^+$, $H_2O$ |
| Principal Products | CSH gels ($CaO:SiO_2$ = 1.0-2.2) and $Ca(OH)_2$ | $CaCO_3$ and $SiO_2$ | platey crystals, tobermorite and strätlingite | $CaCO_3$, $SiO_2$, platey crystals, gyrolite, scawtite, magadiite |
| Characteristics | Reacts in presence of $H_2O$. Gains strength over long hydration periods (weeks to months). Not resilient in marine or seismically Active environments. Typically incorporates steel reinforcement. | Reacts with gaseous $CO_2$. Gains strength rapidly (hours) and does not continue after removal of $CO_2$ atmosphere. Not stable in acidic environments | Reacts in presence of $H_2O$. Continues to gain strength over millennia. Incorporates dissolved ions into stable phases. Used no reinforcements | Reacts with aqueous $CO_2$ to form stable crystalline phases. Gains strength rapidly (days). Crystal growth induces low permeability and high durability |
| Applications | precast and cast in place | precast | Pantheon dome, Roman aqueducts, coastal structures | precast |

Proposed Materials

The basis for $C^5$ cements rests in an understanding of the chemistry connecting pseudowollastonite dissolution/precipitation chemistry in the presence of $CO_2$ and a base (such as NaOH). The formation of these mineral hydrates occurs when the dissolution of $SiO_2$ and CaO is congruent or approximately equivalent. The (1) temperature, (2) partial pressure of $CO_2$ ($P_{CO2}$) and (3) parent silicate composition are all important to drive the formation of strong mineral phases like tobermorite. Industrial waste heat sources such as flue gas from power plants can be used to provide the temperature, humidity, and $P_{CO2}$ concentrations suitable to cure the $C^5$ cements. $C^5$ can be formed in the lab using a pseudowollastonite feedstock that requires 1200° C. to produce. However, the right ratios of Ca/Si can be formed in mixtures of common minerals without extensive pretreatment to produce ultra-hard mineral precipitates. $C^5$ cements do not harden in water alone but are instead cured at intermediate temperatures (e.g., 90-150° C.) in the presence of water and $CO_2$. Industrial waste materials can be used as surrogates for the Ca and Si that are needed to produce $C^5$ materials. Even though some of these materials such as fly ash (from coal burning), incinerated bottom/fly ash (from burning municipal wastes) and slag (by-product of steel manufacturing) have been studied as cement additives, the potential to mine pseudowollastonite or make synthetic pseudowollastonite directly from these abundant by-product materials has not been studied. $C^5$ cements can be made more sustainable by avoiding virgin raw materials (limestone, sand, clay) of conventional cement and instead using industrial wastes as a direct feedstock (not an additive). For example, incinerated bottom/fly ash is a rich source of CaO (~46% wt) and $SiO_2$ (~49% wt %) that is generally sent to landfills. Given that 1.3 billion tons of municipal solid wastes are produced annually, the potential for disruption is large.

$C^5$ cements have the potential to disrupt the market by outperforming OPC in terms of (1) higher strength, which will lead to more efficient use in smaller quantities; (2) Higher durability, which will lead to less maintenance and/or replacement, saving energy, $CO_2$ footprint and materials to produce new concrete; (3) lower processing temperature, which will save on costs and $CO_2$ emissions; and (4) feedstock source, using industrial waste as a source of Ca and Si it can eliminate the need for virgin materials.

Studies of $C^5$ Cements

Fundamental studies have been performed to understand the connection between (i) Ca/Si ratio and the structure of CSH crystalline phases; (ii) $P_{CO2}$, exogenous pH control, and the rates at which the crystalline phases form; (iii) CSH crystalline phase structure, their integration in precast concrete, and their strength; and (iv) the chemical reactivity of the CSH mineral phases and durability of the resultant concrete. Systems-scale analyses can be used to understand the technoeconomic and environmental benefits of producing $C^5$ cements.

Approach

An understanding of pseudowollastonite synthesis or characteristics duplicative of pseudowollastonite using industrial waste streams has been developed. The ways in which to blend these materials to create, form, and cure concretes has been studied. These manufacturing protocols can be used by gas and coal power plants to directly turn their $CO_2$ emissions to scalable value-added products. This strategy allows use of fly ash (a by-product of coal power plants), incinerated ash (from burning municipal solid wastes), or any combination thereof as a source of Ca and Si for the production of $C^5$ cements, further expanding the choice of the feedstock and/or potentially co-locating the feedstocks with both $CO_2$ and heat generated in the plants (three opportunities to improve energy efficiency). Techno-economic and life cycle models of the production process and feedstock properties can be used to understand how processing steps such as mineral grinding and feedstock characteristics can reduce use of energy and environmental footprint of these new materials.

Preliminary Results

Figure 3:
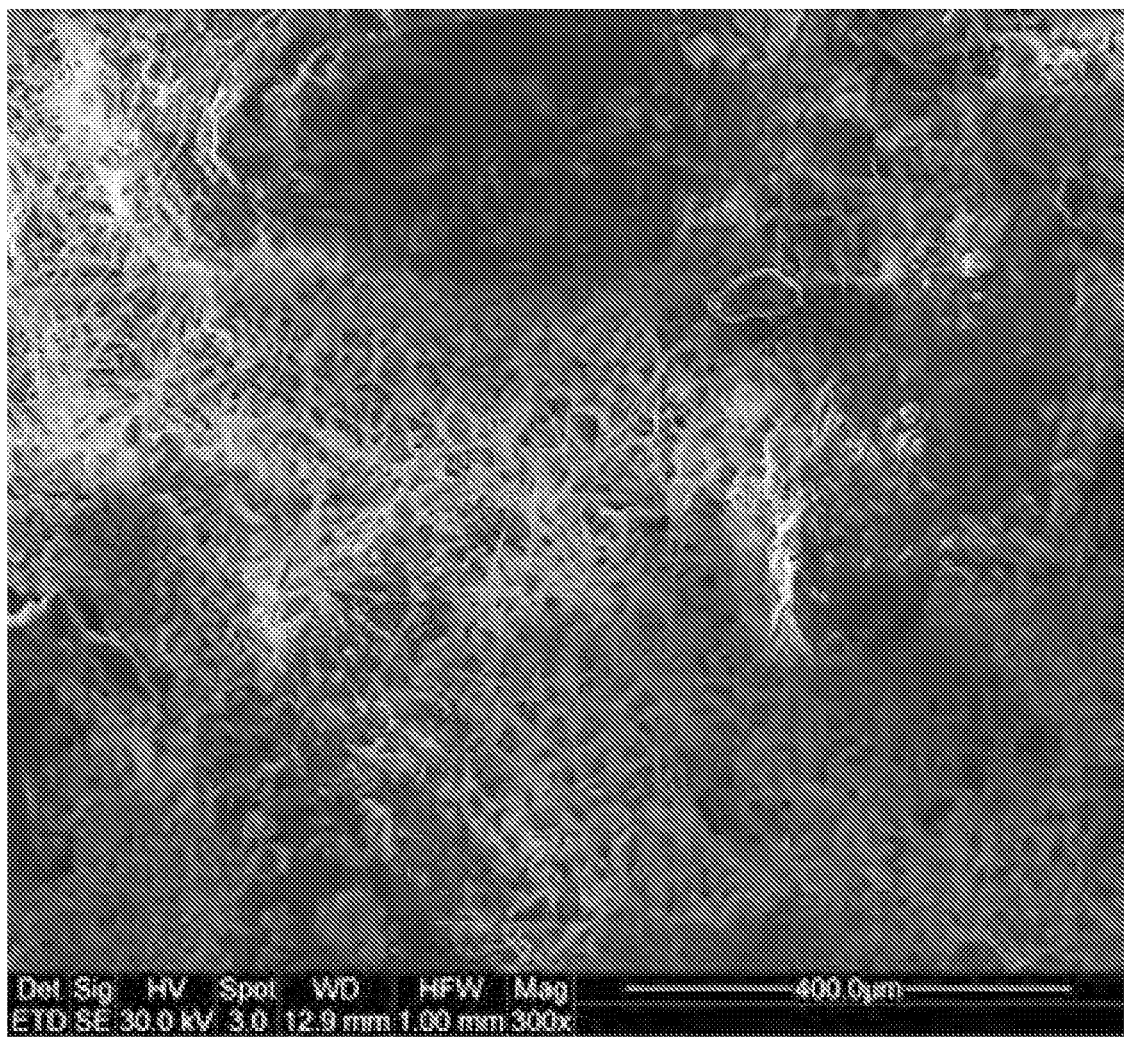
FIG. 3 shows a scanning electron microscopy (SEM) micrograph of reacted pseudowollastonite showed no appreciable change in structure following acid washing (pH 5.5) whereas conventional cements, and especially those rich in calcium carbonate, will dissolve in acid.

The concept for C5 cements built on efforts to develop materials that could plug flow in porous media used in $CO_2$ sequestration applications. In these studies, engineered nanoparticles of $CaSiO_3$ were injected into a porous medium and then reacted with water and $CO_2$ at elevated temperatures and pressures so that the precipitate phases would seal flow paths. While experiments carried out using wollastonite created significant amounts of calcite, which were susceptible to $CO_2$ dissolution, experiments carried out with pseudowollastonite produced a range of plate-like hydrated phases that were stable in acidic environments. FIG. 3 shows images of pseudowollastonite-based precipitates in a porous media. The scanning electron microscope (SEM) results reveal the extent to which the desired plate- and needle-like phases predominated in these samples. The precipitated phases that are rich in silica and calcium are more resistant to acid attack than are the carbonate-only precipitates.

Figure 4:
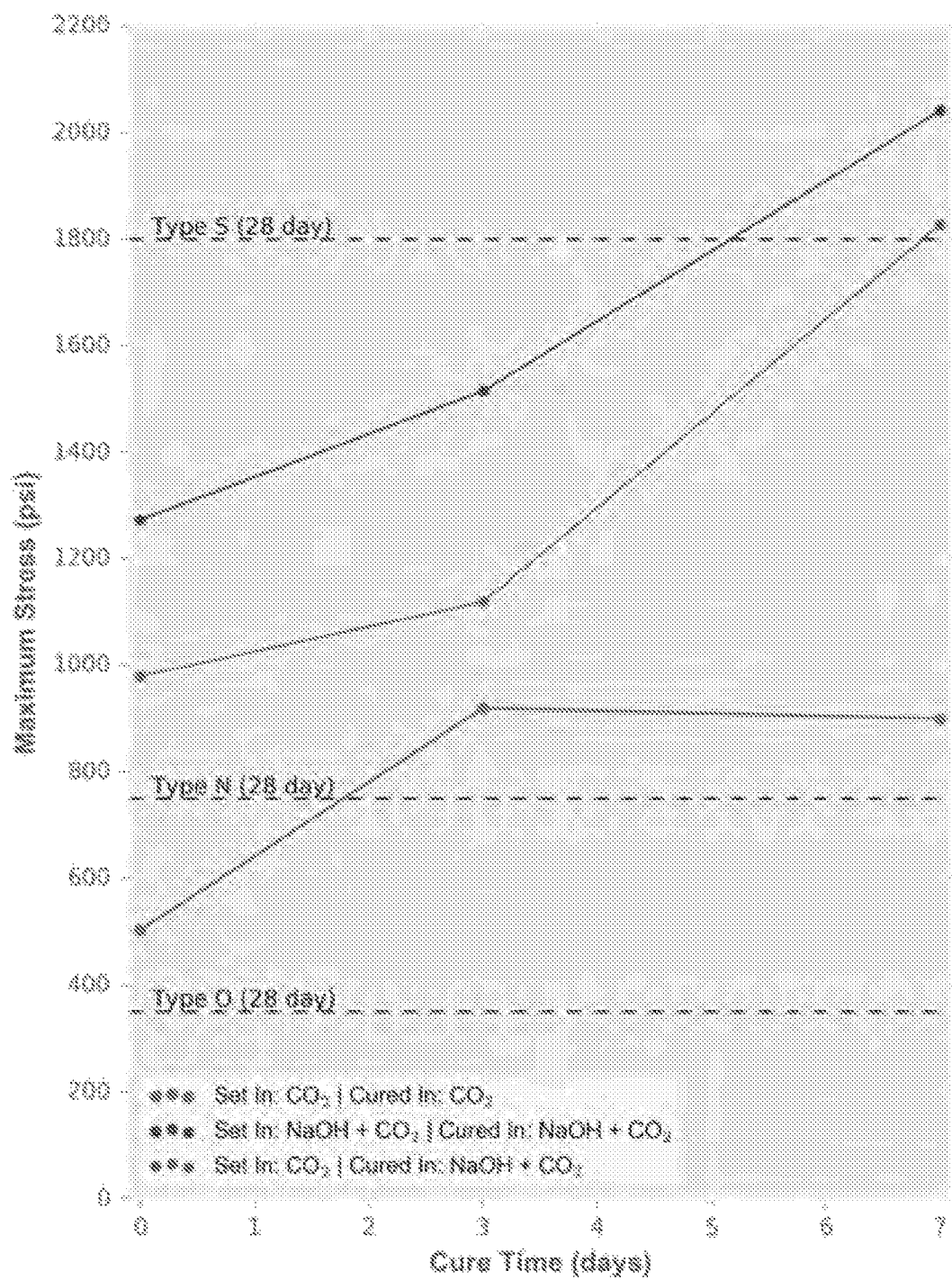
FIG. 4 is a plot illustrating the show the relationship between $C^5$ mortar curing time (top trace) and strength. Comparative curing techniques were also tested (middle and bottom traces) and show significantly lower strengths over the test period. Dashed lines show standard 28-day strengths for common OPC-based mortar types. Despite not being optimized, these formulations show the potential to create stronger cements much more quickly than traditional OPC-based formulations.

Subsequent experiments to evaluate the strength of these phases show that they are exceptionally strong. FIG. 4 shows the maximum stress of $C^5$ mortar specimens as a function of curing time. The data show that strength increases rapidly in the first few days of curing. Conventional cements also harden quickly in the first few days of curing but are typically benchmarked after 28 days of curing. The $C^5$ cements achieve comparable levels of hardness over the course of a few days. Preliminary durability characterizations based on surface and bulk electrical resistivity (ASTM C1202) also demonstrated similar or better performance compared to conventional OPC concrete. It is worth noting that unlike the Type O, N, and S mortars that have been optimized over the course of decades, these formulations are first-round prototypes that have not yet been optimized for strength, durability, or other performance characteristics.

Figure 5:
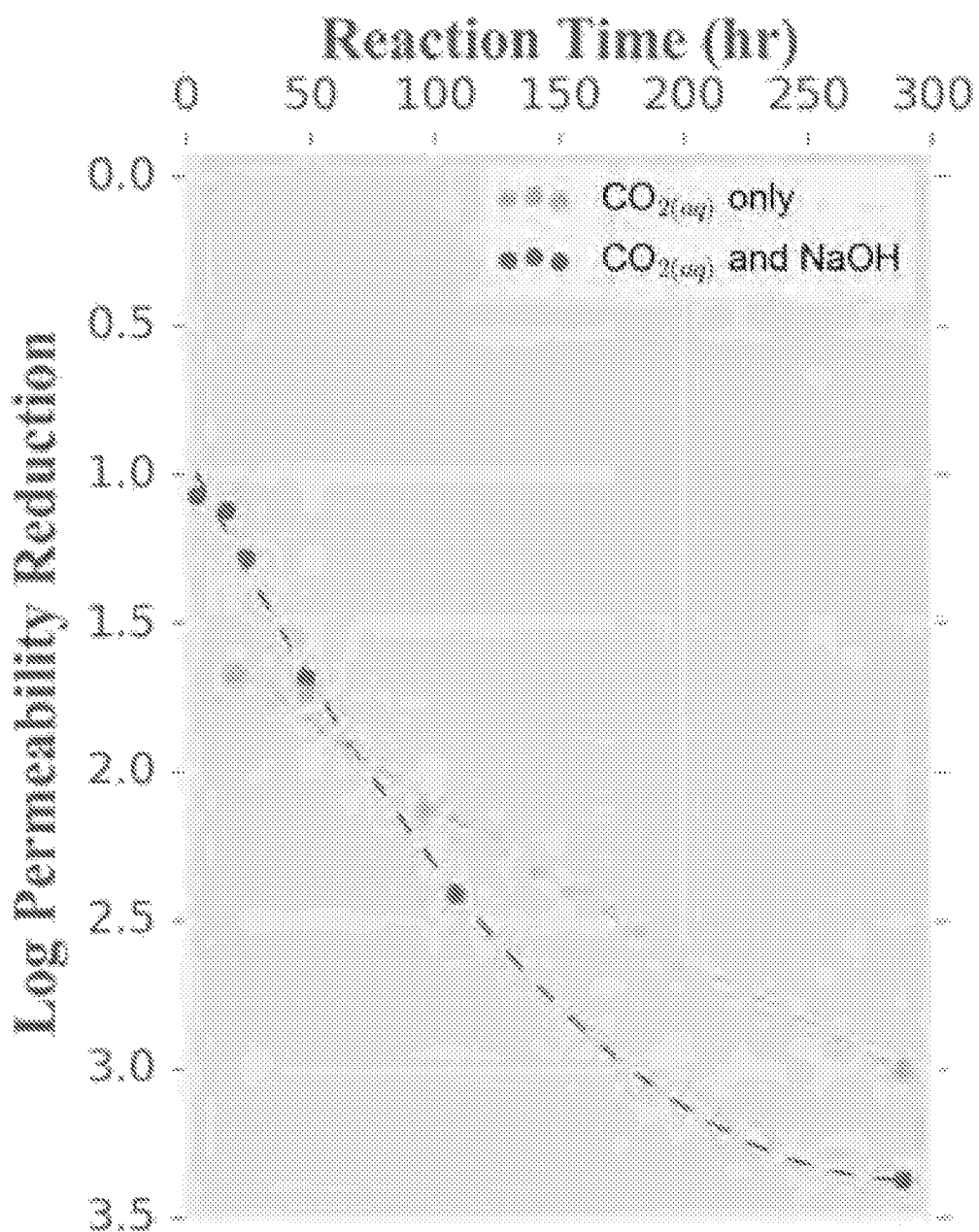
FIG. 5 is a plot showing the role that curing conditions can have on reducing permeability in $C^5$ cements.

In these examples, the completion of two milestones are described: (1) the formulation and production of a fully functional $C^5$ cement prototype; and 2) the testing and characterization of the functional $C^5$ cement-based precast concrete. Achieving the first milestone includes a detailed chemical and materials characterization of the pseudowollastonite dissolution (or direct conversion of waste streams to desired ion concentrations) and precipitation process. Achieving the second milestone involves the synthesis of precast concrete prototypes and component optimization, followed by standard mechanical and durability characterizations. These milestones will be pursued through four tasks: Task 1. Characterize feedstock production and substitution methods; Task 2. Optimize the manufacture of C5 cements and precast set-up; Task 3. Optimize manufacture of precast concrete products; Task 4. Meet ASTM/ACI/AASHTO testing standards. These tasks will generate prototype materials that: (1) have a compressive strength that exceeds the specifications for that of Type M (highest strength) mortar, 2500 psi; (2) reduce the energy use required to manufacture by at least 25% relative to conventional OPC structures; (3) are 40% less permeable to rapid chloride penetration (indicating lower hydraulic conductivity) than OPC. Preliminary tests (FIG. 5) in sand/$CaSiO_3$ columns show that the curing techniques established herein are highly effective in quickly lowering permeability several orders of magnitude via the precipitation of crystalline CSH phases (FIG. 5, trace labeled $CO_2$(aq) and NaOH). The permeability reduction due to the precipitation of calcite only is shown in orange; (4) exhibit less than a 5% reduction in compressive strength when exposed to accelerated weathering in low pH conditions (5.5) for 90 days due to the stability of CSH phases; (5) cost less and more sustainable compared to OPC-based products by relying on mining industrial waste streams.

Task 1. Characterizing Feedstock Production and Substitution Methods.

The dissolution/precipitation processes that govern the formation of $C^5$ cements have been demonstrated using pseudowollastonite as a feedstock. Pseudowollastonite is a high temperature polymorph of $CaSiO_3$ that is uncommon in many parts of the world. To overcome this limitation, Task 1 will develop techniques for generating the conditions that create pseudowollastonite-equivalent cements with or without pseudowollastonite and then optimize the manufacturing processes used to convert these feedstocks into $C^5$ cements.

Techniques to generate synthetic pseudowollastonite using more common calcium silicates as feedstocks will be evaluated. Experiments have used synthetic pseudowollastonite prepared internally with control over material properties. For example, limestone and fumed silica can be mixed and calcined at 1200° C., followed by grinding and sorting into specific particle sizes. The resulting samples are chemically and physically homogenous but require temperatures that are only slightly lower than those used to produce OPC (which is typically ~1450° C.). Other methods for generating pseudowollastonite can fall into two classes: i) formulations using combinations of other calcium silicate and silica phases; and ii) formulations originating from waste streams such as coal ash or iron-base slags. First, mineral phases such rankinite ($3CaO \cdot 2SiO_2$) and hatruite ($3CaO \cdot SiO_2$) are calcia-rich and could be reacted with silica in amounts proportionate to the $CaO:SiO_2$ ratio required for pseudowollastonite. The reactivity of the polymorphs of $SiO_2$ including quartz, tridymite, and cristobalite as well as amorphous $SiO_2$ can be evaluated for reactivity with the Ca-silicate minerals. Secondly, coal ash containing CaO and $SiO_2$:$Al_2O_3$=2.7 falls in the pseudowollastonite compositional range. Similarly, slags resulting from iron processing also exist in the pseudowollastonite compositional rage. Both waste streams contain $Al_2O_3$ which can form calcium alumino silicate hydrates (CASH), providing benefits to the mechanical properties of the resulting cements. These efforts can lead to strategies for forming pseudowollastonite at temperatures lower than 1200° C. from mineral and waste stream precursor mixtures. These materials can be evaluated with differential scanning calorimetry, furnace exposures and x-ray diffraction analysis.

In addition, a suite of mineral feedstocks that are more common and inexpensive (but generate similar pore concentrations of ions as pseudowollastonite) will also be characterized in order to precipitate out the secondary mineral phases that give $C^5$ cements their strength. Possible strategies for meeting these goals can include using fly ash (byproduct of coal combustion) or incinerated bottom/fly ash (from burning municipal wastes) as rich sources of Ca and Si. Heat treatment and/or suitable chemicals could separate and release the needed concentration of Ca and Si for nucleation and activation in the presence of $CO_2$. Thermochemical techniques can be used to dissociate fly ash and create calcium-silicate based structural binders with a minimal (<5%) amount of sodium-based activators. Here, the focus will be creating Ca and Si concentrations and structural binders similar to those depicted in FIG. 6, panel b. Al can lead to CASH phases in the final cured product, along with CSH. Such Al-based phases can improve the performance of cement, as in the case of high aluminum cement commercially produced by Kerneous Inc. Alternative Ca-silicate minerals (rankinite, hatruite) and Ca-silicate waste streams (e.g., Fe slag waste) can also be used as feedstocks, with the goal of bypassing the formation of pseudowollastonite, while still releasing Ca and Si ions in the correct ratios required to form the desired CSH or CASH.

Figure 7:
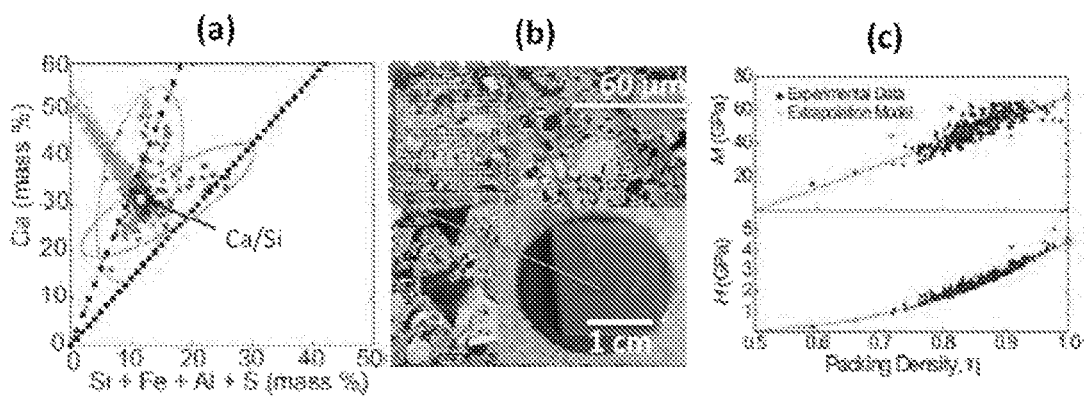
FIG. 7 illustrates compositional and mechanical characterizations of CSH phases. Panel a shows elemental composition analysis using multivariate cluster approach to identify distinct phases. Panel b illustrates a synthesized C—S—H specimen. The inset shows ~400 imprints of a grid nanoindentation test. Panel c is a plot showing the indentation modulus (M) and hardness (H) of the grid points in panel b as a function of packing density.

A complete description of the structure, crystallinity, composition, mechanical and thermal behavior of the pseudowollastonite, feedstock materials and resultant products, can provide guidance for synthesis and refinement of the processes. The stability of waste materials and CSH and other mineralized phases can facilitate their characterization by TEM and high resolution TEM (HR-TEM) analysis as well as by Selected Area Electron Diffraction (SAED) studies on the crystalline particles. Under optimal conditions, HRTEM can achieve atomic resolution and, coupled with SAED, can distinguish the crystalline/noncrystalline phases of the specimen. When this is not feasible, polycrystalline diffraction patterns in the TEM can be indexed to determine if one or more phases are present. Such results can be used to generate maps of the different grain sizes and crystalline phases on a large (micron) length scale, providing an understanding of their effects in the curing process and product formation. Ensemble and local composition can be determined by spectroscopy and diffraction. X-ray photoelectron spectroscopy (XPS) and inductively coupled plasma atomic emission spectroscopy (ICP-OES) can be used to determine overall elements content (e.g., Ca/Si ratio, FIG. 7, panel a). Mechanical and thermal properties can be characterized using various relevant materials science characterization techniques. For instance, thermogravimetric analysis (TGA) can confirm the thermal stability of the developed materials as well as carbon content, and nanoindentation experiments can provide localized stiffness/hardness of the materials. Standard compressive test of cement/coupons (Task 4) can provide insight into homogenized properties, which can limit the understanding and control of the influence of different phases, impurities, and porosity, etc. on the final product. A grid technique can be used to evaluate heterogeneous materials, in which several locations of the heterogeneous mineral phases (see FIG. 7b-c) are indented and the statistical averages of the results are used to compute stiffness and hardness. Fourier-transformed infrared spectroscopy (FTIR) can also be used to characterize the nature of bonding (OH, C—O, etc.) and monitor effectiveness of the cured product under various conditions.

Task 2. Optimizing the Manufacture of $C^5$ Cements and Precast Set-Up.

The curing processes that result in the formation of $C^5$ cements involve a combination of hydration (reaction with water) and carbonation (reaction with $CO_2$). While the fundamental chemistry of pseudowollastonite hydration and carbonation has been and will continued to be studied, the focus here will be on understanding the ways in which this chemistry can be leveraged to produce optimal cement performance.

Studies can be performed to optimize aspects of the curing process, including $PCO_2$, T, P, pH, and hydration conditions. A 2 k factorial design of experiments can be used to enable an analysis of variance (ANOVA) that can be used to evaluate the relative importance of these factors on controlling carbonation rates. To narrow down the phase space of the large parameters, Taguchi-based design can be used to achieve the key parameters orthogonally. Parameters within the following ranges will be evaluated: $P_{CO2}$=0-200 psi, T=90-150° C., P=0-200 psi, pH=4-11.

Besides conventional precast technology where mixing, homogeneity, humidity, etc. can be precisely controlled, initial efforts can focus on understanding the effect of two external stimuli (heat and pressure) on $C^5$ precast concrete products. Towards this end, 2" cubic mortar samples and 6"×12" cylindrical concrete samples can be fabricated using the $C^5$ cement, sand, gravel (for concrete), and $CO_2$ and water to solidify the mixture. Via applying two external stimuli, i.e., pressure and heat, the reaction rate of the cement/concrete components can be greatly expedited. First, the well-combined mixture can be heated at various temperatures (e.g., from ~90° C. to 200° C.) to examine the thermal effect on the reaction kinetics of the components and on the properties of the final concrete product. The concrete products can be demolded after drying. The properties of these materials can then be evaluated (see Task 4 below).

Figure 8:
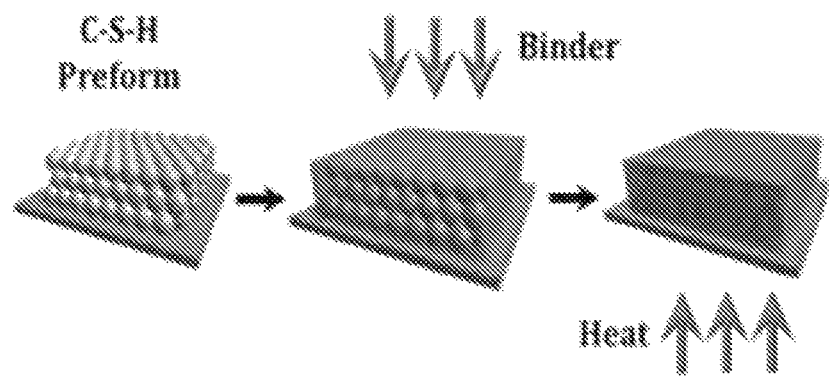
FIG. 8 is a schematic illustration of a porous C—S—H preform subjected to the $CO_2$/water binder and heat treatment.
Figure 9:
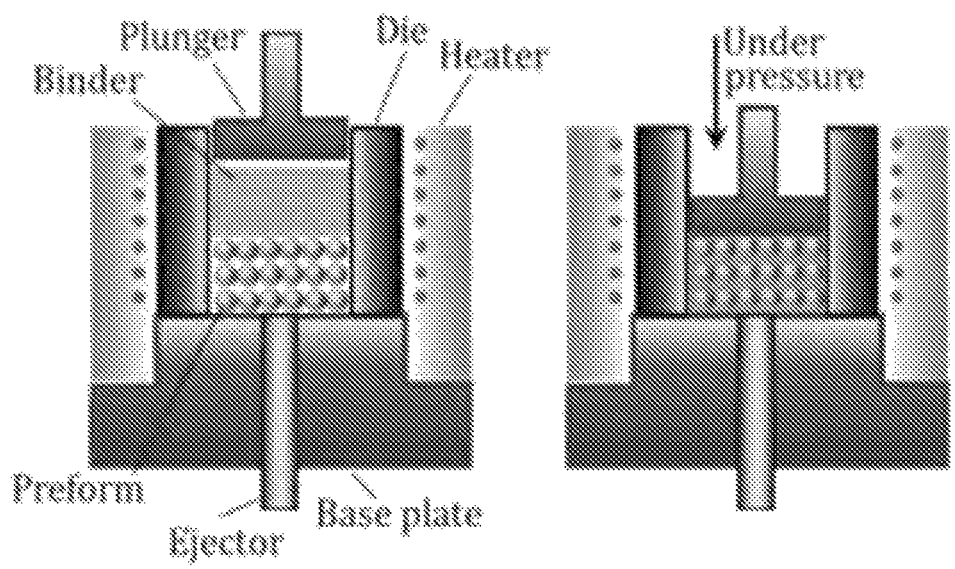
FIG. 9 is a schematic illustration of pressure infiltration.

For the second stimulus (pressure), porous preforms, prepared by compacting the sand and gravel under low compaction pressure to form a desired shape, can be used. The porosity of these preforms ranges between 40 to 50%. The porous preform that is compacted under low pressure in the die can then be exposed to $C^5$ cement, $P_{CO2}$ and water solution inside the mold such that the solution fills the pores and acts as the binder to form an interconnected, bonded network between the components in the preform. The plunger can then gently apply a very low pressure on the binder until it fully incorporates into the preform which can be thermally treated, such as at different temperatures of 90° C.-200° C. (FIGS. 8,9). The plunger can be stopped for a specified duration at this position and then be released so that the preform can be ejected from the mold. The outcome will be a precast sample, which can have good properties and develop strength rapidly (e.g., within hours).

Task 3. Optimizing Manufacture of Precast Concrete Products.

Precast concrete can be fabricated using the $C^5$ cements obtained above (and using the apparatus described above). Tuning the concrete properties is feasible by modifying its components. An example $C^5$ cement concrete mixture can include ~10-20% water, ~10-15% $C^5$ cement, and ~60-70% gravels (fine & coarse aggregate). Cross-correlation of sand and gravel components with the $C^5$ cement paste can be examined.

Figure 10:
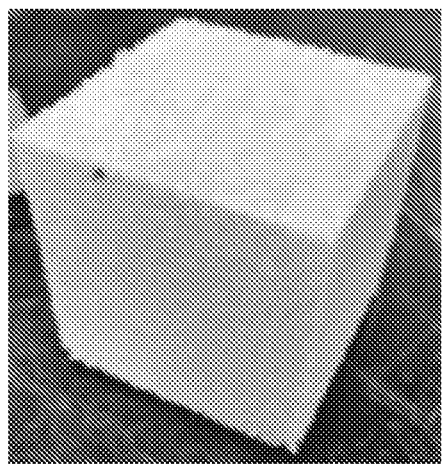
FIG. 10 illustrates a prototype 2" mortar cube made with $C^5$ cement.

Sand can be provided in accordance with the ASTM C33 (ASTM C33/C33-18 entitled "Standard Specification for Concrete Aggregates" (2018), which is hereby incorporated by reference in its entirety) and various proportions (following ASTM C109/C109M-16a entitled "Standard Test Method for Compressive Strength of Hydraulic Cement Mortars Using 2-in. or [50-mm] Cube Specimens" (2016), which is hereby incorporated by reference in its entirety) can be examined in conjunction with the $C^5$ cement, e.g., cement/sand (wt %): 20-40 wt %. Varying amounts of water can be added to the mixture to fabricate the 2-in cubic prototypes (FIG. 10). The interactions and bonding between our optimized $C^5$ cement hydrate and sand can be investigated by characterizations of the individual sand particles, e.g., SEM. In addition, the performance of the final cubes can be inspected using the standard procedures detailed in Task 4 below. The results for $C^5$ cements can be compared with samples that are created using OPC (or other cements).

Coarse aggregates typically comprise more than 40 wt % of the total mixture in OPC concrete. Angular gravel is usually sourced from quarries, whereas rounded gravel is from a fluvial source, such as river beds or beaches. Both aggregate types can be used as course aggregate sources to prepare concrete samples using $C^5$ cements. For example, three proportions of the gravels, i.e., gravel/concrete (wt %): 40, 45, 50, can be added to the concrete mixture while the cement/sand ratio can be chosen based on results of the optimization described above. Water in the form of a slurry containing Ca and Si and $CO_2$ (e.g., identified in Task 1 above) can be used to make 6"×12" cylindrical concrete prototypes using a precast setup. The quality of bonding between optimized $C^5$ cement-based mortar and gravel can be investigated via SEM. In brief, the work in Task 3 can use C5 cement formulae to fabricate precast concrete samples, which can be tested against standards as described below.

Task 4. ASM/ACI/AASHTO Testing Standards.

The fabricated C5 cement and concrete products can be tested to determine if these materials meet and/or exceed key standard tests. If needed, the fabrication protocols can be refined to provide materials that meet such performance standards. In parallel, sector-based life cycle costing can be carried out to understand which markets are most likely to benefit from $C^5$ cement-derived products.

Figure 11:
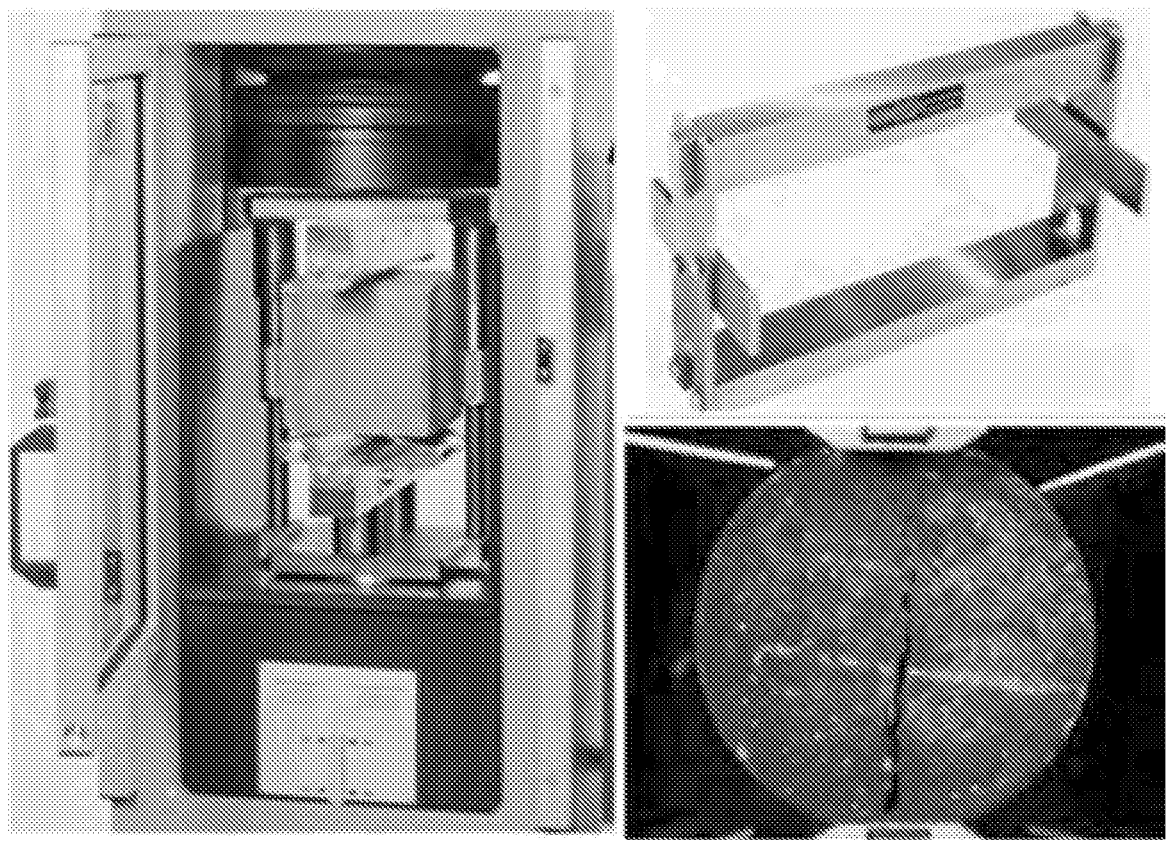
FIG. 11 illustrates the compressive testing of 2" cubes and splitting tensile test for 6"×12" cylinders.

Mechanical properties tests can include compressive and tensile strengths, ductility, toughness, and elastic modulus. The prototypes fabricated above can be cured for 3, 7, and 28 days in accordance with ASTM C192 (ASTM C192/C192M-18 entitled "Standard Practice for Making and Curing Concrete Test Specimens in the Laboratory" (2018), which is hereby incorporated by reference in its entirety). While these cure times are used for comparative study, the $C^5$ formulations may not need 28 days to fully cure. Compression tests can be carried out on the cured cubic and cylindrical prototypes following the ASTM C109 (ASTM C109/C109M-16a entitled "Standard Test Method for Compressive Strength of Hydraulic Cement Mortars (Using 2-in. or [50-mm] Cube Specimens" (2016), which is hereby incorporated by reference in its entirety) and ASTM C39 (ASTM C39/C39M-18 entitled "Standard Test Method for Compressive Strength of Cylindrical Concrete Specimens" (2018), which is hereby incorporated by reference in its entirety), respectively. For the 2" cubic mortar samples, and 6"×12" concrete cylinders, a Forney® compression machine with dual load cells can be used to measure the compressive strength and axial deformation. The tensile strength of the concrete product can be determined by an indirect test method, i.e., splitting (Brazilian) test, via ASTM C496 (FIG. 11, see also ASTM C496/C496M-17 entitled "Standard Test Method for Splitting Tensile Strength of Cylindrical Concrete Specimens" (2017), which is hereby incorporated by reference in its entirety). Similar to the compressive tests, stress-strain curves can be plotted and the elastic modulus of the samples can be calculated from this curve based on ASTM C496. Using the methods described herein, $C^5$ cement concrete samples (6"×12" cylinders) can be prepared that exhibit at least 80% improved compressive strength, compared to OPC.

Figure 12:
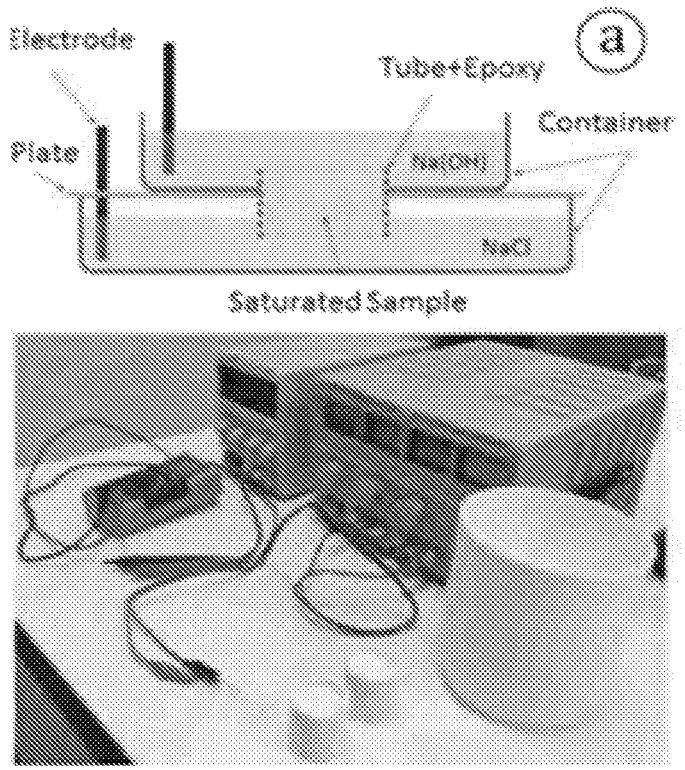
FIG. 12 illustrates electrical resistivity testing equipment.

Durability (analogous to permeability) is another important property of cement and concrete products. The durability of $C^5$ prototypes can be assessed using three different techniques: electrical resistivity (ASTM C1202-19 entitled "Standard Test Method for Electrical Indication of Concrete's Ability to Resist Chloride Ion Penetration" (2019), which is hereby incorporated by reference in its entirety), chloride diffusivity (AASHTO T260 entitled "Standard Method of Test for Sampling and Testing for Chloride Ion in Concrete and Concrete Raw Materials" (2009), which is hereby incorporated by reference in its entirety), and sulfate expansion (ASTM C452-19e1 entitled "Standard Test Method for Potential Expansion of Portland Cement Mortars Exposed to Sulfate" (2019), which is hereby incorporated by reference in its entirety). For the cubic mortar samples, a test set-up designed and built to measure the electrical charge passing through the samples can be used (FIG. 12). For chloride diffusivity, the coefficient of diffusion of chloride into the samples can be calculated using Fick's law. The sulfate expansion test can compare the dimensions of the samples before and after the exposure to sulfate. The results of all three tests can be compared to make a unifying assessment on durability. Using the methods described herein, $C^5$ cement concrete samples can be prepared that exhibit 70% improved durability relative to OPC.

Bulk density of the prototypes can be measured using the methods described in ASTM C29 (ASTM C29/C29M-17a entitled "Standard Test Method for Bulk Density ("Unit Weight") and Voids in Aggregate" (2017), which is hereby incorporated by reference in its entirety) and AASHTO T19 (AASHTO T19M/T19 entitled "Standard Method of Test for Bulk Density ("Unit Weight") and Voids in Aggregate" (2014), which is hereby incorporated by reference in its entirety). Porosities of the prototypes will be calculated using water and in accordance with ASTM C29 (ASTM C29/C29M-17a entitled "Standard Test Method for Bulk Density ("Unit Weight") and Voids in Aggregate" (2017), which is hereby incorporated by reference in its entirety).

Shrinkage tests will be performed using the protocol described in ASTM C157 (ASTM C157/C157M-17 entitled "Standard Test Method for Length Change of Hardened Hydraulic-Cement Mortar and Concrete" (2017), which is hereby incorporated by reference in its entirety) by calculating the difference in the prototypes' length after certain periods of time. The coefficient of thermal expansion of the prototypes can be measured following the standard procedure of CRD-C39-81 (entitled "Test Method for Coefficient of Linear Thermal Expansion of Concrete" (1981), which is hereby incorporated by reference in its entirety). The dimensions of the samples can be measured using high-accuracy calipers before and after testing. Then, using the standard equation for the linear coefficient of thermal expansion, the average coefficients will be calculated. Additionally, there are other standard tests such as creep (ASTM C512/C512M-15 entitled "Standard Test Method for Creep of Concrete in Compression" (2015), which is hereby incorporated by reference in its entirety), freeze-thaw test (ASTM C666/

C666M-15 entitled "Standard Test Method for Resistance of Concrete to Rapid Freezing and Thawing" (2015), which is hereby incorporated by reference in its entirety), and ignition loss (ASTM C114-18 entitled "Standard Test Methods for Chemical Analysis of Hydraulic Cement" (2018), which is hereby incorporated by reference in its entirety) that can be used to evaluate the cement. Using the methods described herein, $C^5$ cement concrete samples can be prepared that exhibit comparable shrinkage and thermal expansion relative to OPC. The $C^5$ cement and concrete prototypes can be characterized via ASTM, ACI, and AASHTO standards.

Example 2. Strategies for the Preparation of $C^5$ Cements

Portland cement is one of the most important building materials used in civil infrastructure, but it is highly energy intensive to produce and susceptible to corrosion in many environments. A goal of this work is to enable the development of next-generation chemically-stable cements made from industrial waste streams by studying the reaction of pseudowollastonite (PWOL), a high-temperature polymorph of calcium silicate, with $CO_2$ and water. The products of this reaction have characteristics in common with the cements used by ancient Roman engineers. Roman cements have been studied because they seem to strengthen over time under conditions that would readily degrade modern Portland cements. The high strength and chemically stable PWOL cements described herein form most readily under the high $P_{CO2}$, high temperature, and high humidity conditions that could be achieved by curing these materials using flue gas from a thermal power plant. By developing the fundamental physicochemical understanding of PWOL cements as well as the life cycle and techno-economic knowledge, PWOLs can be produced economically and sustainably at scale.

Figure 13:
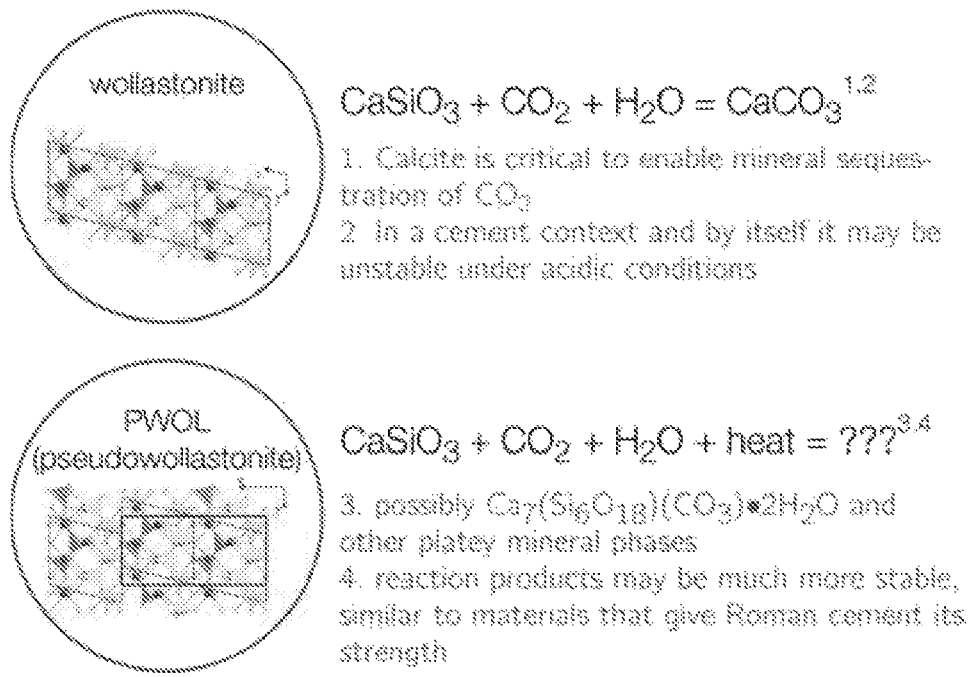
FIG. 13 is a schematic illustration of wollastonite and pseudowollastonite (PWOL). The carbonation of calcium silicate is well understood for wollastonite, but much less for PWOL.

The reaction of solid calcium silicate ($CaSiO_{3(s)}$) with aqueous carbon dioxide ($CO_{2(aq)}$) is an important weathering process in geochemical cycling at global scales (FIG. 13). The primary product of this reaction is solid calcium carbonate ($CaCO_{3(s)}$), which is chemically stable under many conditions, but is susceptible to dissolution under acidic conditions. In the course of developing a sealing technology for geologic carbon storage efforts, it was discovered that PWOL reacts quite differently with $CO_2$ at high temperatures to form chemically stable and mechanically strong products likely including calcium silicate carbonates as well as sodium- and calcium-containing hydrates that bind intimately with calcium carbonate. Preliminary results suggest that scawtite ($Ca_7(Si_6O_{18})(CO_3)\cdot 2H_2O(s)$), magadiite ($NaS_{17}O_{13}(OH)_3\cdot 4(H_2O)$), and/or gyrolite ($NaCa_{16}Si_{23}AlO_6(OH)_8\cdot 14H_2O$) may be formed in addition to calcite.

These reactions can be deployed at scale to generate mineral products with commercial application and with much lower carbon intensity than conventional cements. PWOL appears in many industrial waste streams including slag from cement and steel production. The global scale availability of PWOL has yet to be fully characterized since it has not been considered to be a valuable industrial chemical in its own right. The carbonation and hydration of PWOL can be performed at high temperatures (e.g., ~100-1200° C.) and elevated partial pressures of $CO_2$, which are available in flue gas streams and so manufacturing and production could leverage waste heat and $CO_2$ from power plants. Our experiments further suggest that some cations (like $Na^+$) could also be playing a role in the formation of some of reaction products. So, waste glass and/or ocean or brackish water (both as cation donors) can also be used during the production and curing of these materials. In effect, the proposed material could leverage waste from power plants and cement kilns to generate a value-add product that is chemically and physically superior to alternatives on the market.

These cements can be suitable for use in a range of harsh environments where existing Portland cement has performance limitations. Examples include sealing of abandoned and leaking natural gas wellbores and stabilization of abandoned mines. Coastal environments are corrosive to conventional cements, and new materials and approaches for stabilizing coasts in response to intensifying storms are needed. Unlike modern Portland cement, which decays over decades, particularly in the presence of water, Roman cement has been found to gain strength over time and retard the spread of microfractures. Its strength and resilience come from the hydration of calcium oxide and pozzolana, a porous silica mineral with high concentrations of cations such as $Na^{2+}$, $Ca^{2+}$, and $Mg^{2+}$, which produces crystalline calcium-silicate-hydrate phases such as tobermorite and stratlingite. Not only do these products provide excellent strength characteristics but, more importantly, they resist the attack of alkali cations, which accelerates the disintegration of typical Portland cement. While Roman cement has proven itself to be among mankind's most impressive building materials, its production is severely limited by the need for volcanic ash or rock that is only available in certain regions of the world. The carbonation of PWOL produces reaction products that are similar in composition to the crystalline phases present in Roman cement, such as gyrolite. PWOL seems to undergo unique interactions with aqueous phase $CO_2$ that contributes to its dissolution and influences its precipitation as hydrated crystalline phases containing calcium, silica, and sodium.

INTRODUCTION

The chemistry of ordinary Portland cement (OPC) is complex and varied. Many of the relationships between molecular and macroscale properties in cements are based on the ratio of CaO to $SiO_2$ in CSH gel. OPC contains a high ratio of calcium oxide to silica (at least 2 in the mixture) so its CSH precipitates have a moderate to high Ca:Si ratio (typically 1.4-2), with the remaining Ca as calcium hydroxide. Some of these differences are mapped on FIG. 2, which reports ratios from the perspective of the silicate hydrate, not the initial cement mix, since much of the Ca is lost to CaOH. Roman cements have much lower Ca:Si ratios. For example, Tobermorite exhibits a $CaO:SiO_2$ ratio of approximately 0.7:1.9 OPC derives its strength primarily from the calcium silicate hydrate (CSHs) gels that form when dicalcium and tricalcium silicates ($Ca_2SiO_4$ and $Ca_3SiO_5$) are hydrated. Both of these reactions generate CSH gels and, up to 15% by volume, calcium hydroxide (CaOH). CaOH does not contribute to the overall strength of concrete and is water soluble in many environments, contributing to increased porosity of the concrete which accelerates the dissolution and degradation of its integrity over time.

The degradation of OPC is problematic in road, marine, or subsurface applications where dissolved magnesium, sulfate, sodium, and carbonate have been shown to quickly dissolve calcium hydroxide and CSH gels. While the precipitates from these reactions (ettringite, brucite, aragonite, for example) are often insoluble, they can promote adsorption of water, which can cause the material to swell within the bulk of the concrete structure and this can generate internal pressure, which can crack the concrete. The failure of OPC-based concrete continues as fractures develop between the cement binder and the sand or aggregate. As these microcracks form, there is little to stop their propagation, enabling infiltration of water and freeze-thaw cycles that further degrade the integrity of the material. In reinforced structures these fractures allow water, often containing high salt concentrations, to reach metal reinforcements leading to corrosion, opening even more fractures and negating the tensile strength of the concrete, allowing further degradation to occur.

In addition to these issues, OPC concrete comes at a high environmental cost. The raw material for most OPC is calcium carbonate (limestone), which must be mined, transported to manufacturing facilities and heated to approximately 1400° C. to form clinker. This clinker is mixed with gypsum to create cement. The manufacturing of OPC requires approximately 60-130 kg of fuel oil and 110 kWh of electricity per tonne of OPC and generates one tonne of $CO_2$ from the calcination of $CaCO_3$ alone. Annually, cement production contributes approximately 5% of global $CO_2$ emissions.

In an effort to address some of the challenges of conventional cement, formulations of wollastonite $(CaSiO_3)^-$ based cements have been developed (Solidia Technologies, Inc.). Solidia cements contains no calcium hydroxide only calcite and silica. Their pre-formed concrete structures are made by mixing wollastonite $(CaSiO_3)$ and sand (aggregate) with a small amount of water. The resulting structures are then cured/dried in gas-phase $CO_2$ for >20 hours at 70-90° C. and atmospheric pressures. The resulting solid phase consumes a significant amount of $CO_2$ in the form of calcite $(CaCO_3)$. Solidia is making outstanding progress toward developing a more carbon neutral alternative to conventional Portland cement, though the high concentration of calcite in their product leaves it susceptible to acid attack. The dissolution of calcite by weak acids is the same process that leads to the creation of sinkholes and caves from groundwater in some environments or the dissolution of statues from acid rain in others.

In contrast to conventional cements or Solidia cements, ancient Roman cements have been found to contain high concentrations of platy mineral phases, such as tobermorite and stratlingite, which penetrate and transect amorphous and porous silica phases, dramatically improving the mechanical strength of the aggregate. Aluminum substitution of the tobermorite phase is thought to be an important characteristic providing a great deal of chemical stability to the reaction products from the irreversible binding of alkali cations and mitigation of damaging alkali silica reactions. In Portland cement, the ratio of CaO to $SiO_2$ may not be less than 2. Roman cements exhibited lower calcium content and higher silica content. Specifically, the Romans used 1-part CaO (derived from limestone) to 2-3 parts pozzolana, which is mostly porous $SiO_2$. The pozzolana was regional volcanic rock that often displayed high concentrations of ions such as sodium, chloride, potassium, calcium, magnesium, and, importantly, aluminum. The cement quickly gained strength via hydration reactions where these ions, CaO, and water generated C(A)SH phases that transected the highly porous, inert $SiO_2$. Over time, these hydrated phases, such as tobermorite, become crystalline and, because they are insoluble in most natural environments, the cements gained considerable strength over time. A testament to the incredible strength and resilience of these cements is the Pantheon's dome, which is still the world's largest unreinforced concrete dome, with a diameter of 43 meters.

Figure 14:
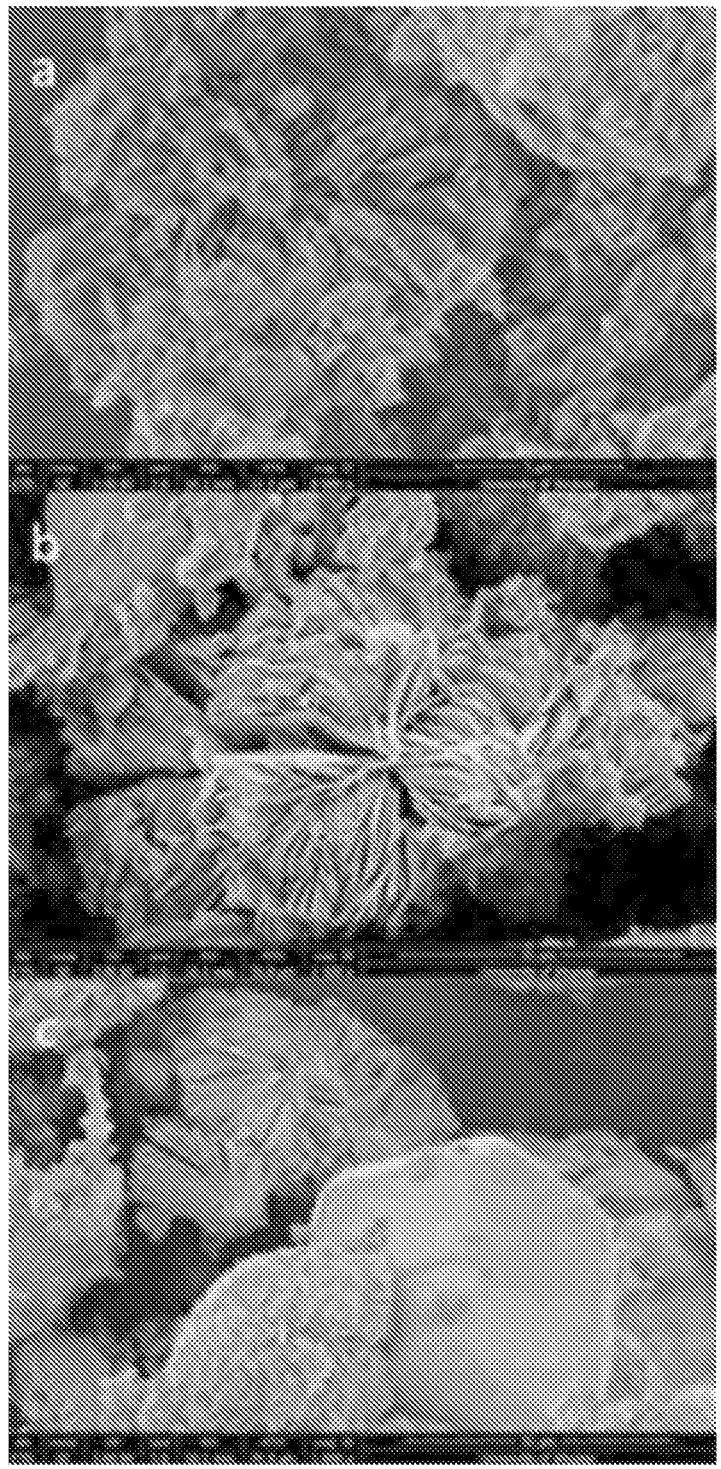
FIG. 14 shows SEM images of structured plate-like crystals resembling magadiite coexisting with CSH gel (panel a), without CSH gel (panel b), and with calcite (panel c).

Ongoing work has sought to control fluid flow in the deep subsurface by using PWOL nanoparticles and $CO_2$ delivered selectively into geologic formations. To replicate in situ conditions, artificial porous media was synthesized using sintered soda lime glass beads and injected PWOL powders into the pore space and subjected the system to elevated temperatures and pressures in the presence of aqueous $CO_2$. Much like the chemistry of the Solidia system, only calcite and amorphous silica were expected to precipitate. Instead, flower- and plate-like structures were observed that coexisted with calcite and CSH gel, as shown in FIG. 14. Further experiments and analyses revealed that these phases were forming in high pH conditions, in the presence of sodium, which was leaching from the glass beads. Under the same conditions, we have been unable to produce these phases using wollastonite, suggesting that differences in dissolution/precipitation between PWOL and wollastonite are not simply based on reaction kinetics. Our experiments suggest that PWOL-based cements could combine some of the most desirable carbon storing aspects of Solidia cement with the hardening and strength aspects of Roman cements. A summary of these qualitative differences between cement types, and their implications for performance and applications is provided in Table 1 above.

It is hypothesized that under suitable experimental conditions, the dissolution of calcium and silica from PWOL are stoichiometric and generate ideal pore concentrations to facilitate the growth of Ca:Si crystalline phases. Further, it is hypothesized that dissolved $CO_2$ plays an integral role in triggering precipitation, possibly by lowering pH slightly, causing supersaturation of the solution with regard to silica as suggested in the magadiite system. Experimental work suggests that the chemistry of the $PWOL-H_2O-CO_2$ system is fundamentally different than that of OPC and wollastonite, which can open new horizons in developing next-generation cement systems. PWOL, which is relatively rare in nature (but found near volcanoes like the materials used in Roman cements) is abundant in some industrial waste streams including cement kiln dust and understanding its availability and suitability for use as a raw material for waste-to-cement processes is a critical research gap.

Objectives

An overarching objective of the work described herein is to characterize the potential to deploy carbonated and hydrated PWOL as a building material made by processing and combining several waste streams. Preliminary work suggests that PWOL-based materials could exhibit exceptional strength and durability that are not achievable using conventional chemistries. To fully understand the potential of PWOL cements, fundamental chemical and mechanical tests of its hydration and carbonation are needed alongside a full understanding of the industrial ecology of this process. In order to develop this body of knowledge, two complimentary and sequential research objectives have been defined that will explore how these materials might be deployed:

(1) Characterize the chemistry of PWOL hydration/carbonation at high temperatures and ionic strengths and measure the mechanical properties of the resulting cements; and
(2) Quantify the systems-scale potential to deploy PWOL cements using industrial waste streams as feedstocks.

BACKGROUND

There is a large amount of work ongoing related to advanced cements and accelerated weathering and this section describes some of the most relevant contributions and the knowledge gaps the proposed research seeks to fill.

Environmentally preferable cement materials. Concerted efforts to reduce the environmental burdens of cement production over the past two decades have focused on using waste material and minimizing production processes to avoid environmental impacts. Among the most prevalent efforts in this regard are the substitution of fly ash (typically 15-20%) for cement, the use of natural pozzolans, the use of waste materials, and the incorporation of nanocomposites into the cement matrix. Each of these technologies offers unique advantages and disadvantages compared to OPC. All cement alternatives are subject to constraints related to the availability of feedstocks used in their formulation and by the cultural/technical preference of construction/concrete engineers. Substitutes for OPC should offer clear performance and cost benefits if they hope to impact the market.

Mechanical and Chemical Testing of Cements. The development and testing of novel concrete formulations is a mature field of academic research. Despite this, the relationship between molecular-scale properties and macroscale behavior is still an active area of research. A number of strength criteria have been proposed to describe the state of stresses in cement at failure. Of these, several key parameters are used widely to describe the behavior of a sample: friction coefficient, cohesive strength, unconfined compressive strength, Young's Modulus, Poisson's Ratio, and tensile strength. All of these can all be calculated using unconfined compression testing. Methods for evaluating the chemical stability of cements are also well developed in the literature. Broadly speaking, moisture content, ion composition, and gas partial pressure are all important for understanding the mechanisms that govern chemical degradation of cement.

Carbonation of conventional cements. Carbonation of OPC occurs naturally from the $CO_2$ in air and can affect the long-term performance of the material. In addition to changing the pH of concrete, the carbonated products in cement undergo an increase in compressive strength and decreases in deformation ability. Carbonated concrete was found to perform poorly in earthquake resistance. While carbonation may have a negative effect on reinforced concrete, the compressive strength increase is a benefit to non-reinforced concrete, such as concrete bricks. In addition to strength gain, carbonation of these concrete products also serves as a means by which carbon dioxide can be stored. Through accelerated carbonation experiments on conventional concrete blocks, 16% $CO_2$ uptake and improvements in strength have been demonstrated. Tests on several types of concrete blocks that had been subjected to accelerated carbonation showed that the presence of fly ash increases the amount of $CO_2$ sequestered, although strength gain was insufficient.

Accelerated weathering of mineral silicates. Mineral carbonation has been studied extensively as a strategy for capturing and storing $CO_2$, calcium, magnesium, and iron-bearing silicates (e.g., $CaSiO_3$, $MgSiO_3$, or $FeSiO_3$) react with $CO_2$ at high pressures and temperatures to produce stable solid carbonate products. Even though mineral carbonation is considered a safe and permanent means of storing $CO_2$, the energy and logistical burdens of mining and moving these raw materials as well as the reactors needed to carbonate at high pressure, have prevented its wide scale adoption. Work has shown that geologic formations could be used for in situ mineral carbonation. In these formations, where only natural fracture networks exist, the mineral precipitation reactions resulted in an increase in permeability because the dissolution/precipitation chemistry within the rock led to complex geochemistry with unexpected outcomes. Efforts to develop accelerated weathering in terrestrial environments has been proposed and is an interesting bounding condition for the viability of accelerated weathering—only a few mm of finely ground silicate spread on all terrestrial surfaces of the earth would be enough to remove all the $CO_2$ from the atmosphere.

Figure 15:
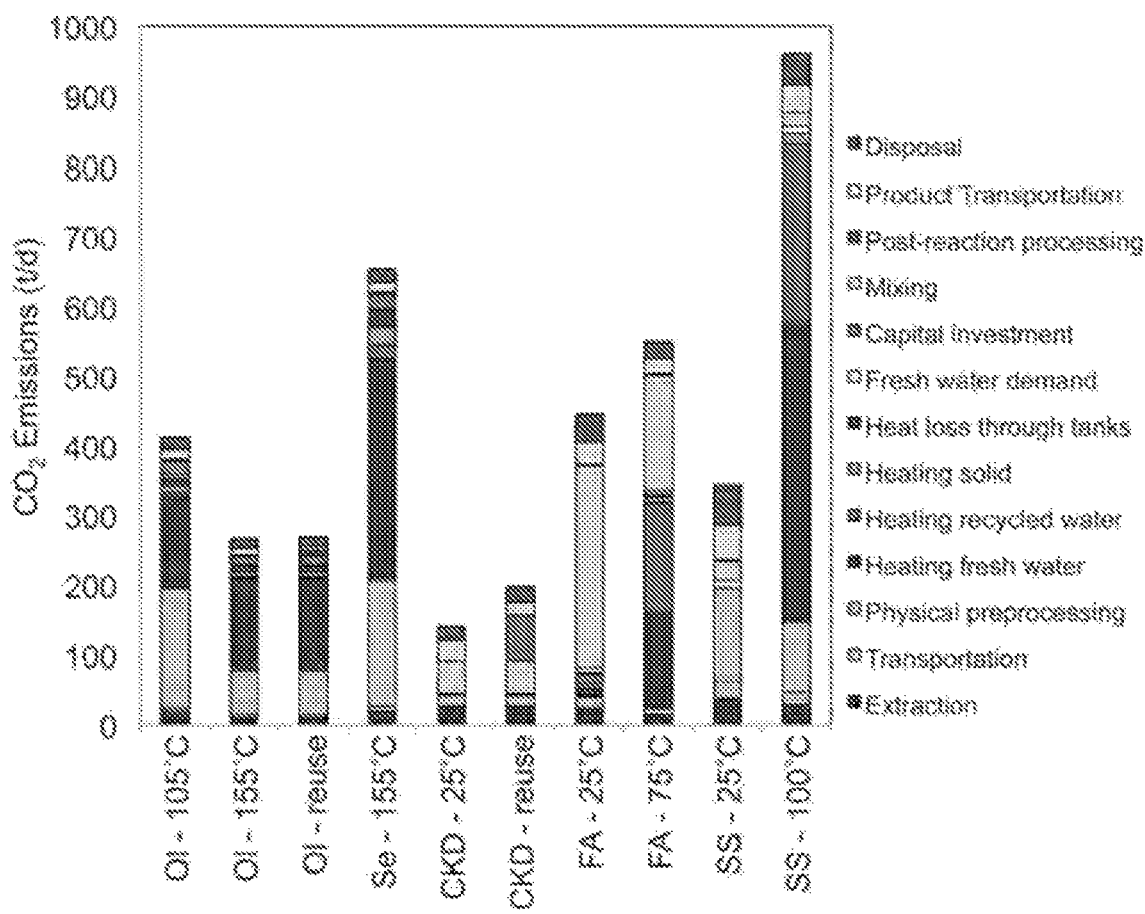
FIG. 15 illustrates the life cycle carbon intensity of various mineral carbonation processes. Cement kiln dust (CKD), which is a rich source of PWOL, has one of the lowest carbon emissions per 1000 tCO$_2$ sequestered per day. Olivine (Ol), cement kiln dust (CKD), coal fly ash (FA), and steel-making slag (SS).

Carbon utilization of alkaline waste streams. An alternative to accelerated weathering of mineral silicates is to use alkaline waste streams as a source of divalent metal cations for precipitating solid carbonates. The availability and viability of various different industrial byproduct streams for mineral carbonation including fly ash, cement kiln dust (CKD), steel slag, and red mud (FIG. 15) should be considered. Of those, fly ash is the most abundant. It is already incorporated into cement at high rates, the nation-wide drop in coal production has begun to limit the availability of high-quality fly ash available for cement applications. The second most abundant industrial source is CKD (~18 million tons/yr). Even though a great deal of progress has been made in understanding the availability of alkaline waste streams, little is known about how certain streams might be processed or separated to produce the materials needed to form PWOL cements.

Industrial ecology of cement. Life cycle assessment (LCA), techno-economic analysis (TEA) and other tools of industrial ecology have been used extensively to evaluate the environmental performance of different building materials. LCA is a quantitative tool for evaluating the energy and resource inputs and outputs associated with a given product or process. The life cycle of concrete is dominated by the production of cement, which is incredibly energy intensive to manufacture. Techno-economic analysis of cements suggest because of the large masses involved, transportation is economically rate limiting. Efforts to address these burdens have focused largely on incorporating materials into the mix that do not compromise performance while reducing the need for cement. The most common additive of this type is fly ash from coal combustion processes. Fly ash is rich in calcium oxides, which can improve the strength of the resultant concrete. Through fly ash varies considerably by generating facility and most of the high-grade fly ash is already used. No work has focused on understanding the availability of PWOL and its colocation with other waste streams.

Summary. Efforts to develop low-carbon alternatives to cement and accelerated weathering technologies have been widespread over the past decade. Despite this, very little research has focused on the role that PWOL specifically could play in enabling technology to achieve a number of desirable outcomes. Several fundamental gaps in the knowledge should be resolved in order to fully evaluate benefits of the approach proposed here:

(1) Dissolution/precipitation of PWOL hydration and carbonation has not been reported and little is known about the role that cation concentration and temperature, in particular, play in these processes;

(2) The chemical stability of the produced mineral phases and the mechanical strength of the cements they create has not been measured; and (3) The availability of PWOL in industrial wastes and its co-location with other necessary waste streams has not been studied.

Plan of Work

To date, little fundamental research has been directed toward describing and quantifying the relationship between PWOL reaction products, the concentration of reactants including $CO_2$ and metal cations, reaction conditions such as pressure and temperature, and the long-term mechanical and chemical stability of the reaction products. Based on the desire to fill these research gaps and advance an overarching goal of developing materials that can be used in corrosive environments, this project will pursue four research tasks.
Task 1. Characterize the Chemical Kinetics of PWOL Carbonation and Hydration Under a Range of Natural Water and Atmospheric Conditions.

Figure 16:
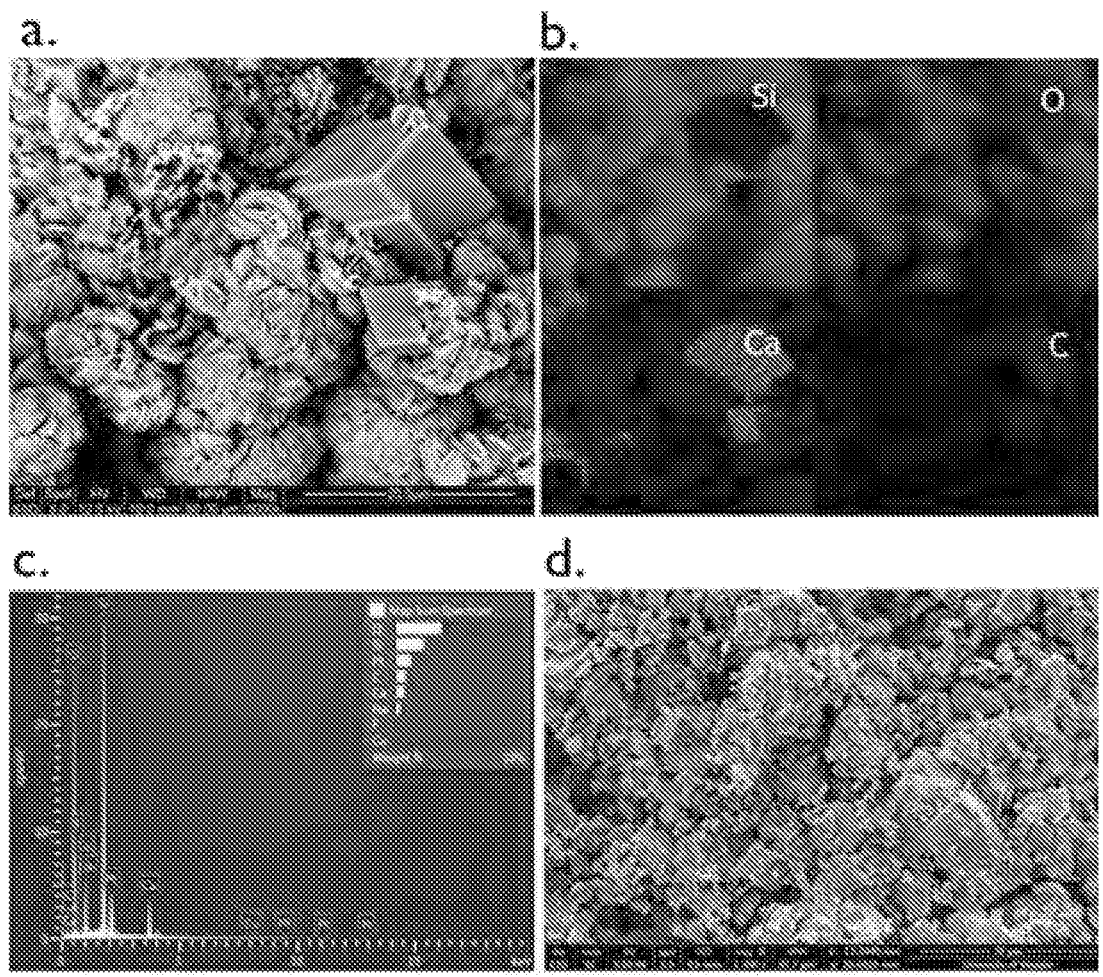
FIG. 16 shows example SEM (panel a) and EDS (panel b, panel c) analysis of various PWOL products after carbonation. Hydrated flower-like structures exist alongside (panel a) calcite, compared to (panel d) unreacted PWOL.

The carbonation of wollastonite is well characterized for a wide range of environmental conditions including elevated temperatures and pressures. In contrast, almost nothing is known about the reactivity of PWOL. In this task, we will explore the reaction products produced during the carbonation and hydration of PWOL (FIG. 16). Specifically, the equilibrium characteristics of products that form under a range of temperatures, pressures, $P_{CO2}$ values, and ionic strengths will be investigated. A question to be answered in this task is this: Why does the aqueous carbonation of PWOL result in different products than wollastonite? A corollary to this question is: How can these differences be leveraged to engineer better materials?

Just as the calcium to silica ratio is important in governing hydration characteristics in typical cement, it is hypothesized that the manner in which calcium and silica dissolve from pseudowollastonite is important for generating dissolved aqueous concentrations that are conducive to hydrate formation. An example of differing dissolution properties between polymorphs is that of calcite and aragonite, which are each dominant under different environmental conditions. To characterize the differences in dissolution/reactivity between PWOL and wollastonite, a series of small batch experiments can be conducted for a range of representative conditions to evaluate the solid state and aqueous-phase characteristics of the reactions. Initial experiments can take into account temperature (e.g., T=50, 100, 120, 200° C.), partial pressure of $CO_2$ ($P_{CO2}=10^{-3}$, $10^{-2}$, $10^{-1}$, $10^1$ atm), NaCl concentration (I=0, $10^{-2}$, $10^{-1}$, 1 M), as well as pH over time. These experiments can be carried out in Teflon-lined stainless-steel pressure vessels with Teflon sample holders. For each experiment, a small quantity of PWOL and wollastonite can be placed in each holder but within the same aqueous environment. Small quantities and unstirred conditions will eliminate mass transfer effects.

Figure 17:
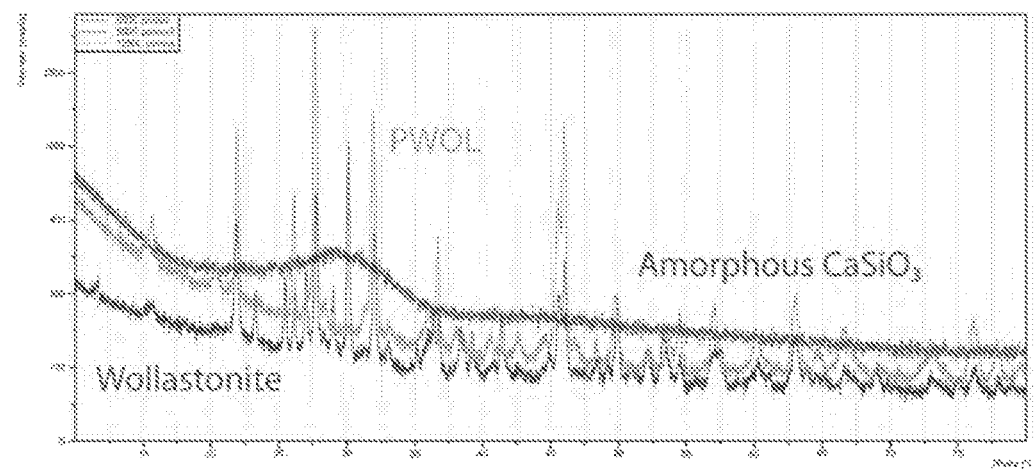
FIG. 17 shows XRD scans of the wollastonite and pseudowollastonite synthesized during studies, which agree well with diffraction patterns for these materials.

Experiments in this task can be carried out using wollastonite and PWOL that are synthesized internally to ensure control over the material properties. A gel combustion reaction can be used. The ash from the combustion can be either calcined at 950° C. to produce wollastonite or at 1225° C. to produce pseudowollastonite. The powders are then ground to specific sizes. XRD analyses have confirmed that this method of synthesis produces both wollastonite and PWOL with high purity as shown in FIG. 17.

Experiments to determine the dissolution characteristics of both wollastonite and PWOL can be conducted in parallel in separate batch systems. Powders as well as the aqueous solutions can be sampled over time. Powders can be analyzed via Transmission Electron Microscopy (TEM) for structural changes as well as Brunauer-Emmett-Teller (BET) surface area analysis for changes in surface morphology. Aqueous samples can be analyzed for calcium and silica concentrations via inductively coupled plasma optical emission spectrometry (ICP-OES). Together, these experiments can provide the results needed to formulate a mechanistic understanding of the differences in reactivity between the compounds.

The carbonation extent in reacted wollastonite can be determined via thermogravimetric analysis (TGA), whereby a sample is heated until its carbonate decomposes, at approximately 900° C., to calcium oxide and carbon dioxide. The mass that is lost upon heating is assumed to be entirely that of $CO_2$ and therefore, the sample's extent of carbonation may be determined. The determination of the carbonation extent of PWOL is more complex than that of wollastonite, since various carbonated and hydrated phases are produced, and each is stable to a different temperature. While this renders the TGA results more difficult to interpret, it is possible to quantify the hydration and carbonation extents of samples comprised of many phases if the identities of the phases are known. Identification of crystalline phases may be conducted via X-ray diffraction (XRD) and amorphous phases such as silica are readily identifiable via scanning electron microscopy (SEM) and energy dispersive spectroscopy (EDS).

Figure 18:
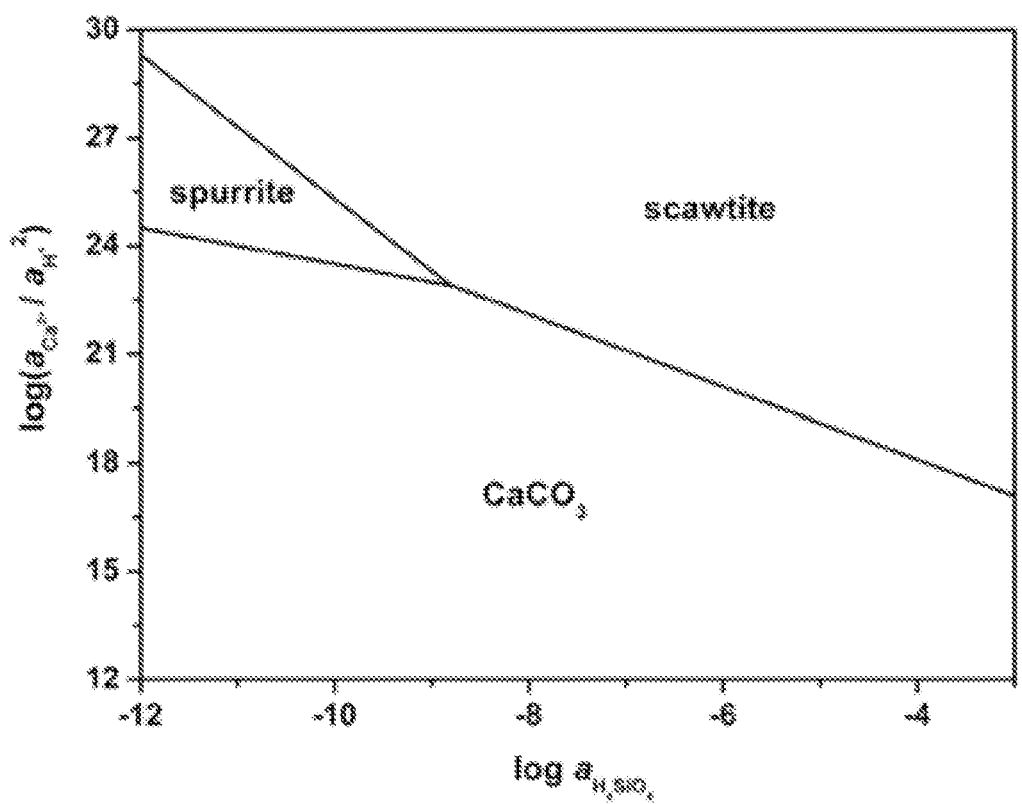
FIG. 18 shows a stability diagram of a CaO—SiO2-H2O—CO2 system at 80° C.

Some of the mineral phases that have been observed and are expected to form have been reported in the literature. The scawtite-spurrite-calcite stabilities at 25° C. and 80° C., for example, have been studied and are presented in FIG. 18. We plan to build on the literature by introducing additional environmental conditions, particularly higher temperatures, salinities, and pH values. With these conditions, elaborate three-dimensional phase diagrams for both wollastonite and PWOL can be produced, which can be used to determine the expected critical phases in any given environment or application. By understanding the dissolution as well as precipitation characteristics over time, a database of thermodynamic and kinetic values for PWOL can be generated, benchmarked against wollastonite over a range of representative conditions. Because all conditions except the crystal structure of the polymorphs will be exactly the same, the results of these experiments will be useful for fully quantifying the ways in which PWOL carbonation might be leveraged in engineered systems.

Task 2. Evaluate the Chemical Stability of the Resulting Mineral Phases.

A major motivation for this work is to understand how certain chemical products and the synergistic interactions between these phases may result in improved chemical stability when compared to OPC. Just as tobermorite provides chemical stability in Roman cement, in Task 2 we will investigate whether the tobermorite-like phases produced in our experiments provide the same degree of resilience. This understanding could be important in generating materials that thrive where existing technologies such as OPC concrete fail. A cement material that is composed of a mix of calcite, tobermorite, and silica can exhibit high resistance to chemical weathering, which would then impact its resistance to fracture propagation, compressive strength, and cohesion, drawing the strengths from each of these phases, respectively.

Once we have developed phase-stability diagrams for the PWOL system, we plan to synthesize small mixed-phase samples and expose them to conditions that may be experienced in the environment including several representative weak acids and salts. These solutions might include synthetic ocean water or groundwater representative of the deep subsurface, which exhibits high salinity and low pH conditions. Samples can be exposed for long durations (weeks) at elevated temperatures to high salt and pH aqueous environments. The mass change of samples, along with aqueous and some of the solid-phase analyses used in Task 1, will allow us to determine the stability of these mixed phase cement materials. A principal research question to be answered in this task is this: How do OPC, Solidia, and PWOL cements compare under accelerated weathering conditions?

Task 3. Measure the Mechanical Strength of PWOL Cements.

Figure 19:
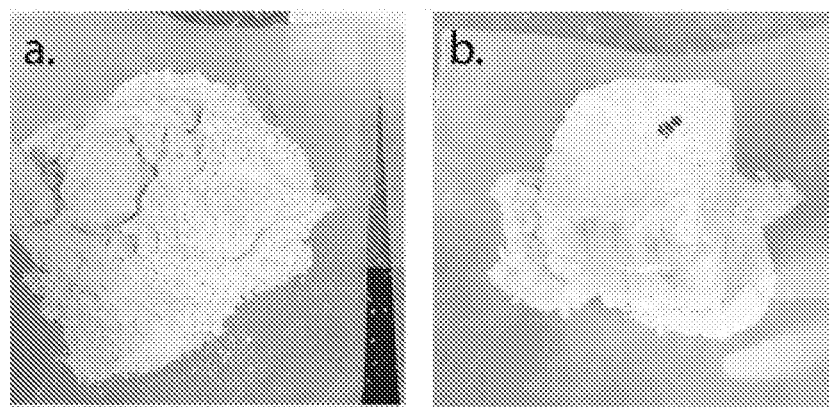
FIG. 19 includes images of preliminary (panel a) wollastonite and (panel b) PWOL cements used to obtain mechanical results. These photos illustrate qualitative differences between the materials. The wollastonite block was lose and poorly bound while the PWOL sample was much more cohesive.

It may be desirable for PWOL based cements to match or outperform the strength characteristics of OPC. Most of those performance considerations stem from cement's compressive strength. In Task 3, we will focus on evaluating and quantifying the mechanical strength of PWOL cements (FIG. 19). The mechanical properties of PWOL cements will be evaluated for a suite of critical parameters including friction coefficient, cohesive strength, unconfined compressive strength, Young's Modulus, Poisson's Ratio, and tensile strength. These experiments can be used to quantify the properties of samples with respect to (1) the spatial extent of carbonation reactions and how issues like nucleation, and precipitation morphology influence mechanical properties; (2) the role of pressure and temperature during carbonation reactions on crystal phase in the precipitates and the resulting strength effects on the bulk sample; (3) the role of sodium from glass aggregates or seawater on cementation strength; and (4) the impact of aggregate chemistry on the resulting strength of the carbonated cement. To establish these relationships, Task 3 can rely on conventional mechanical testing techniques including splitting tensile tests and triaxial tests. Experiments to determine strength properties can use standard testing practices (e.g., ASTM C496 and ASTM C109, discussed above). The principal research question to be answered in this task is this: How do the characteristics of cements made with both wollastonite and PWOL compare to those of typical OPC concrete or mortar?

The samples used for mechanical analysis can be mechanically compacted into small cylindrical samples that can then be cured in aqueous $CO_2$ solutions. The samples can be made using a custom-built press (see above and below). A method of sample preparation will be developed based on existing techniques to allow samples to be extracted from a mold that can be placed under the high heat and pressure used to initiate the carbonation reactions. Samples will be approximately 50 mm in diameter and up to 150 mm in length. This size of sample will ensure that we can test at least 9 samples in a high-pressure reactor (Parr Instruments Series 4601 1-L reactor) during a particular experiment. Having the ability to test 3 conditions (with 3 replicates) at a time will ensure that we are able to test conditions that may take many days to produce in the reactor.

Once the carbonation reactions within the samples under high heat and pressure are complete, we will remove the samples from the sample core holder and will use triaxial testing to evaluate the compressive strength properties using a Humboldt Load Frame (HM-3000) with a 50 kN loading capacity. Samples will be subjected to axial loading at strain rates of 0.7 MPa/hour and instrumented using linear variable differential transformers (LVDT)s and pressure transducers to record axial and radial deformation and axial load. Testing results will also be normalized through comparison of strength values of carbonation reaction samples to uncarbonated samples. To find the tensile strength of our samples, split tensile testing will be employed under the ASTM C109 standard (see above). Test samples will be placed on their side and an axial force will be applied in the radial direction until the sample breaks diametrically due to tensile pulling along the loading diameter. In accordance with the methodology suggested by the ASTM standard, a custom bearing bar apparatus will be machined to hold the samples created in during testing. Testing will be performed using a Forney VDF Series Automatic Testing machine at a loading rate of 900 N/s.

Task 4. Understand the Industrial Ecology of PWOL Cements.

Figure 20:
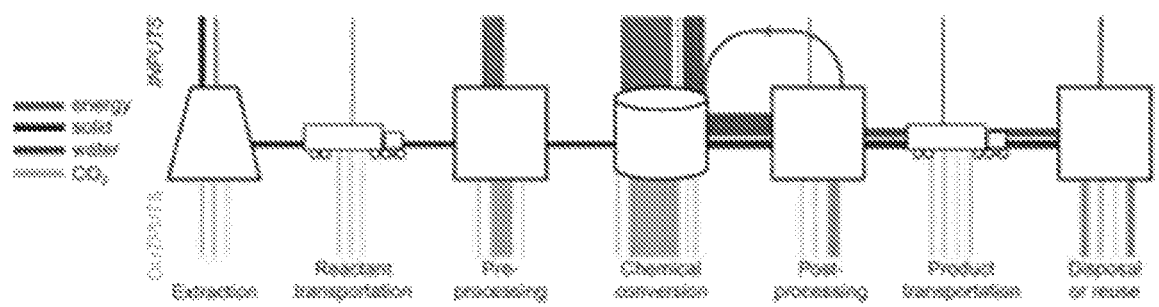
FIG. 20 is a life cycle schematic of accelerated weathering using olivine. The overall life cycle burdens will be lower than these with major savings in the chemical conversion step since PWOL carbonation/hydration requires only warm temperatures and low pressures.

A major motivation for developing PWOL cements is that they could combine a variety of waste streams into a value-added product. The fourth task will evaluate the technical, environmental, and economic impacts of deploying PWOL cements at large scale to answer the principal research question of this task: What are the life cycle and techno-economic implications of developing PWOL cements and how do they compare to OPC? In this task we will characterize the industrial ecology that could be leveraged to produce these cements. That characterization will be carried out using a combination of life cycle assessment and techno-economic analysis. The raw materials needed to create these cements are (1) PWOL, which occurs in large percentages in slags from cement, but the raw materials to synthesize it could be available in other streams, (2) heat (~100° C.), (3) $CO_2$ and (4) a cation source, which could be saline water (from wells or from ocean) or it could be ground waste soda lime glass, which would also provide the benefit of serving as an aggregate for the material. The life cycle environmental impacts for weathering of olivine are presented in FIG. 20. For our process, the life cycle burdens will shift to the preprocessing phase but that the overall burdens will be lower.

Economic constraints would favor these cements being produced within proximity of their end use. We propose to build life cycle and techno-economic models of pre-cast concrete structures that are geospatially explicit to account for the availability of raw materials and markets that would consume these prefabricated structures. For some of these materials (fuel gas, waste heat) the geospatial availability is fairly well characterized. This is important in this case because PWOL cement carbonation will occur faster at higher temperatures. For other materials such as PWOL, there is much less information. Most wollastonite production in the US is concentrated in two mines in upstate New York. The first activity in Task 4 will be to fully characterize the PWOL availability and potential in the US. Similarly, since PWOL is a waste product of cement slags and other industrial processes, the separation of the pseudowollastonite from other mineral constituents in the waste streams would need to be more fully understood in order to rank the viability of different sources.

Our LCA and TEA modeling will include the novel unit operations and conventional methods for producing precast concrete structures. This task will build on the earlier tasks by incorporating the experimental parameters measured in Task 1 to produce basic guidelines for developing these materials at full scale. The efficacy of PWOL cements will be compared to conventional cements to provide an apples-to-apples comparison with existing technologies. The results from this effort will culminate in a systems-level life cycle environmental and cost analysis that will evaluate the capital costs of deploying these materials relative to alternatives This analysis will combine elements of life cycle analysis and life cycle costing methodologies, since one of the major questions we seek to answer is: are PWOL cements more cost effective on the basis of performance and environmental remediation? Using published and commercially available life cycle data, models of each configuration will be constructed.

Example 3. Calcium Silicate Crystal Structure Impacts Reactivity with CO₂ and Precipitate Chemistry The reaction of $CO_{2(aq)}$ with calcium silicates creates precipitates that can impact fluid flow in subsurface applications such as geologic $CO_2$ storage and geothermal energy. These reactions nominally produce calcium carbonate ($CaCO_3$) and amorphous silica ($SiO_x$). In this example, we report evidence that the crystal structure of the parent silicate determines the way in which it reacts with $CO_2$ and the resulting structures of the reaction products. Batch experiments were carried out using two polymorphs of a model calcium silicate ($CaSiO_3$), wollastonite (chain-structured) and pseudowollastonite (ring-structured), at elevated temperatures (150° C.) and partial pressures of $CO_2$ (0-11 MPa). Reaction of $CO_{2(aq)}$ with wollastonite produced $CaCO_3$ and $SiO_x$, whereas reaction of $CO_{2(aq)}$ with pseudowollastonite produced plate-like crystalline calcium silicate phases, along with $CaCO_3$ and $SiO_x$. A reaction mechanism is proposed that explains the observations in relation to dissolution of the parent silicate, pH of the solution, and presence of nucleation sites. The mechanism is supported with ICP-OES measurements and SEM/TEM-SAED characterization of solid products. These findings are important for a number of reasons; among them, the fact that the crystalline silicate precipitates are more stable than $CaCO_3$ at low pH conditions, which could be valuable for creating permanent seals in subsurface applications.

INTRODUCTION

In deep subsurface environments such as those associated with hydraulic fracturing, $CO_2$ storage, and enhanced geothermal energy production, there is growing interest in managing environmental impacts associated with undesirable fluid migration. The targeted deployment of mineral precipitation reactions is one strategy that has been proposed to manage the fate of fluid flow properties in porous media. Calcium silicates are a common and broad class of minerals that could be used in these applications. They dissolve in acid to produce cations ($Ca^{2+}$) and amorphous silica ($SiO_2$) which can create an opportunity for pore plugging.

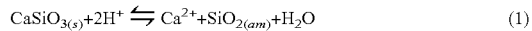

$$CaSiO_{3(s)} + 2H^+ \leftrightarrows Ca^{2+} + SiO_{2(am)} + H_2O \quad (1)$$

The rates at which the cation and silica are released into solution have been shown to vary considerably based on the crystal structure of the parent compound, even among minerals having the same chemical formula. Wollastonite, $CaSiO_3$, dissolves incongruently, resulting in non-stoichiometric release of calcium and silicon. Wollastonite has a pyroxenoid silicate chain structure and resists rapid Si leaching due to the strength of Si—O bonds in the silicate chains, resulting in preferential Ca leaching. In contrast, the polymorph pseudowollastonite has an isolated trisilicate ring structure in which the $Ca^{2+}$ ions are weakly bonded to O atoms resulting in rapid, stoichiometric dissolution and equal release of Ca and Si during dissolution.

Under conditions where $CO_{2(aq)}$ is present, the cation can complex with carbonate ions and precipitate as calcium carbonate ($CaCO_3$).

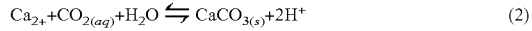

$$Ca_{2+} + CO_{2(aq)} + H_2O \leftrightarrows CaCO_{3(s)} + 2H^+ \quad (2)$$

In this reaction, $CO_2$ provides both the reactant (carbonate ions) and the source of hydrogen ions (carbonic acid). If $CO_2$ is present in high enough concentrations, it will drive the reaction to the left. Understanding these competing effects is critical for controlling this chemistry in engineered applications.

When wollastonite dissolves in the presence of $CO_{2(aq)}$, a calcium-depleted leached layer forms and the calcium ions can react with $CO_{2(aq)}$ to form solid carbonates in accordance with Equations 1 and 2. In contrast, we hypothesized that when pseudowollastonite dissolves in the presence of $CO_{2(aq)}$, the availability of cations and high concentrations of dissolved silica can result in precipitation of non-carbonate mineral phases with low ratios of cation to silica (≤1) similar to tobermorite ($Ca_5Si_6O_{16}(OH)_2 \cdot 4H_2O$ and magadiite ($NaSi_7O_{13}(OH)_3 \cdot 4(H_2O)$). Those products have been noted for their high strengths, adsorption properties, and low reactivities and the availability of nucleation sites has been shown to play an important role in controlling the morphology and rate of their precipitation.

The reaction of calcium silicates with $CO_2$ has been well studied in the context of carbon sequestration. Examples include reactions in basalts and exposed mantle peridotites, engineered weathering of silicate minerals, and sequestration in deep saline aquifers. We are interested in these reactions not because of their potential to mineralize $CO_2$ directly but because of their potential to create precipitates other than carbonates. Silicates could be delivered into pore spaces, where resulting precipitates could seal porous and fractured rocks and cements or stabilize and encase carbonate precipitates.

Here we present new evidence for the role of crystal structure (rather than simply elemental composition) of the parent silicate in controlling the chemistry of the precipitated minerals. This is a connection that has not yet been reported and is one that could have important implications in a number of applications in the subsurface requiring strength and stability. Batch experiments were carried out using wollastonite and pseudowollastonite under a range of pH, pressure, and $CO_2$ conditions to establish a proposed mechanistic understanding of the dissolution and precipitation reactions that control the formation of these chemically-stable mineral phases.

Materials and Methods

Materials: A citrate-nitrate gel auto-combustion method was used to make a calcium silicate ash that was calcined at 950° C. or 1250° C. for two hours to produce wollastonite and pseudowollastonite, respectively. The calcium silicate powders were then ground separately and sieved to isolate the 74-149 μm fraction. The crystal structures and morphologies of the calcium silicates were confirmed via powder X-ray diffraction (XRD), coupled with scanning electron microscopy (SEM) and energy dispersive X-ray spectroscopy (EDS). In experiments where sand was used to test the effects of heterogeneous nucleation, Ottawa sand (US Silica, F-50) was sieved to obtain the 250-595 μm fraction, washed in 1N HCl (Sigma Aldrich), and rinsed with deionized water (>18.0 MΩ-cm). Sodium hydroxide (98% NaOH, Sigma Aldrich) and sodium chloride (99% NaCl, EM Science) were used as received.

Batch Experiments. To investigate these reactions, experiments were conducted in batch systems to isolate the chemical processes and enable observation of reaction products, while limiting macro-scale mass-transfer limitations and heterogeneity that exists in column experiments. For each set of experimental conditions, 15 mg of wollastonite and pseudowollastonite powder were placed into separate, identical, Teflon boats (approx. 0.75 cm³) and put in a single Teflon-lined stainless-steel pressure vessel. Within each boat, 1 g of sand and 0.5 mL of deionized water (with various concentrations of NaOH and/or NaCl) were added. Pressure vessels were heated to 150±3° C. $CO_2$ was injected into the vessels via a syringe pump (Teledyne ISCO) and the concentration of dissolved $CO_2$ was calculated by its partial pressure in the headspace using PHREEQC, equilibrated with the water phase, for each $CO_2$ concentration that was tested. Once $CO_2$ pressure equilibrated, the pump was switched to nitrogen gas and pressure was increased to 15.5 MPa. Each experiment was conducted for 24 hours and afterwards, the samples, in the Teflon boats, were oven-dried at 75° C. where sheet silicate precipitates are not expected to form. Upon drying, the sand and powders became separable and the powders were then rinsed three times to remove any remaining NaOH and dried at 50° C. for 12 hours. The products of select samples were then divided and a portion was acid-washed in pH 5.5 acetic acid/sodium acetate buffered solution for 6 hours. To remove the acid, those samples were again rinsed and oven-dried.

Figure 21:
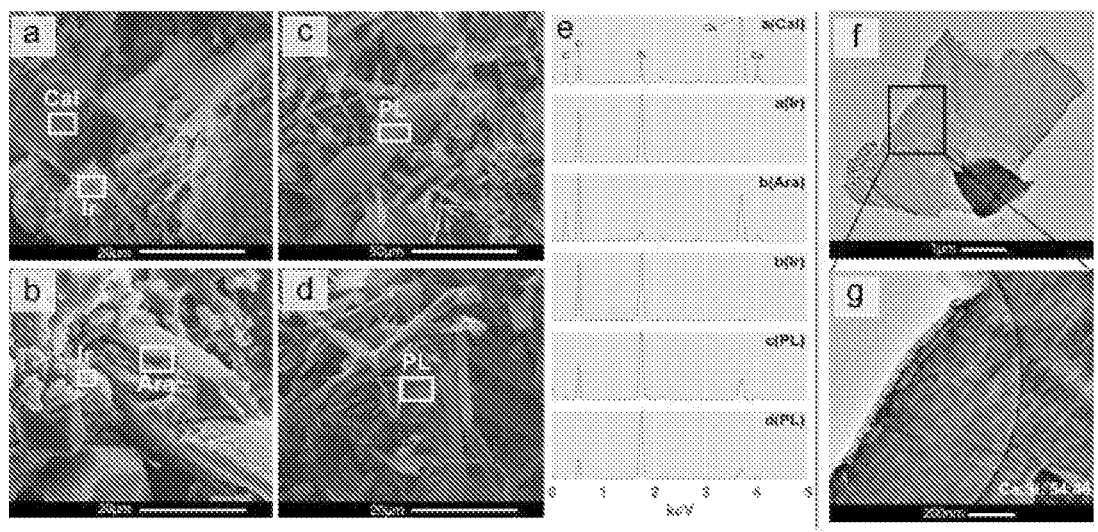
FIG. 21 includes representative SEM micrographs (panels a-d) of the phases produced in these experiments, including calcite (Cal), aragonite (Ara), and irregular silica phases (Ir). At elevated pH and moderate dissolved carbonate concentrations, appreciable quantities of plate-like (PL) calcium silicates are produced (panels c, d). EDS spectra (panel e) are presented for each of the identified phases in (panels a-d). The spectra show that the PL phases are rich in both calcium and silica. TEM micrographs (panels f, g) show the nature of the PL phases and EDS confirms an abundance of Si and Ca.

Analytical Methods. The reaction products were analyzed via SEM-EDS (FEG Environmental-SEM, Oxford AZtec EDS system) for morphology and elemental composition and via powder XRD (Bruker D8 Advance) for phase identification. Data were collected with a Ag tube source (λ=0.56 Å) over a 2θ range of 4°-20°, with a step size of 0.025°-0.05°. Identification was performed using the powder diffraction database in Diffrac.Eva V3.1 (Bruker). For single particles from one sample, transmission electron microscopy (TEM), selected-area electron diffraction (SAED), and additional EDS were conducted (FEI Talos (S)TEM, 200 kV). Inductively coupled plasma optical emission spectrometry (ICP-OES, Thermo Scientific iCap 6200) was also used to analyze aqueous phases to determine relative dissolution rates of wollastonite and pseudowollastonite.

listed in order of prevalence based on qualitative SEM/EDS microscopy coupled with XRD. For instances of $CaCO_3$, calcite and aragonite were identified via XRD, except in samples 0, 6, and 7, where calcite was reported. FIG. 21 presents representative micrographs and EDS spectra of the morphologies described in Table 2. The layered calcium silicate phases are likely crystalline calcium silicate hydrates. TEM-SAED confirmed that the material was crystalline but did not match pseudowollastonite. TEM-EDS showed that one of the platelets had a 54:46 Ca:Si ratio. Trace amounts of nano-scale calcium silicate hydrates have been found after reacting wollastonite with $CO_2$ while silicate polymerization has been noted during carbonation of natural wollastonite under high relative humidity conditions. To our knowledge, no work has reported the formation of such dissimilar reaction products from polymorphs of the same parent silicate.

TABLE 2

Selection of experimental conditions and reaction products described in this work. Products listed in accordance to prevalence, as determined by SEM/EDS analysis coupled with XRD. Here, "irregular" phases (IR) include amorphous silica as well as unreacted $CaSiO_3$, solid carbonates include Calcite (Cal) and Aragonite (Ara) and layered calcium silicate phases (plate-like (PL)) are also observed.

| ID | $pCO_2$ (MPa) | NaOH (M) | pH[a] | interface | wollastonite reaction products | pseudowollastonite reaction products | analytical techniques |
|---|---|---|---|---|---|---|---|
| 0 | 0 | 0.1 | 10.5 | Sand | Ir | Ir | SEM, EDS |
| 1 | 1.1 | 0 | 3.9 | Sand | Ir > Ara > Cal | Ir > Ara >> PL | SEM, EDS, XRD |
| 2 | 1.1 | 0.1NaCl | 3.9 | Sand | Ir > Cal >> Ara | Ir > Ara >> PL | SEM, EDS, XRD |
| 3 | 1.1 | 0.1 | 6.7 | None | Ir > Cal >> Ara | Ir > Ara | SEM, EDS, XRD |
| 4[b] | 1.1 | 0.1 | 6.7 | Sand | Ir > Cal >> Ara | PL > Ara > Ir | SEM, EDS, XRD |
| 5 | 1.1 | 0.1 | 6.7 | Sand | Ir > Cal >> Ara | PL > Ara > Ir | SEM, EDS, XRD, TEM |
| 6 | 5.5 | 0.1 | 5.9 | Sand | Ir > Cal | Cal > Ir | SEM, EDS |
| 7 | 11 | 0.1 | 5.7 | Sand | Ir > Cal | Cal > Ir | SEM, EDS |

[a]= Calculated for batch solution at equilibrium with $CO_2$ at 150° C. using PHREEQC
[b]= Experiment conducted at low total pressure (1.1 MPa)

Results and Discussion

Layered Calcium Silicate Formation. The experiments conducted here, summarized in Table 2, yielded very different products for wollastonite and pseudowollastonite. When wollastonite reacted with $CO_{2(aq)}$, only amorphous silica and $CaCO_3$ formed. Conversely, pseudowollastonite yielded a variety of morphologies observed via SEM, suggesting the presence of multiple mineral phases. For each experiment, the relative abundance of reaction products is The differences observed between the reaction products of wollastonite and pseudowollastonite were sensitive to both the presence of $CO_2$ and pH. In experiment 0, where no $CO_2$ was present, no layered calcium silicate phases were observed from reacting either polymorph. At high $CO_2$ concentrations (experiments 6 and 7), $CaCO_3$ was the predominant reaction product and significantly more $CaCO_3$ existed in pseudowollastonite than in wollastonite reaction samples.

When calcium silicates reacted with intermediate concentrations of $CO_2$, the reaction products depended on several factors, including the initial $CaSiO_3$ crystal structure, pH, and the availability of heterogeneous nucleation sites (i.e., sand). Comparison of the results from experiments 3 and 5 suggest that, in pseudowollastonite experiments, nucleation sites are needed to yield layered calcium silicate precipitates. Also, where pH was increased using 0.1 M NaOH (experiments 4 and 5), an abundance of plate-like phases was observed. To better understand the role of Na in this reaction mechanism (since NaOH was used), experiment 2 was conducted at the same Na molar concentration as experiment 5, with NaCl rather than NaOH. Only a very small quantity of plate-like phases was found in experiment 2 and the results nearly mirror experiment 1. Overall, XRD analyses suggest that calcite was the predominant $CaCO_3$ mineral in wollastonite samples and aragonite was predominant in pseudowollastonite samples. Because pseudowollastonite dissolves more rapidly, this observation is likely due to the relative concentrations of dissolved calcium in the aqueous phase. All experiments were conducted at high total pressure (15.5 MPa) to simulate conditions in the deep subsurface except experiment 4, which was conducted at 1.1 MPa, to confirm that total pressure had little-to-no effect on products.

Figure 6:
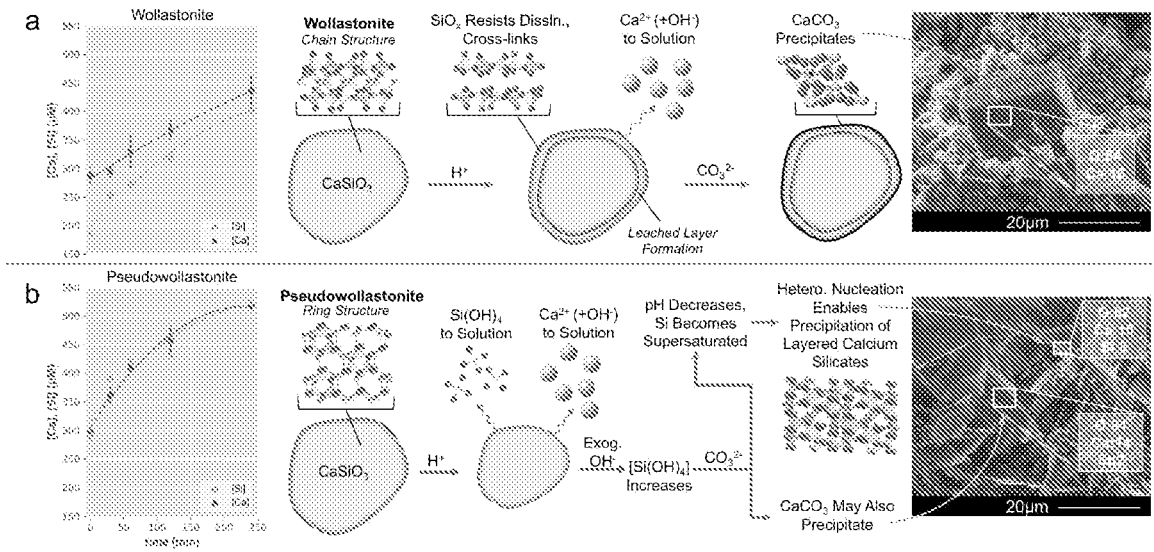
FIG. 6 illustrates a proposed mechanism for how the crystal structures of wollastonite (panel a) and pseudowollastonite (panel b), both polymorphs of $CaSiO_3$, influence the reactions that proceed in the presence of $CO_2$. Wollastonite possesses silicate ($SiO_4^{4-}$) chains that resist dissolution and link as calcium is released to solution, as evidenced by ICP-OES measurements of dissolved Si and Ca. A leached layer of $SiO_x$ remains while calcium becomes available to react with dissolved carbonate to generate calcium carbonate, even in the presence of added OH— ions (not depicted). In contrast, the silica in pseudowollastonite exists as three-membered rings, resulting in congruent dissolution of silica and calcium. With the addition of hydroxide ions, the concentration of dissolved silica increases. Upon the introduction of dissolved carbonate, pH is decreased, leading to supersaturation of silica and the precipitation of layered calcium silicates on solid/fluid interfaces. In parallel, calcium carbonate may precipitate, consuming dissolved carbonate and some calcium ions.

Mechanism for Layered Calcium Silicate Formation. These experiments provide insight into the mechanism that governs the formation of layered calcium silicates instead of $CaCO_3$. A schematic of the proposed mechanism is presented in FIG. 6. FIG. 6, panel a depicts the reaction of wollastonite in water, where the pyroxenoid silicate chains lead to non-stoichiometric dissolution of calcium ions and a silica network that hinders further dissolution of calcium. In silicate-glass corrosion, this leached-layer of silica gel restructures and cross-links, effectively closing pores around the periphery of the glass. However, hydrolysis of Si—O bonds allows the limited release of polymerized vitreous silica, meaning the aqueous phase surrounding the solid surface is therefore calcium-rich but relatively low in silica, which is supported by the ICP-OES data in FIG. 6, panel a. When $CO_2$ is present, the precipitation of $CaCO_3$ is highly favorable. In contrast, FIG. 6, panel b depicts the case of pseudowollastonite reacting with water and $CO_2$. The tri-silicate rings are readily dissolved, releasing stoichiometric quantities of Ca and Si (silicic acid, $Si(OH)_4$). With the exogenous elevation of the pH (NaOH), the concentration of dissolved Si increases, becomes supersaturated, complexes with calcium (and possibly, carbon) and precipitates as layered calcium silicates, with Ca:Si stoichiometry dependent on the local ion concentrations. Simultaneously, some Ca may be consumed by the precipitation of $CaCO_3$. Not depicted in the figure is the impact of temperature on the morphologies and crystal structures of precipitates. However, the layered calcium silicates are more prevalent at temperatures >120° C. Experiments carried out over longer timescales, not shown, produced similar results suggesting the results are not time-dependent over the timescales evaluated here.

ICP-OES analyses confirmed that dissolution rates in $CaSiO_3$ could be driving the difference in precipitate chemistry. Experiments were carried out to mimic the conditions of experiment 4 except HCl was used in place of $CO_2$ to prevent rapid $CaCO_3$ precipitation. The molar concentrations of aqueous Ca and Si (0.55 g of 74-150 μm $CaSiO_3$ in 500 mL stirred water) upon reaching 150° C. are shown. The plots show that Ca dissolves more quickly than Si in wollastonite but dissolve stoichiometrically in pseudowollastonite. Additionally, these experiments produced no crystalline silicate phases or $CaCO_3$ (as determined by SEM/EDS) which underscores the importance of $CO_2$ in the system.

Figure 22:
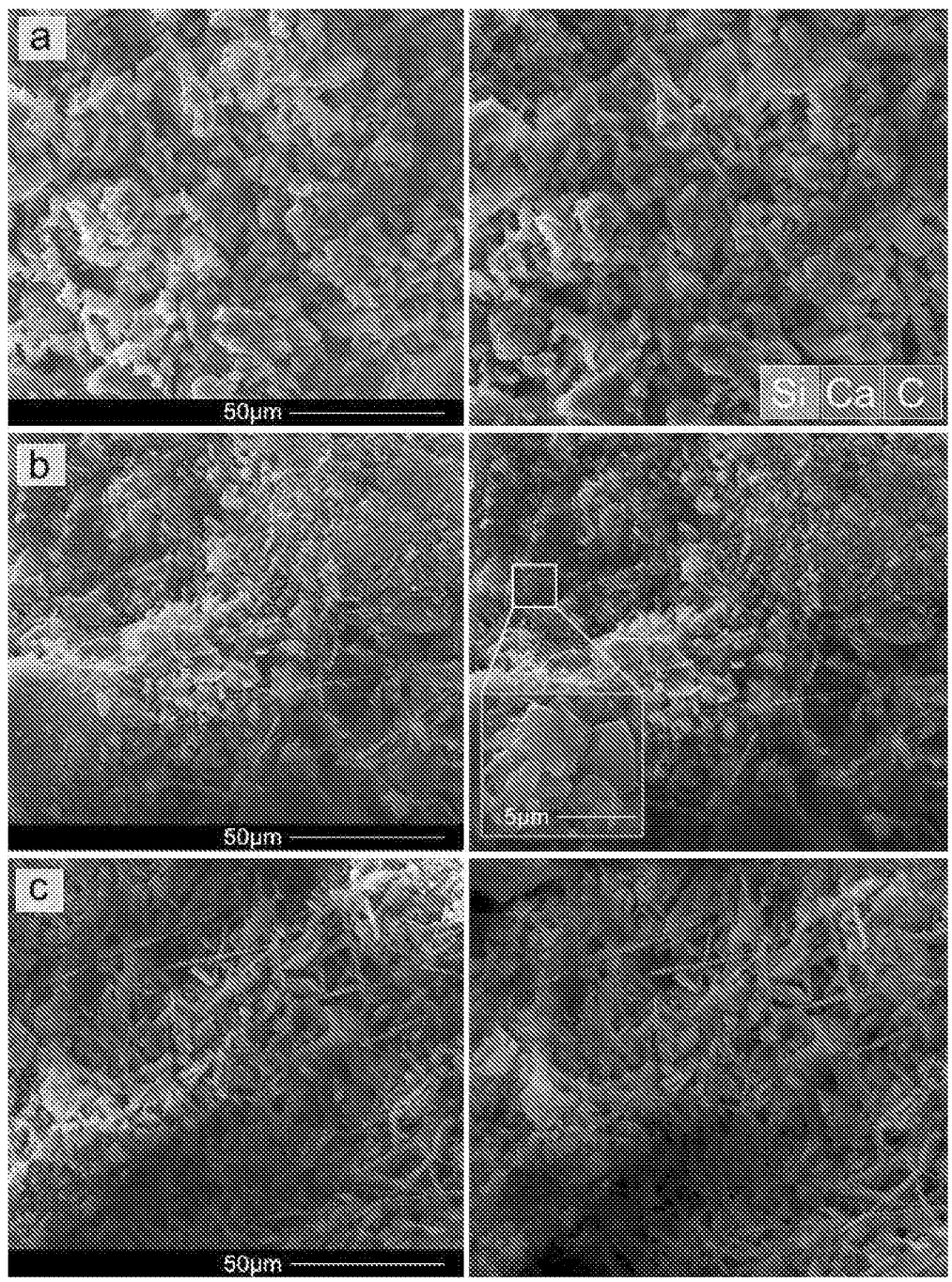
FIG. 22 shows SEM micrographs and EDS analyses of unreacted pseudowollastonite (panel a), which showed no evidence of CaCO$_3$, while those from reacted pseudowollastonite (panel b) showed a significant quantity. After acid washing, CaCO$_3$ was not observed while plate-like phases remained, unaltered (panel c).
Figure 23:
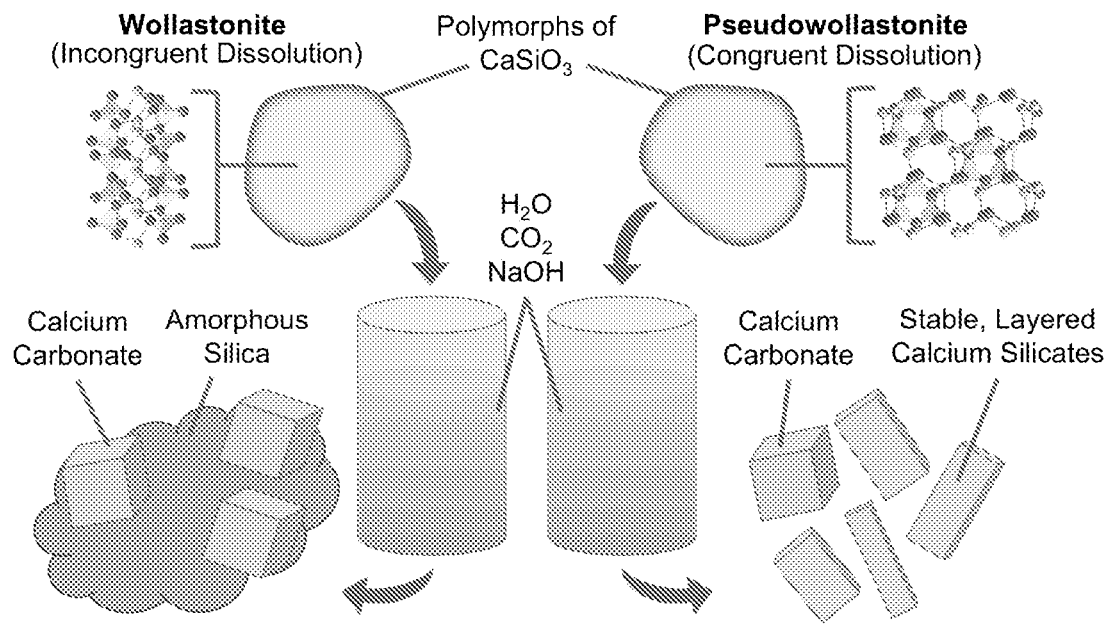
FIG. 23 is a schematic illustration of how the calcium silicate crystal structure impacts reactivity with CO$_2$ and the resulting precipitate chemistry.
Figure 24:
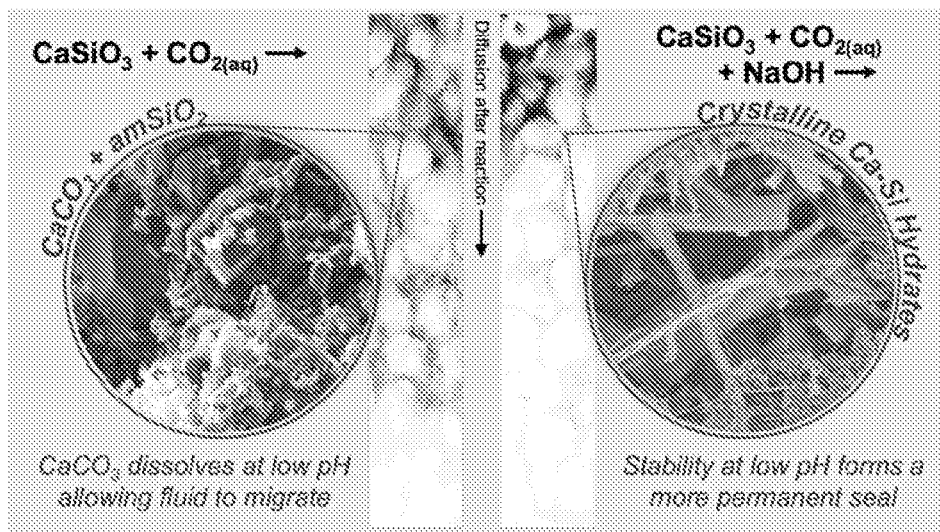
FIG. 24 illustrates the effect of calcium silicate carbonation on permeability control.

The results of the acetic acid washing provide insights into the chemical stability of the layered calcium silicates produced relative to $CaCO_3$. Representative SEM micrographs and layered EDS maps (Ca, Si, C) are presented in FIG. 22 of (panel a) unreacted pseudowollastonite, (panel b) products from $CO_2$-reacted pseudowollastonite (experiment 4), and (panel c) products from $CO_2$-reacted and acid-washed pseudowollastonite (experiment 4). The EDS maps in (panel b) show intense regions of calcium and carbon that align with the regions that appear to be $CaCO_3$. The remainder (and majority) of the sample is comprised primarily of plate-like phases, which remained entirely intact after acid washing, along with some irregular phases. $CaCO_3$ could not be found in the acid-washed samples The chemical resilience of the layered crystalline calcium silicates suggests they could have important applications in subsurface engineering contexts, among others. While pseudowollastonite is less common than wollastonite, the role of ion concentration revealed here could be leveraged to deliver mixtures of other more abundant minerals that would produce ideal reactant concentrations to generate layered calcium silicates in applications such as geologic $CO_2$ storage, geothermal energy, or hazardous waste containment. Pseudowollastonite nanoparticles or some combination of calcium and silica from waste streams delivered at the right ratios could create the pore conditions that would result in the precipitation of stable mineral phases, which could enable dramatic decreases in permeability, even in harsh environmental conditions. In ex situ carbon storage and cement applications, these results could inform novel ways to produce unreactive passivating layers on carbonates that would resist weathering and improve the long-term stability of the materials produced.

Example 4. Targeted Permeability Control in the Subsurface Via Calcium Silicate Carbonation Efforts to develop safe and effective next-generation energy and carbon-storage technologies in the subsurface require novel means to control undesired fluid migration. Here we demonstrate that the carbonation of calcium silicates can produce reaction products that dramatically reduce the permeability of porous media and that are stable. Most calcium silicates react with $CO_2$ to form solid carbonates but some polymorphs (here, pseudowollastonite, $CaSiO_3$) can react to form a range of crystalline calcium silicate hydrates (CCSHs) at intermediate pH. High-pressure (1.1-15.5 MPa) column and batch experiments were conducted at a range of temperatures (75-150° C.) and reaction products were characterized using SEM-EDS and synchrotron μXRD and μXRF. Two characteristics of CCSH precipitation were observed, revealing unique properties for permeability control relative to carbonate precipitates. First, precipitation of CCSHs tends to occur on the surface of sand grains and into pore throats, indicating that small amounts of precipitation relative to the total pore volume can effectively block flow, compared to carbonates which precipitate uniformly throughout the pore space. Second, the precipitated CCSHs are more stable at low pH conditions, which may form more secure barriers to flow, compared to carbonates, which dissolve under acidic conditions.

INTRODUCTION

The subsurface environment has traditionally been the source of most of our energy but a growing number of applications seek to use it to offset the environmental impacts of energy production. Geologic carbon storage (GCS), enhanced geothermal energy (EGS), and compressed air energy storage leverage some of the unique characteristics of the subsurface (e.g., its size, temperature, and pressure) to store fluids or extract heat. Because of the pressure gradients associated with fluid injection/production, strategies are needed to control fluid flow in target formations. Geophysical and/or geochemical alteration of the subsurface environment can create new and undesirable pathways for fluid migration. In EGS, these are often referred to as thief zones, and undermine the economic viability of production. In GCS, leakage can contribute to groundwater contamination. In addition, the influence that fluid migration has on induced seismicity remains problematic and difficult to predict.

Strategies to control undesirable fluid migration are limited. The oil and gas industry has developed swelling polymers and novel cementitious materials, but they have limited utility in some subsurface applications because either the temperatures are too high or the leaks occur too far from the wellbore to reach. Cements are also problematic because they are susceptible to degradation in acidic environments (like those present in $CO_2$ storage applications) because they consist largely of calcium hydroxide [$Ca(OH)_2$], which is soluble at low pH. In addition, the high viscosity of cement limits its use to the wellbore vicinity and there, it does not often bind to metal casings or subsurface media, creating pathways that can grow over time.

The use of mineralization reactions could sidestep some of the limitations associated with polymers or cement-based approaches. The viability of microbially-mediated calcite precipitation as a means of mitigating leakage in abandoned wells has been demonstrated. Other work has proposed the injection of a mineral silicate slurry followed by $CO_2$ to generate solid carbonates. The most well-studied carbonates in these contexts are magnesium- or calcium-based minerals, which react via:

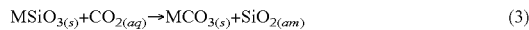

$$MSiO_{3(s)} + CO_{2(aq)} \rightarrow MCO_{3(s)} + SiO_{2(am)} \quad (3)$$

where M is the divalent cation. Magnesium-based carbonates prevail in basalt formations that are of interest from a $CO_2$-storage perspective and calcium-based carbonates have faster reaction kinetics so they are common in laboratory experiments. The aqueous carbonation of wollastonite ($CaSiO_3$) under reservoir conditions (e.g., 90° C., 25 MPa $CO_2$) produces porous, amorphous silica surrounding wollastonite cores, along with calcite, and sometimes, nanometer-scale Ca-phyllosilicates. At 65° C. with ambient pressure of $CO_2$, similar products form, including Ca-modified silica gels and Ca-carbonate/silica gel composites. A common characteristic of solid carbonates is that they are sensitive to dissolution at low pH, meaning they could be an impermanent means of controlling flow:

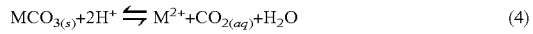

$$MCO_{3(s)} + 2H^+ \leftrightarrows M^{2+} + CO_{2(aq)} + H_2O \quad (4)$$

In the mineral silicate system, the precipitation of these solid carbonates is dependent on the crystal structure of the parent silicates and the pH of the aqueous phase. In chain-silicate minerals, preferential leaching of the cation allows the precipitation of solid carbonates in the presence of $CO_{2(aq)}$ and leaves a relatively unreactive porous silica network that condenses over time. Some mineral silicates can react with $CO_{2(aq)}$ to generate non-carbonate products. Specifically, a ring-structured calcium silicate, pseudowollastonite ($CaSiO_3$) can generate crystalline calcium silicate hydrates (CCSHs) in addition to Ca-carbonate when pH was increased at elevated temperature (150° C.) and moderate $CO_2$ concentration (0.18 M). The strained ring structure in pseudowollastonite allows for stoichiometric release of both Ca and dissolved Si, which allows for the precipitation of various non-carbonate phases. We refer to these precipitates CCSHs to distinguish them from the amorphous calcium silicate hydrate phases that form in Portland cement, which are typically referred to as CSH gels. The composition of phases that form in the CaO—$SiO_2$—($CO_2$)—$H_2O$ system is complex and highly variable, depending primarily on molar ratios of dissolved species.

In this example, we examine how the precipitation dynamics of carbonates and CCSHs impact fluid transport in porous media under natural or engineered conditions representative of the deep subsurface, which are expected to vary widely. For example, in basalt-based GCS, the relatively high pH of natural waters (9-11) may facilitate CCSH precipitation, particularly in regions where the concentration of $CO_2$ is relatively low (e.g., the periphery of the $CO_2$ plume or in leakage locations). Likewise, pore solutions in concrete applications (e.g., wellbores) are often quite basic (approaching pH 13) and could allow the precipitation of CCSHs. In saline-aquifer-based GCS, formation waters equilibrated with $CO_2$ are expected to be acidic, which would promote solid carbonate precipitation, followed by re-dissolution, unless the pH can be exogenously buffered enough to promote CCSH precipitation.

In particular, in this example, we seek to understand how permeability evolves over time in diffusion-limited carbonated silicate systems and is impacted by the presence of acid, which is common in many subsurface environments. These objectives were studied first via a series of sand column experiments that simulate porous media, in which pseudowollastonite was injected and then reacted with $CO_{2(aq)}$. Pseudowollastonite was selected because it can generate a variety of carbonate and CCSHs, based on aqueous conditions. The reacted columns were then characterized via synchrotron-based X-ray diffraction and X-ray fluorescence mapping as well as with electron microscope analyses which, together, allowed for spatial mapping of product phases under various conditions over time. Small powder batch experiments were also conducted to more fully characterize the reaction products and develop phenomenological relationships that might inform the deployment of this chemistry in the field.

Materials and Methods

Sand Column Experiments. Pseudowollastonite powder (average powder diameter=10.2 µm, SD=8.4 µm, spongy/aggregated shape) was used as received from Sigma Aldrich. NaOH (Sigma Aldrich) was used to increase pH. Ottawa sand (500-841 µm fraction) was washed with 1 N HCl to remove surface impurities and rinsed with deionized water (18.2 MΩ cm, Millipore).

Sand columns, 1.59 cm in diameter and 5 cm in length, were produced by packing the washed and dried sand in 316 stainless-steel tubes that were capped at each end with stainless-steel washers and 250 µm stainless-steel mesh. After packing the tubes and oven drying, permeability and mass were measured for each column. Each was then placed in a press that held the columns in place while allowing fluid to be flowed through. Pseudowollastonite powder was suspended in deionized water (3 g/L) and injected into the columns at 10 MPa. During injection, a 20 µm porous disc was placed at the outlet end of each column to allow the passage of water and retention of pseudowollastonite. After injection, the columns were dried at 75° C. for 24 hr and permeability and mass were again measured.

Figure 25:
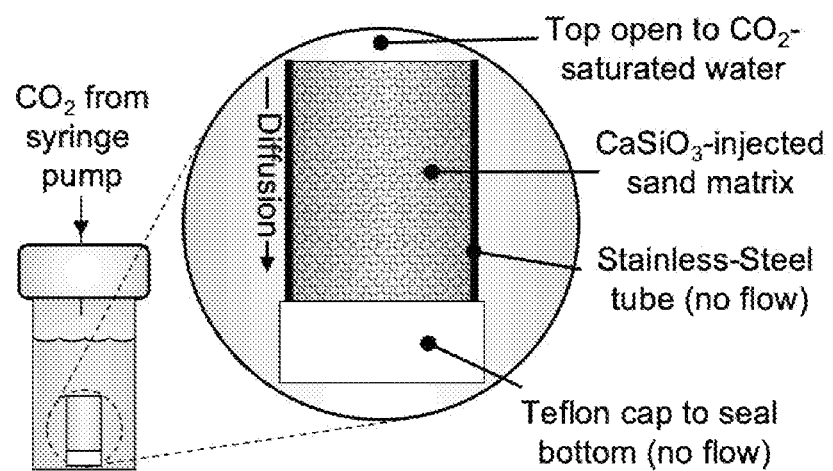
FIG. 25 illustrates the methods used to examine the effect of calcium silicate carbonation on permeability control. Sand columns were injected with a water-pseudowollastonite suspension and then submerged, upright, in a Teflon-lined, stainless-steel pressure vessel. CO$_2$ was injected into the headspace of the vessel with a syringe pump, where it equilibrated with the batch solution. CO$_2$ and other dissolved species could diffuse through the top (inlet) of the columns and react with the CaSiO$_3$.

The bottom end of each column was pressed into a Teflon cap to seal it while the top end remained opened and they were then submerged upright in deionized water with either 0 M NaOH or 0.1 M NaOH in a 600 mL Teflon-lined stainless-steel pressure vessel, depicted in FIG. 25. Hereafter, columns reacted with only $CO_2$ are referred to as '$CO_2$ columns' and ones that were reacted with both $CO_2$ and NaOH are referred to as '$CO_2$+NaOH columns'. The experimental conditions are listed in Table 3. The water-$CO_2$ equilibrium pH was calculated with PHREEQC (V 2.18) with the PHREEQC database. The vessel was placed in an oven and heated while $CO_2$ (or $N_2$ for control columns) was injected into the headspace. We previously determined that total pressure has no observable impact on the reaction pathways in this work. Instead, the partial pressure of $CO_2$ plays a crucial role. The columns were reacted for various times ranging from 12-495 hr at temperatures ranging from 90-150° C. While these temperatures are higher than those in most GCS applications, they were selected to accelerate chemical kinetics so that the experiments could be carried out over practical timescales. They were then dried at 75° C. and permeability and mass were again measured.

TABLE 3

Experimental conditions for column experiments.

| column number | reaction time (hr) | temperature (° C.) | [NaOH] (M) | pCO$_2$ (MPa) | [C] (M)† | batch pH† |
|---|---|---|---|---|---|---|
| 1 | 24 | 90 | 0.1 | 1.1 | 0.22 | 6.16 |
| 2, 3 | 48 | 90 | 0.1 | 1.1 | 0.22 | 6.16 |
| 4 | 96 | 90 | 0.1 | 1.1 | 0.22 | 6.16 |
| 5, 6 | 168 | 90 | 0.1 | 1.1 | 0.22 | 6.16 |
| 7 | 16 | 150 | 0.1 | 1.1 | 0.19 | 6.65 |
| 8 | 24 | 150 | 0.1 | 1.1 | 0.19 | 6.65 |
| 9, 10 | 48 | 150 | 0.1 | 1.1 | 0.19 | 6.65 |
| 11-13 | 96 | 150 | 0.1 | 1.1 | 0.19 | 6.65 |
| 14 | 108 | 150 | 0.1 | 1.1 | 0.19 | 6.65 |
| 15, 16 | 288 | 150 | 0.1 | 1.1 | 0.19 | 6.65 |
| 17, 18 | 447 | 150 | 0.1 | 1.1 | 0.19 | 6.65 |
| 19 | 495 | 150 | 0.1 | 1.1 | 0.19 | 6.65 |
| 20 | 12 | 150 | 0 | 1.1 | 0.09 | 3.94 |
| 21, 22 | 48 | 150 | 0 | 1.1 | 0.09 | 3.94 |
| 23-26 | 96 | 150 | 0 | 1.1 | 0.09 | 3.94 |
| 27, 28 | 168 | 150 | 0 | 1.1 | 0.09 | 3.94 |
| 29, 30 | 447 | 150 | 0 | 1.1 | 0.09 | 3.94 |
| 31 | 495 | 150 | 0 | 1.1 | 0.09 | 3.94 |
| 32 | 24 | 150 | 0.1 | 0 | 0 | 10.49 |
| 33 | 96 | 150 | 0.1 | 0 | 0 | 10.49 |
| 34 | 24 | 150 | 0.1 | 3.4 | 0.38 | 6.16 |
| 35-41 | 72 | 150 | 0.1 | 3.4 | 0.38 | 6.16 |
| 42-47 | 72 | 150 | 0 | 3.4 | 0.29 | 3.68 |
| 48 | 24 | 150 | 0.1 | 15.5 | 1.35 | 5.52 |
| 49 | 24 | 150 | 0.1 | 3.4 | 0.28 | 3.65 |
| 50 | 0 | N/A | N/A | N/A | N/A | N/A |

†Initial batch pH, equilibrated with $CO_2$, calculated with PHREEQC

In select samples (columns 11-13, 19, 23-25, 31, and 50), the batch solutions were also doped with 15 mM strontium chloride hexahydrate, where Sr could diffuse into the columns and substitute for Ca in the precipitation of solid carbonates, allowing for µXRF visualization of their precipitation dynamics. The Sr substitution method was used because Si and C are unobservable via µXRF and both the parent ($CaSiO_3$) and product ($CaCO_3$) minerals contained the same amount of Ca, rendering differentiation between the two otherwise challenging.

After the reaction periods and drying, the bottom ends of the same columns were again sealed and the columns were submerged upright in a 0.1 M NaBr solution, where the Br could diffuse into the column inlets and act as a visual complement to permeability with µXRF mapping (since no Br existed in the system prior to this step). To understand the temporal evolution of the reactions, 96 hr and 495 hr columns were injected with epoxy and were sectioned along their length (1 mm thickness) for synchrotron µXRF and SEM-EDS. The remaining columns were thin-sectioned (to 30 µm) and mounted to Suprasil 2A quartz glass for synchrotron µXRD/µXRF.

To test the stability of the precipitates at different pH values, one set of experiments (numbers 35-47) that was reacted at 3.4 MPa $CO_2$, with or without NaOH, for 72 hr were submerged in 1 M sodium acetate/acetic acid solutions at pH values from 4 to 6 or in DI water and then flushed through with 20 mL DI water. They were then dried and the permeability and mass were measured.

Powder Batch Experiments. Small-scale powder batch experiments, were also conducted with the intention of isolating the effects of time and temperature on CCSH morphology and composition. Briefly, 15 mg of pseudowollastonite powder was placed in 0.75 $cm^3$ Teflon boats with 1 g of sand and 0.5 mL of DI water, either with or without 0.1 M NaOH. The samples were reacted in a stainless-steel pressure vessel at 1.1 MPa $CO_2$ at a given experimental temperature and time. After each experiment, the samples were dried at 75° C. One sample was dried in air at ambient temperature to compare to oven-dried samples. CCSHs were observed in the sample via SEM so we do not attribute their formation to the oven-drying process.

Air Permeability Measurements. For column experiments, permeability was determined by measuring the flow rate and pressure potential of air across the columns Briefly, an air mass flow meter [0-405 sccm (Concoa)] was coupled with pressure gauges [0-0.034 MPa (Dwyer), 0-0.21 MPa (Concoa), 0-1.38 MPa (Concoa), 0-3.45 MPa (Concoa)] and measurements were taken at five flow rates and pressures for each column. The flow rates were plotted against the pressure differentials to ensure that the measurements were within the laminar flow regime (linear relationship) and the average of five measurements was reported.

Materials Characterization. Column samples were analyzed via synchrotron µXRD and/or µXRF at Argonne National Laboratory's Advanced Photon Source (13IDE). Spectral fitting of XRF data, XRF mapping, and local analyses of XRD data were performed.

A majority of the columns were cut open after reaction (whether epoxied or not) and observed under SEM-EDS (FEI Quanta LV200). For powder batch systems, SEM-EDS was used to analyze all samples and select samples were analyzed with TEM/SAED (FEI Titan).

To analyze Si:Ca ratios for small powder batch experiments, CCSHs that formed over various reaction periods were observed under SEM by scanning across sample stubs and locating as many CCSH clusters as possible. When clusters were located, EDS spectra were acquired for individual plates and the silicon-to-calcium ratios were recorded.

Results

Precipitates and their Impact on Sand Column Permeability. Two broad classes of precipitate morphologies were observed in the experimental and control columns as shown in the SEM micrographs presented in FIG. 26. The reaction products observed in columns injected with pseudowollastonite and reacted only in the presence of $CO_2$ are presented in FIG. 26, panel a. Under these conditions the reaction with pseudowollastonite follows eqn. 3 and yields Ca-carbonate and amorphous $SiO_2$, primarily. In contrast, the reaction products observed in columns reacted in the presence of $CO_2$+NaOH are presented in FIG. 26, panels b and c.

Figure 26:
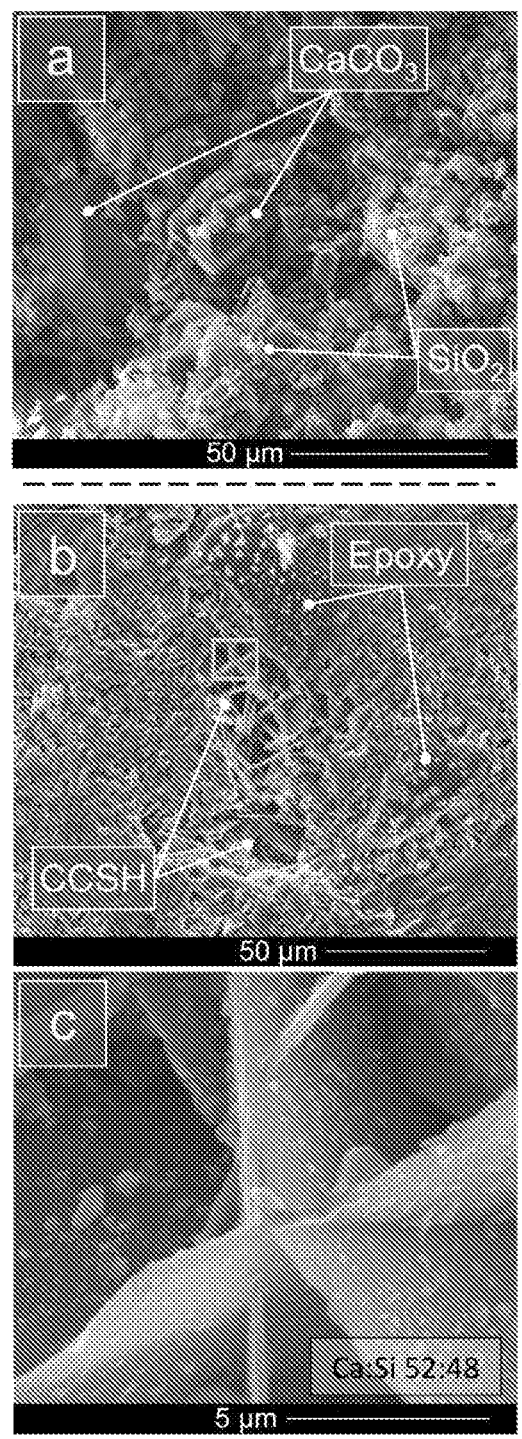
FIG. 26 compares representative calcium carbonate and amorphous silica morphologies (panel a), which result from aqueous pseudowollastonite carbonation with unmodified pH (no NaOH added) at 1.1 MPa P$_{CO2}$ with an example of CCSH morphology from an epoxied and sectioned column (panels b-c), resulting from aqueous pseudowollastonite carbonation with elevated pH (0.1 M NaOH). Sheet-like morphology was the only one observed for CCSHs in the columns.
Figure 27:
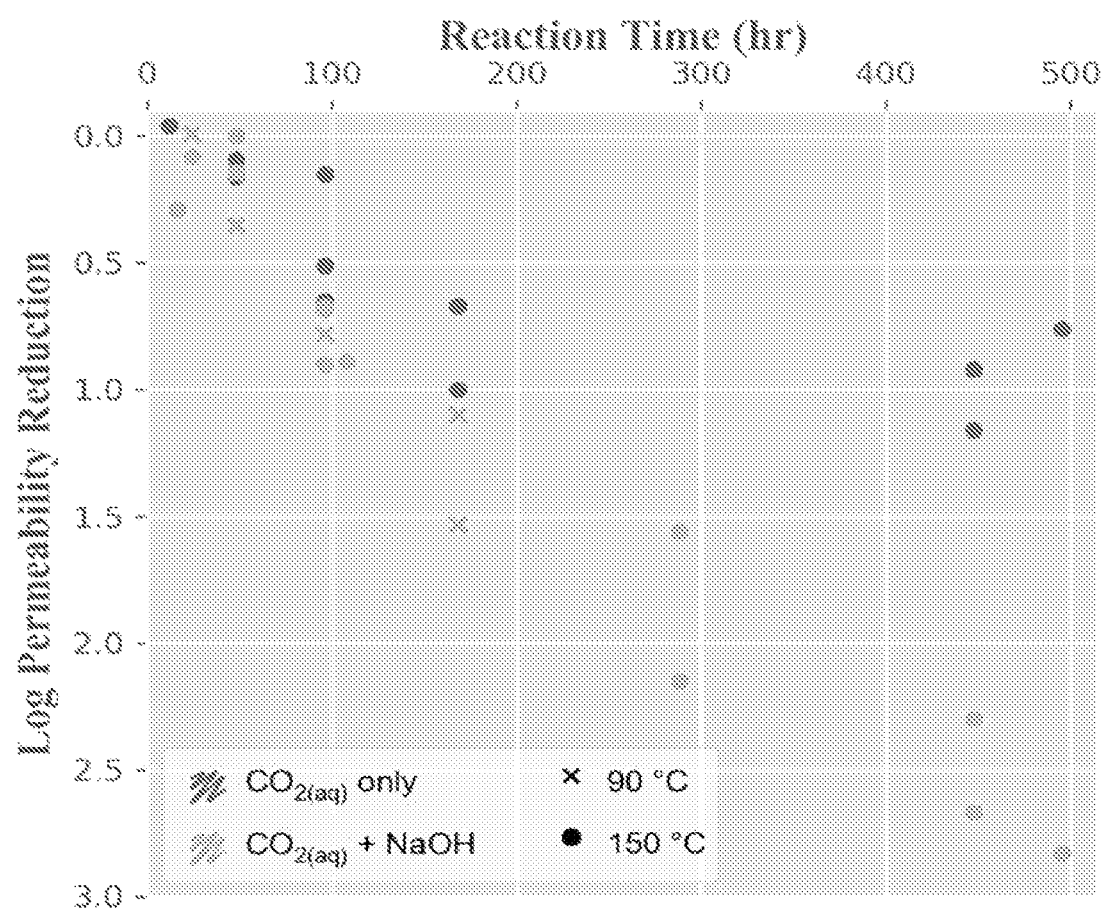
FIG. 27 is a plot showing the log reduction of permeability for columns reacted in CO$_2$ only and CO$_2$+NaOH as a function of reaction time.
Figure 28:
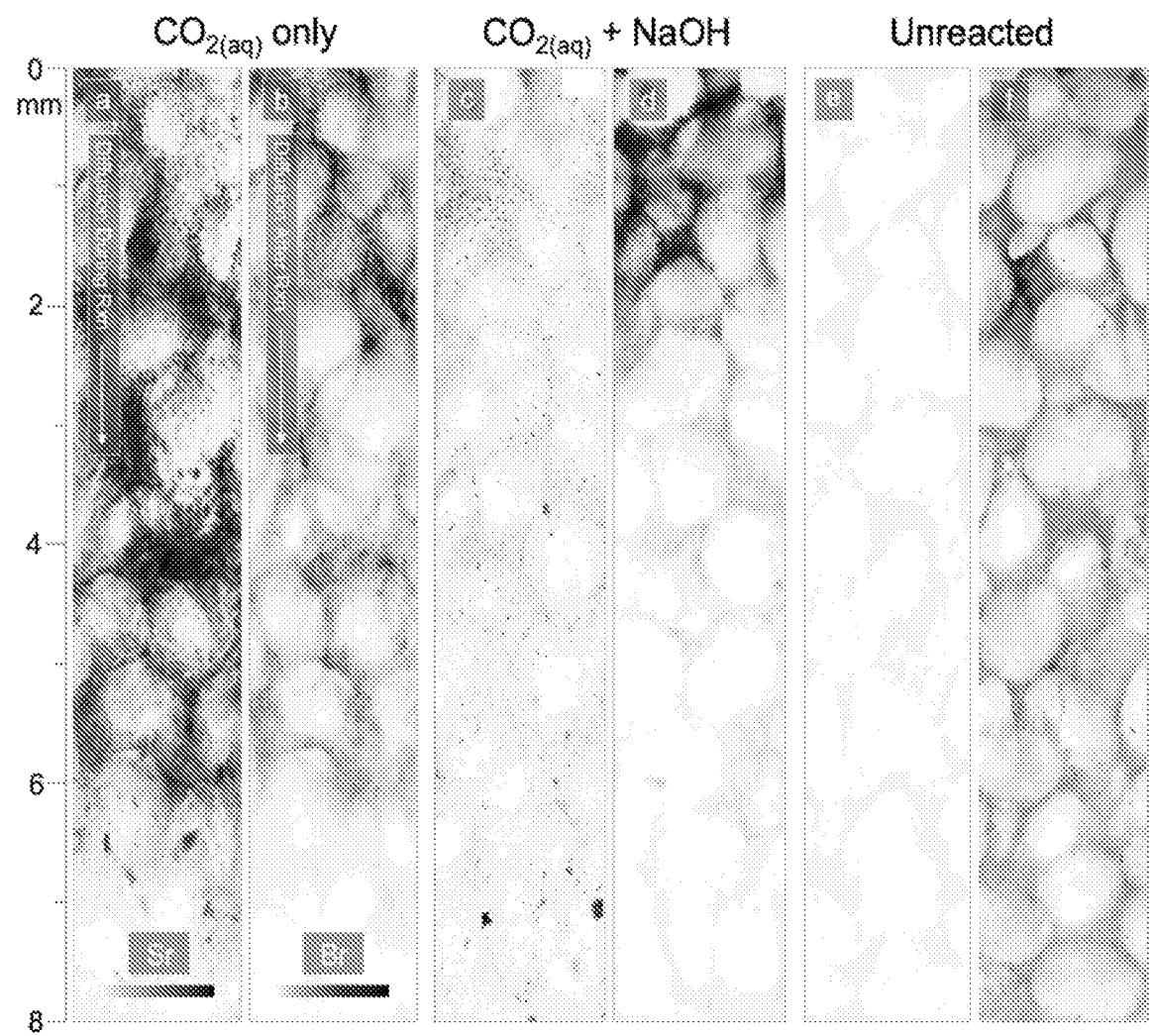
FIG. 28 shows micro-XRF maps of (left) Sr and (right) Br for the inlet 8 mm of columns reacted for 495 hr in (a, b) CO$_2$ only and (c, d) CO$_2$+NaOH compared to (e, f) an unreacted column. Dissolved Sr was present during the reaction period and appeared to coprecipitate with Ca in Ca-carbonate. Columns were submerged, upright, in a Br solution after the reaction period to visualize diffusivity of the columns, as a complement to permeability measurements. Each Sr map shares a common color scale. Likewise, each Br map shares a common color scale. The intensities shown in these maps are proportional to element concentrations.

The two types of precipitates shown in FIG. 26 had distinctly different impacts on permeability over time, as shown in FIG. 27. While decreases in permeability were observed in all columns, there were order-of-magnitude differences for those containing carbonates alone and those containing CCSHs. The results in FIG. 27 are plotted as a permeability reduction relative to the permeability of columns prior to reaction, which was generally on the order of 10-100 mD. Results from $CO_2$ columns show that permeability reduction from the precipitation of carbonates was limited to a maximum 1.16 orders of magnitude (from 37 to 2.5 mD) in the 495 hr reaction time at 150° C. (columns 20-31) and permeability reduction slowed after 168 hr of reaction. In contrast, the $CO_2$+NaOH columns (columns 7-19) exhibited continuously decreasing permeability, with a maximum reduction of 2.83 orders of magnitude (from 163 to 0.24 mD) after 495 hr of exposure. $CO_2$+NaOH columns that were reacted at 90° C. (to determine whether CCSHs could form and impact permeability at a range of temperatures, columns 1-6) follow a similar trend in permeability. For example, at 96 hr, the 90° C. column experienced a decrease in permeability of 0.78 orders of magnitude while the 150° C. columns experienced an average 0.75 orders of magnitude decrease. In control columns (32 and 33), where $N_2$ was used instead of $CO_2$, there was nearly no change in permeability (in fact, a slight increase from 69 to 99 mD at 96 hr of reaction) and there were no observed reaction products.

μXRF Mapping of Precipitation and Diffusivity. Synchrotron μXRF maps of columns 31 ($CO_2$), 19 ($CO_2$+NaOH), and 50 (unreacted control) are presented in FIG. 28. Each map was collected from the column's inlet (top) to a depth of 8 mm, over a width of 1.5 mm. Strontium substituted for Ca in aragonite, as expected, which was the principle carbonate that precipitated under these conditions (from μXRD analyses). In contrast, Sr did not substitute to a large extent in the CCSHs so the green Sr maps in FIG. 28 show the differences in carbonate precipitation between the columns.

In the $CO_2$ column, an abundance of Sr was observed in the first 7 mm (FIG. 28, column a), indicating a large quantity of solid carbonate precipitation. The Br maps illustrate the relative diffusivity of water into the columns following the reaction period. The Br front (FIG. 28, column b) nearly mirrored the Sr front, confirming that precipitates play an important role in controlling permeability. The permeability of the $CO_2$ column decreased from 87 mD to 15 mD during the reaction period. In contrast, the maps of the $CO_2$+NaOH column show Sr at relatively lower concentrations than in the $CO_2$ column, indicating less precipitation of solid carbonates (FIG. 28, column c) and bromine (FIG. 28, column d) was generally limited to the first 2-3 mm of the column but at high concentrations relative to the inlet of the $CO_2$ column. The permeability of the column decreased from 163 mD to 0.24 mD during the reaction period. It should also be noted that even though the columns were approximately 50 mm in length, the vast majority of precipitation and physical change occurred within the first ~5-8 mm at 495 hr. Permeability measurements assume a homogeneous medium throughout the entire length of the column and assuming the change in permeability is due primarily to the reacted regions, the permeabilities of the reacted zones are likely significantly lower than reported. The final column shown in FIG. 28 is a control that was unreacted (and therefore never exposed to Sr) so μXRF mapping shows no observable quantities of Sr (FIG. 28, column e) and the bromine front exceeded 8 mm (FIG. 28, column f) The permeability of that column was 141 mD.

Figure 29:
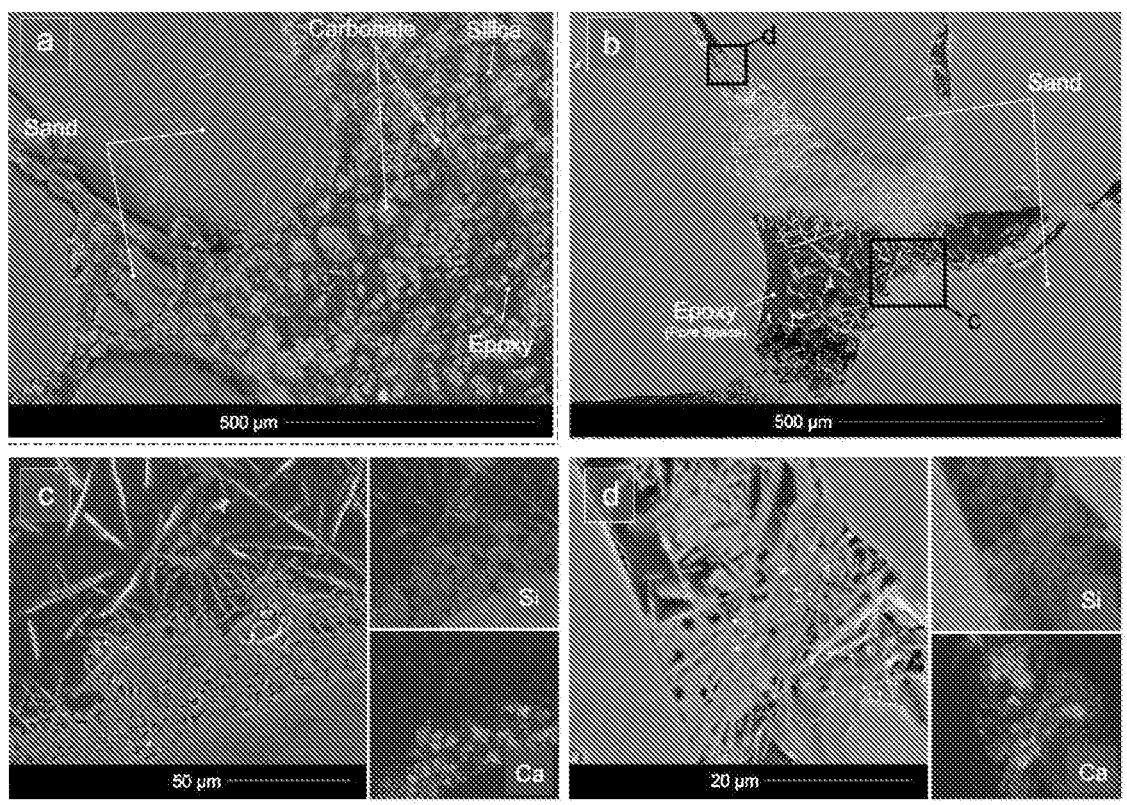
FIG. 29 (panel a) SEM micrograph of a representative pore in a CO$_2$ column, where Ca-carbonate and amorphous silica precipitated throughout the pore body indiscriminately. (panel b) Compared to SEM cross-section of a representative pore in CO$_2$+NaOH columns, showing a relatively open pore body but dense CCSH precipitation along sand grain edges and in the pore throats. (panels c and d) Inset EDS maps show that CCSHs in this pore appear to contain both calcium and silicon.

Precipitation Locations within Pores. Micro-XRF and SEM-EDS analyses of thin-sectioned columns suggest that the mechanisms that drive the reductions in permeability in the $CO_2$ and the $CO_2$+NaOH columns are observably different. In the $CO_2$ columns, solid carbonates precipitated randomly, without any preferred location within a given pore (e.g., in the pore body, along sand grain surfaces, or in pore throats; FIG. 29, panel a). In contrast, the CCSHs that formed in the $CO_2$+NaOH columns tended to form preferentially along the edges of sand grains, including in pore throats, which left a considerable amount of the pore body relatively open. A representative cross-section of a pore is shown in FIG. 29, panel b where the dark region, filled with epoxy, indicates a large open pore body (also evident from μXRF in FIG. 28, column d). EDS maps of the region (FIG. 29, panels c and d) show that the CCSHs are Si-rich but also contain Ca. The tendency for these CCSHs to nucleate and grow on sand grain surfaces, including where grains are close to one another, indicates that pore throats are filled relatively quickly, potentially leading to dramatic decreases in permeability.

Figure 30:
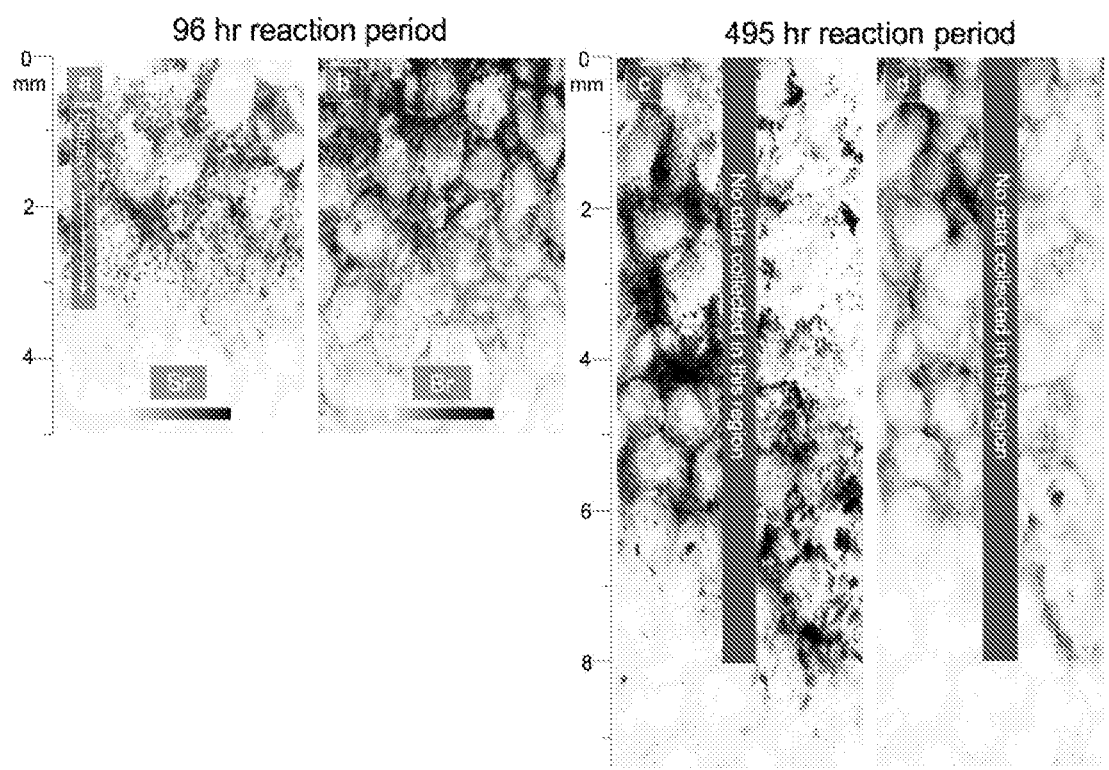
FIG. 30 (column a) Br and (column b) Sr μXRF maps of 96 hr CO$_2$ column experiments show a uniform carbonation front normal to the direction of diffusion. In contrast, at 495 hr of reaction, the (column c) Br and (column d) Sr μXRF maps show a reaction front that is non-uniform and indicates redissolution of solid carbonates near the inlet of the column.

Temporal Evolution of Reaction Fronts. The reaction fronts in the $CO_2$ and $CO_2$+NaOH columns evolved differently over time. After reacting for 96 hr, the carbonation front in $CO_2$ columns penetrated approximately 3 mm into the column and was uniformly distributed across the inlet of the column (FIG. 30, column a). Bromine was abundant and exceeded 8 mm, indicating that water was able to diffuse though this column (the first 5 mm are shown in FIG. 30, column b). After reaction for 495 hr, the Sr front advanced to nearly 8 mm but was non-uniformly distributed normal to the direction of diffusion (FIG. 30, column c). In some areas near the inlet, both Sr and Ca concentrations (Ca not shown) were low, suggesting that the carbonate that precipitated in this region dissolved in accordance with eqn. 4, leaving large, open spaces allowing Br to diffuse to a depth >8 mm (FIG. 30, column d). The carbonate redissolution could explain why the permeability in the $CO_2$ columns did not continue to decrease over longer durations.

In contrast, the reaction front of $CO_2$+NaOH columns never exceeded ~3 mm, regardless of reaction time. This could explain why the permeability in these columns continued to drop over time. SEM analyses suggest that the large re-dissolved regions did not exist in the $CO_2$+NaOH columns.

Effects of Ion Concentrations on Precipitation Products and Permeability. To explore the effect of $CO_2$ on CCSH formation in columns, the partial pressure of $CO_2$ was varied in several experiments. When the $P_{CO2}$ was increased to 3.4 MPa for 24 hr (column 34, 0.1M NaOH), an abundance of CCSHs and Ca-carbonate were observed near the inlet of the column. The permeability of the column decreased by 1.02 orders of magnitude (47.8 to 4.6 mD) during reaction. At higher partial pressures of $CO_2$ (15.5 MPa, 24 hr, column 48), the permeability after reaction was too low to measure in the laboratory, suggesting at least three orders of magnitude reduction (from 42.5 mD). Evaluation of the columns following reaction revealed that abundant CCSH and Ca-carbonate precipitates had formed in the first several mm of the column.

These results suggest that the formation of CCSHs is pH dependent, which is consistent with studies of CSH gel in concrete. Interestingly, a few columns reacted without NaOH, at 3.4 MPa $CO_2$ for 72 hr (numbers 42-47), also yielded some CCSHs, although at a much lower concentration than in columns containing NaOH. This result was unexpected, because we had not previously observed CCSH formation without NaOH present. Because of this result, we postulate that the concentration of dissolved carbon plays an important role in CCSH precipitation. Modeling (PHREEQC) suggests that in the 1.1 MPa experiments, the addition of NaOH increases the total dissolved carbon concentration in the batch solution from 0.09 to 0.19 M. In the 3.4 MPa experiments, the dissolved carbon concentration is already high in both conditions due to the high pressure of $CO_2$ (0.38 and 0.29 M carbon, with and without NaOH, respectively). To ensure that the role of NaOH in this reaction mechanism was driven by the acid/base properties of $OH^-$ and not $Na^+$ (since cations in solution have been shown to affect $CO_2$-induced dissolution of minerals), one additional column (number 49) was reacted with 3.4 MPa $CO_2$ and 0.1 M NaCl rather than NaOH. The only products that were observed were Ca-carbonate and silica. In analogous work in Mg carbonation, NaCl increased carbonate precipitation by increasing the $Mg^{2+}$ dissolution rate, so the lack of CCSHs in this column could be due to that effect or impacts from ionic strength but our previous experiments have shown that NaCl does not have a notable impact on CCSH formation when NaOH is present.

Figure 31:
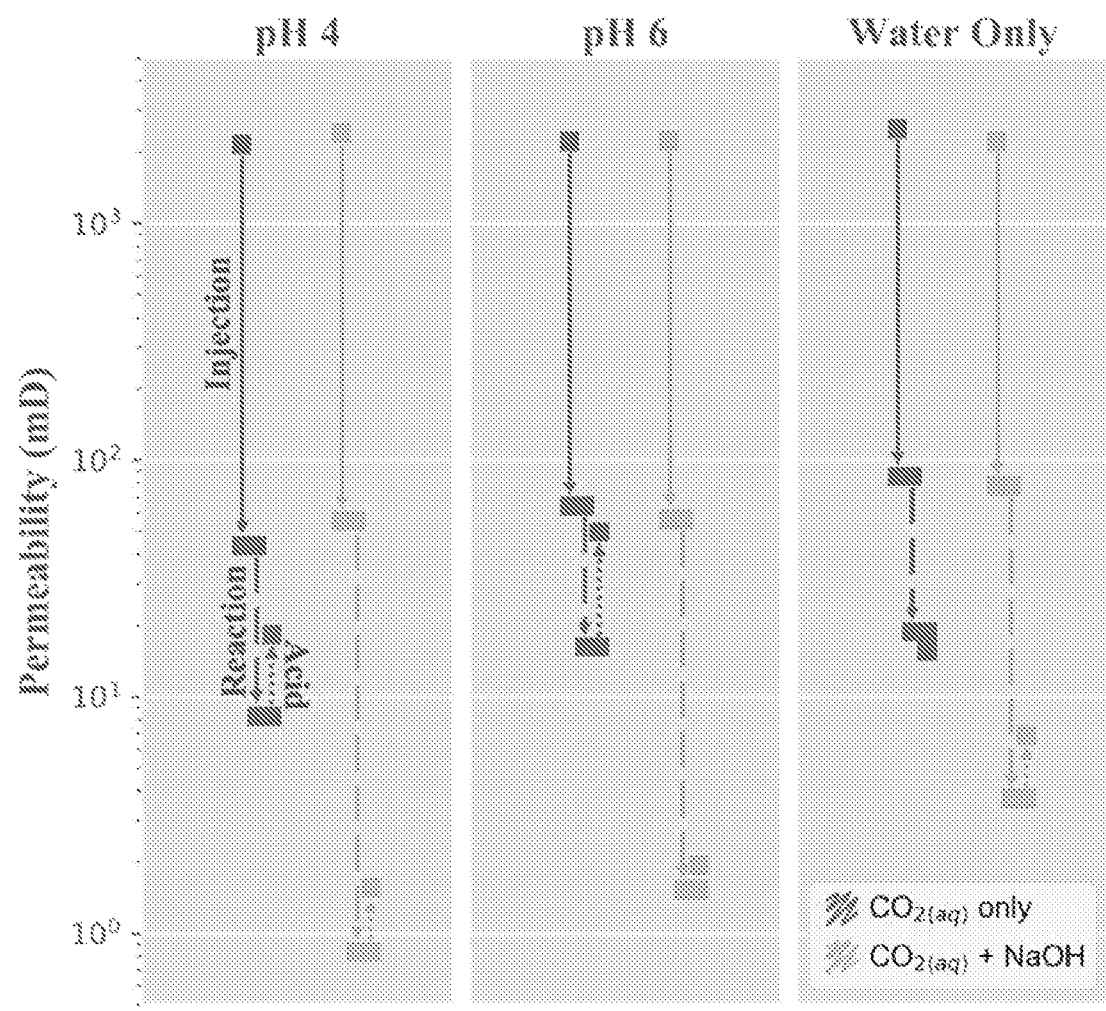
FIG. 31 is a plot showing the permeabilities of CO$_2$ only columns and CO$_2$+NaOH columns prior to CaSiO$_3$ injection, after injection, after the 72 hr reaction period, and after 16 hr acid diffusion at (top) pH 4 and (center) pH 6, and with only DI water diffusion (bottom).

Stability of Reacted Columns Under Acidic Conditions. To evaluate the long-term stability of these precipitated CCSHs, the permeability of two column types was evaluated following reaction for 72 hr at a $CO_2$ pressure of 3.4 MPa (columns 35-47). The permeability of each sample was measured after a 16 hr acid treatment in acetic acid/sodium acetate solutions[38] ranging from pH 4 to 6 (and a DI water control). As shown in FIG. 31, in the $CO_2$+NaOH columns, the permeability remained nearly constant after acid treatment, while in the $CO_2$ columns, permeability increased and approached the pre-reaction permeabilities. The pH 4.5 columns and the DI water columns were sectioned and observed under SEM, where it was apparent that CCSHs remained intact at approximately the same quantity (based on SEM observation) regardless of acid treatment while the Ca-carbonate in the pH 4.5 columns had largely been dissolved compared to the water control column.

Effects of Temperature on CCSH Precipitation. As discussed above, the local concentrations of Ca and Si ions governed the stoichiometric ratios in the precipitates. In that case, a wide range of Ca and Si concentrations might be expected in the CCSHs because local ion concentrations are expected to vary considerably due to dissolution, precipitation, temperature, and chemical and pressure gradient effects. To extend that mechanism and study these reaction products, additional powder batch experiments were performed to better understand the effects that time and temperature have on these precipitates in the absence of the mass-transfer and heterogeneity effects that may exist in column experiments.

The first condition that was tested was the effect of temperature on CCSH formation. Experiments with 0.1 M NaOH and 1.1 MPa $CO_2$ were conducted for 24 hr at 75, 90, 110, and 150° C. At 75 and 90° C., Ca-carbonate precipitates predominated and even though CCSHs were present, they were small. At 110° C., CCSHs were abundant and there were no obvious differences from the 150° C. samples.

Figure 32:
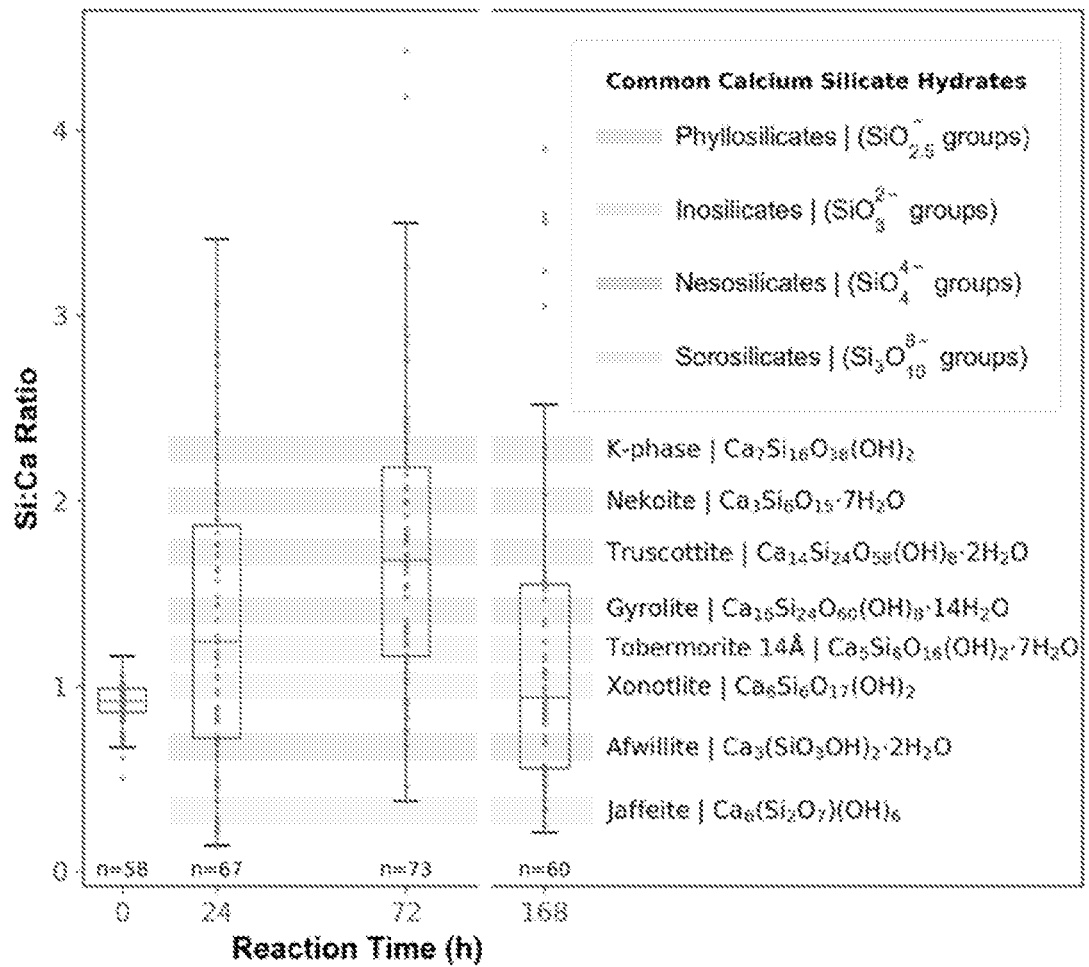
FIG. 32 show the silicon to calcium ratios of CCSH phases from powder batch experiments reacted in 0.1 M NaOH+0.19 M CO$_2$ for 24, 72, and 168 hr. The ratio for unreacted pseudowollastonite is also shown at 0 hr. The Si:Ca ratios vary widely at all time periods and do not clearly seem to approach any particular ratio.

Effect of Time on CCSH Composition. An additional set of batch experiments at 150° C. was conducted for 24, 72, and 168 hr to investigate the effect of time on CCSH composition. We did not observe a trend in Si:Ca ratios of the precipitated phases (FIG. 32). It is clear that over the time scales tested here, a wide variety of mineral compositions are present within these CCSHs, from Si-rich to Ca-rich.

TEM-SAED analyses from 24 and 168 hr experiments confirmed that the CCSHs were crystalline (i.e., bright diffraction spots) but each sample had a unique diffraction pattern and we were unable to definitively match any to know materials. Approximately 90° symmetries were observed so only CCSHs that have at least partially orthogonal geometries are presented in FIG. 32.

Environmental Implications

The results presented here could enable new methods for controlling fluid flow in the subsurface. From a phenomenological perspective, the carbonation of calcium silicates that produce CCSHs effectively reduces the permeability of porous media to a greater extent than calcium silicates that produce only carbonates. From a mechanistic standpoint, we present evidence that the formation of these CCSHs is somewhat sensitive to pH but will form over a range of time, temperature, and $P_{CO2}$ conditions. Taken together, these results inform an understanding needed to deploy this chemistry in the field, which may involve injecting mineral silicates in a pH-controlled slurry or tailoring the chemistry of injected fluids into formations.

The deliberate formation of CCSHs is an attractive means for blocking flow for a number of reasons. The apparent tendency for the CCSHs to precipitate on interfaces and in pore throats suggests that the reaction pathways identified here could be an efficient way to block flow in porous media. The stability of CCSHs relative to carbonates when exposed to acidic solutions suggests that CCSHs may be more effective at long-term stabilization and permeability control in geoengineering applications.

Naturally, there will be challenges associated with using CCSHs to block flow in the subsurface. Understanding and, in some cases, engineering appropriate aqueous chemistry in complex and heterogeneous formations will require substantial efforts in field-scale observation and modeling. In some settings, such as EGS, CCSH-producing silicates might be injected. In other applications, such as GCS in basalts, having a detailed understanding of this chemistry could help explain fluid migration in some cases.

Finally, a number of aspects of CCSH formation are still poorly understood. For example, the role of $CO_2$ in these reactions has not yet been fully characterized. The formation of CCSHs does not appear to proceed without $CO_2$ yet none of the phases we have observed match known carbonate-containing calcium silicates, so future work could assess the specific role that $CO_2$ is playing in these reactions.

Example 5. Synthesis of High-Performance Crystalline Cement Via Calcium Silicate Carbonation Cement is the world's most widely consumed man-made material and it contributes between 5-10% of total annual anthropogenic $CO_2$ emissions. In this example, we describe a new method for producing crystalline calcium silicate hydrate (CCSH) phases with low lifecycle carbon emissions. CCSH phases are more similar in chemical composition to ancient Roman cements than to modern ordinary Portland cement (OPC). The materials were made by curing silicate feedstocks, with equimolar ratios of calcium and silica produced by dissolving the mineral pseudowollastonite, under elevated partial pressures of $CO_2$ in buffered aqueous solutions. CCSH mortars cured for seven days achieved compressive strength of 13.9 MPa, which is comparable to the 28-day strength of Type-S OPC mortars. Bromide diffusivity tests, used as an indicator of durability of the materials, show that CCSH mortars have significantly lower diffusivity than OPC. The resistance to dissolution at low pH of the materials was measured using acid exposure tests and found that CCSH mortar lost only 3.1% of its mass compared to 12.1% in OPC. Total carbon measurements showed that these materials can sequester between 169 and 338 g of $CO_2$ per kg of cement, as opposed to OPC, which emits nearly 1,000 g of $CO_2$ per kg. A lifecycle analysis of CCSH cement production suggests that these materials could be made at an industrially-relevant scale with a fraction of the energy and carbon emissions of conventional cements, indicating this calcium silicate carbonation process could be enabling chemistry for all new low-carbon and high-performance infrastructure materials.

INTRODUCTION

Figure 33:
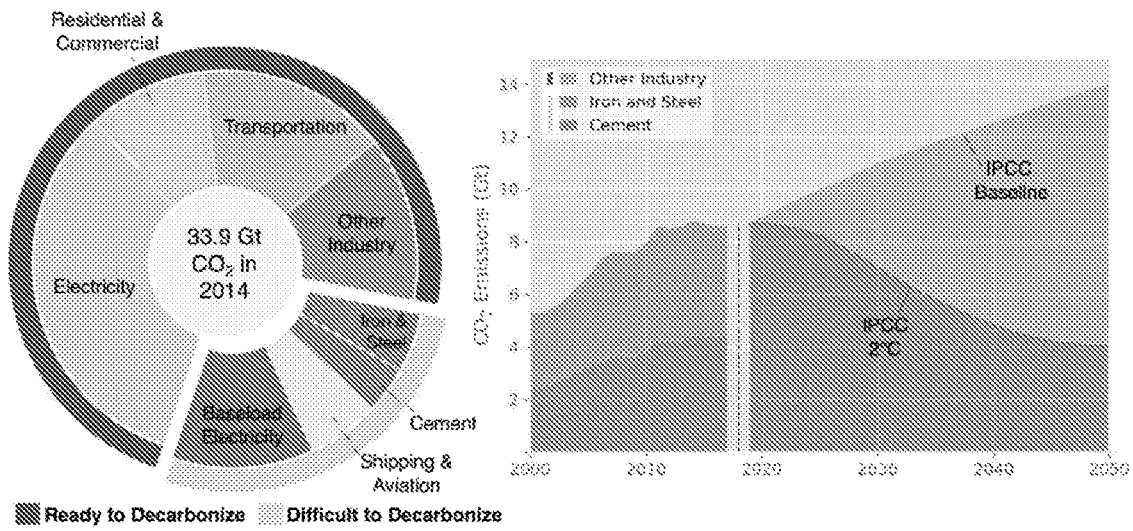
FIG. 33 illustrates the role of cement in the context of decarbonization. The Intergovernmental Panel on Climate Change (IPCC) has established the need for global reductions in CO$_2$ emissions across a range of sectors, some of which are ready to decarbonize and some that are more challenging to decarbonize. Of those more recalcitrant sectors, cement production is particularly challenging both because its use is accelerating worldwide and because low-carbon alternatives have yet to be developed.

Decarbonizing the global economy to address climate change will require dramatic changes to our energy, transportation and industrial infrastructure. While some of these transitions, e.g., electrifying transportation, seem increasingly achievable, others, e.g., decarbonizing some industrial processes, remain elusive. Of all the industries that are most difficult to decarbonize, iron/steel and cement manufacturing stand out as the two largest global emitters of greenhouse gas emissions (FIG. 33). Cement is particularly problematic because its demand is growing roughly twice as fast as global steel production and its importance in infrastructure makes it the most produced synthetic material in the world in terms of volume. Over 4.1 billion metric tonnes of Portland cement were produced in 2018 contributing ~8% of global $CO_2$ emissions. Most of this production is occurring in developing countries like China, which produced more cement between 2017 and 2018 than the United States did in the entire $20^{th}$ century. Meeting mid-century goals for global carbon emissions reductions will require new ways to synthesize cementitious materials with the right combination of cost, scale, and performance Ordinary Portland cement (OPC), the most common form of cement used worldwide, is carbon intensive for two principal reasons. First, OPC is generally produced by heating limestone, predominantly comprised of calcium carbonate ($CaCO_3$), to produce CaO, via:

$$CaCO_3 + heat \rightarrow CaO + CO_2 \qquad (5)$$

This calcination reaction produces approximately 550 kg of $CO_2$ per tonne of cement produced. Second, the CaO is subsequently heated to between 1400-1500° C. with sources of silica and alumina (generally clay, shale, and sand) at (3:1) and (2:1) Ca:Si ratios to produce clinker (consisting predominantly of $Ca_3SiO_5$ and $Ca_2SiO_4$), the raw form of OPC. Heating the feedstock to these high temperatures requires large amounts of energy and the industry uses predominantly coal (69%), oil (17%), and natural gas (9%) for this purpose. Reliance on these fossil sources of energy is carbon intensive and it has been estimated that the heating-related emissions from OPC production are between 267 and 534 kg $CO_2$/tonne cement.

The chemistry of OPC is complex and varied but is generally related to its calcium:silicon ratio and the three-dimensional structure of calcium silicate hydrate (CSH) gels that emerges when the material is hydrated. Even though most of the demand for cement is in pour-in-place applications, the fastest growing sub-sector in the cement market is for pre-cast structures that are manufactured under controlled conditions and delivered to construction sites ready for assembly. This precast market currently comprises approximately 12% of the market for OPC in the United States. Precast elements are desirable because curing conditions can be carefully controlled and the lifespan of the material can be extended. Cements often degrade when cations (e.g., magnesium, sulfate, carbonate) attack calcium hydroxide and CSH gels. The precipitates from these reactions (e.g., ettringite, brucite, aragonite) are often insoluble but they can adsorb water, which can cause swelling from within the bulk of the material, generating internal pressure, and cracking the concrete. The failure of concrete continues as fractures develop between the cement binder and the sand or aggregate. As these microcracks form, there is little to stop their propagation, enabling infiltration of water and freeze-thaw cycles that further degrade the integrity of the material. In reinforced structures, these fractures allow water, often containing high salt concentrations, to reach metal reinforcements leading to corrosion, opening even more fractures and negating the tensile strength of the concrete, allowing the feedback loop to continue.

Efforts to develop cements with improved durability have generally focused on additives that reduce the permeability of the material since corrosion typically occurs via solute penetration and attack. Efforts to reduce the environmental impact of cements have generally sought to blend pozzolanic industrial waste materials rich in silica (e.g., fly ash, slag) with virgin cement to partially offset the energy and emissions required to manufacture ordinary Portland cement. Ongoing work seeks to create non-hydraulic calcium silicates that react with $CO_2$ to produce $CaCO_3$ and $SiO_2$, a common weathering reaction important in carbon cycling via $$CaSiO_{3(s)} + 2CO_{2(aq)} + H_2O \rightarrow Ca^{2+} + 2HCO_3^- + SiO_{2(am)} \qquad (6)$$

These ions can then precipitate out of solution to form carbonate species via:

$$Ca^{2+} + 2HCO_3^- \rightleftharpoons CaCO_{3(s)} + CO_{2(aq)} + H_2O \qquad (7)$$

These cements sequester a significant amount of $CO_2$ during curing but may not outperform ordinary Portland cement in terms of lifetime, particularly under mildly acidic conditions, when eq. 7 proceeds in reverse.

The carbonation of the model calcium silicate at elevated temperatures results in the formation of carbonate in addition to crystalline calcium silicate hydrates (CCSH) phases. These CCSH phases are mixed, consisting of a mineral species such as tobermorite-11A via:

$$3CaSiO_{3(s)} + OH^- + H_2O \xrightarrow{heat} Ca_2Si_3O_9(OH) \cdot H_2O + Ca^{2+} \qquad (8)$$

pectolite via:

$$2CaSiO_{3(s)} + OH^- + Na^+ \longrightarrow CSH\ gel \xrightarrow{heat} Ca_2NaSi_3O_8(OH) + \tfrac{1}{2}O_2 \qquad (9)$$

and a number of other mineral phases (e.g., plombierite and rankinite). Centuries ago, Roman engineers generated famously durable hydraulic cements, which yielded plate-like crystalline calcium silicate hydrate mineral phases such as tobermorite and phillipsite, among others. Roman cements rely on raw materials that are not common outside of volcanically active regions and are therefore difficult to scale.

In this example, we describe a new method to synthesize crystalline calcium silicate hydrate (CCSH) phases, similar to those in Roman cements while also utilizing and permanently storing $CO_2$. The reactions that lead to these phases are sensitive to Ca:Si ratio in the dissolved aqueous phase as well as pH and partial pressure of $CO_2$. This work sought to test three hypotheses related to the feasibility of using these materials in infrastructure applications. The first is that these materials have mechanical properties that are comparable or superior to conventional ordinary Portland cement because of the cementitious behavior of the crystalline precipitates. The second is that these materials have lower permeability (due to the transecting manner in the which the precipitates form) and thus higher durability than conventional options. The third is that these materials would have a significantly lower carbon footprint than conventional OPC cement and could be an enabling chemistry for decarbonizing the cement industry.

Materials and Methods

Pseudowollastonite Synthesis. A 1:1 calcium:silicon mixture was produced on the kilogram-scale by milling Huber-Crete G Extra Fine Limestone (Huber Engineered Materials) with Elkem Microsilica 965U (Elkem Materials, Inc.) in 5-liter ball mills for one hour. The milled powder was then mixed with a 5% NaOH/water solution at 25%. The NaOH acts as a flux during the heating process to create higher-purity pseudowollastonite, though it is not required. The mixture was dried and then heated at 1225° C. for 6 hours in a kiln, although temperatures as low as 1175° C. and shorter durations were tested and yielded pseudowollastonite. We chose to use NaOH, higher temperature, and longer heating time to ensure the highest possible quality pseudowollastonite for research purposes. The pseudowollastonite was then ground, ball-milled for 1 hour, and sieved to pass the number 200 sieve. X-ray diffraction was conducted via a Panalytical X'pert Pro diffractometer with a copper source ($K\alpha$=1.5406 Å) from 15-65° 2θ. Analysis via Panalytical HighScore Plus with PDF-4+ 2019 database confirmed an excellent match for pseudowollastonite.

Mortar Cube Design of Experiments. 2-in mortar cubes were cast and tested in compression in accordance with standard ASTM specification C109. We established a general methodology for curing the mortar specimens, which includes (1) elevating the pH of the mix water, curing the specimens at 90° C. and (2) elevated pressure of $CO_2$ gas for 72 hr until the specimens are hardened, then demolding and submerging them in (3) an alkaline solution again at (4) elevated temperature with (5) $CO_{2(aq)}$ for 96 hours, for a total of 7 days of curing. Water-$CO_2$ equilibrium pH was calculated with PHREEQC (V 2.18) with the PHREEQC database. The purpose for the 3-day dry-curing period was to harden the cubes so that they could be demolded and handled and the initial mix water within the cubes facilitated the carbonation/hydration reactions. During the 4-day wet-curing phase, the $CO_2$ in the headspace equilibrates with the water, depending on temperature, partial pressure, and concentration of NaOH and previous work has shown that these factors all affect CCSH precipitation dynamics. The Taguchi design of experiments was employed to determine the curing conditions to yield the highest 7-day compressive strength by testing three levels of each of the five factors. After the initial Taguchi matrix was completed, another three-factor, two-level one was used to determine optimal mix proportions of sand, pseudowollastonite, and water, also in terms of compressive strength, which was measured with a Humboldt Master Loader Elite Series load frame.

Carbon Uptake. Portions from crushed mortar specimens were collected, ground with a mortar and pestle, and analyzed via a Shimadzu SSM5000A total carbon analyzer. The analyzer heats the samples to 980° C., where carbonate decomposes, and detects the mass of carbon in a stream of oxygen. Because the samples include the sand from the mortar, the carbon content, a percent of the original sample mass, was adjusted to be expressed in terms of the mass of cement (pseudowollastonite) based on the mix proportions of cement-to-sand.

Synchrotron X-ray Fluorescence Mapping. A small cylindrical mortar sample (14 mm diameter by 30 mm length) was cast and cured in conditions similar to the optimized curing conditions from the first Taguchi matrix, with the exception that it was set in dry $CO_2$ for 24 hours and then set in the aqueous phase for 48 hours. An ordinary Portland cement mortar specimen (Type I/II) of the same size was made with C109 standard mix proportions and was cured for 1 day in the mold then submerged, demolded, in water and allowed to cure for 6 more days. Both samples were then submerged in fresh DI water for 1 hour to saturate the samples. Subsequently, they were submerged in a 0.1 M NaBr (J. T. Baker, ACS reagent) solution for 6 hours where the Br diffused from the solution, into the samples. They were then removed and dried in an oven at 75° C., epoxied (Buhler EpoThin 2), and sectioned lengthwise.

For each sample, synchrotron X-ray fluorescence mapping of Br was conducted on a 3 mm wide by 4.5 mm deep section that began at the outer edge of the specimen. The mapping was completed at the 13-IDE sector at the Advanced Photon Source with a 4-element silicon drift diode detector at an incident energy of 18 keV with 20 μm steps and dwell times of 20 ms. Map data were exported from Larch software and visualized in Python 3.6 with the viridis colormap. The colormap ranges were identical between both maps. For each pixel, the Br counts were normalized to the incident energy for that pixel to account for fluctuations in the beam intensity. Because the colors are equal representations of the Br counts detected at each pixel in each sample, and because the detector geometry was the same between both, the relative concentrations of Br may be compared between the two maps.

Acid Dissolution Tests. Two mortar cubes were cured similarly to the optimal design from the first Taguchi matrix to test their resistance to acid dissolution. Two additional, predominately carbonate cubes were created with the same mix but without any pH buffering from NaOH and two additional OPC cubes were cured for 28 days. All six cubes were dried, weighed, and submerged for 7 days in a 1 M sodium acetate and acetic acid solution at pH 5. After 7 days, the specimens were removed, oven dried, and loose materials were gently removed by hand. They were then reweighed to determine mass loss during the acid treatment. Compressive strengths could not be determined because the surfaces of the specimens were rough and no longer remotely planar in some cases.

Lifecycle Analysis. The functional unit for the lifecycle comparison between OPC and CCSH cement manufacturing emissions was 1 metric tonne of cured cement. We also expressed emissions in terms of 1 tonne of cured concrete, assuming that cement comprises 14% of concrete. The use phase was outside of the scope of the LCA because of its high variability, though it should be noted that it possible for OPC to carbonate (and CCSH cement to continue carbonating) over decades with expose to atmospheric $CO_2$. However, those timescales, along with an inability to predict the carbonation extents, make it difficult to incorporate those emissions reductions and do not align with the urgent need to decarbonize as established by the IPCC.

The emissions associated with raw material quarrying, crushing, and transporting were retrieved from an extensive analysis by Marceau et al. for OPC that assumed the use of raw materials including limestone, sand, clay, iron ore, and gypsum. Since our production scenario for pseudowollastonite is currently based on utilizing waste silica fume (or fly ash) and mined limestone, the emissions for 1 tonne of OPC for this process were scaled based on the mass of limestone for pseudowollastonite manufacture compared to the mass of all raw materials mined for OPC manufacture. Also, since CCSH cement sequesters $CO_2$ as a solid, which accounts for some percentage of the mass of the cured cement, less pseudowollastonite would be required to produce 1 tonne of cured CCSH cement so less limestone is required based on that aspect as well.

The emissions based on the calcination are based on the theoretical mass of $CO_2$ (molar mass=44 g/mol) in limestone, which was assumed to be pure $CaCO_3$ (100 g/mol). The mass of limestone required to make one tonne of cured OPC and CCSH-cement was multiplied by 0.44 to obtain $CO_2$ emissions from this process.

The pyroprocess emissions from fuel combustion that is required to heat raw materials to 1450° C. for OPC manufacture was calculated by first determining typical fuel requirements. Those fuel sources include coal, fuel oil, and natural gas, the percentages of which admittedly may vary widely with time and geographic location. Those fuel requirements were multiplied by the appropriate emissions factors established by the U.S. Energy Information Administration (EIA). The emissions for this process were assumed to scale linearly from 1450° C. for OPC to 1175° C. for pseudowollastonite (the temperature we have determined to be acceptable in our work).

Emissions from finish grinding and blending of OPC were also calculated by multiplying the typical fuel source requirements (energy from coal, fuel oil, and natural gas) from Huntzinger and Eatmon by the appropriate EIA emissions factors. The same energy requirements for this process were assumed for pseudowollastonite manufacture with the exception of scaling for the pseudowollastonite required to produce our functional unit, 1 tonne of cured cement.

Carbon uptake during the curing process for OPC was assumed to be negligible because it cures via hydration (not carbonation) in atmospheric concentrations of $CO_2$. For CCSH cement, $CO_2$ uptake was based on empirical data of percent carbon in the 7-day and 28-day mortar specimens presented in this example. The percent of carbon in mortar was measured and was then expressed in terms of the percent carbon in the cement phase (pseudowollastonite) of the mortar based on our mortar mix ratios. The percent carbon in the cement was then expressed in terms of percent $CO_2$ in the cement phase by multiplying by the ratio of the molar mass of $CO_2$ to the molar mass of carbon.

To express lifecycle emissions in terms of concrete, cement emissions were multiplied by the percent of cement that typically exists in concrete. Here, we assumed 14% based on a mix of 1-part cement, 3-parts sand, 3-parts larger aggregate, and 0.5 parts water (half of which is consumed during hydration, which is typically assumed in CSH hydration and was also assumed for CCSH hydration). That mixture was assumed to be identical between OPC concrete and CCSH-based concrete. We also added typical emissions that are associated with aggregate production, concrete plant operations, and cement/aggregate transport to concrete facilities based on volumetric emissions from an analysis of precast concrete and we assumed those emissions to be identical for both types of concrete. Those volumetric emissions were converted to mass emissions by assuming a concrete density of 2,400 kg/m³. Although CCSH concrete would be cured at moderately elevated temperatures, we assume that heat is waste from other industrial processes as described in the Discussion so those emissions have been omitted.

Results

Figure 34:
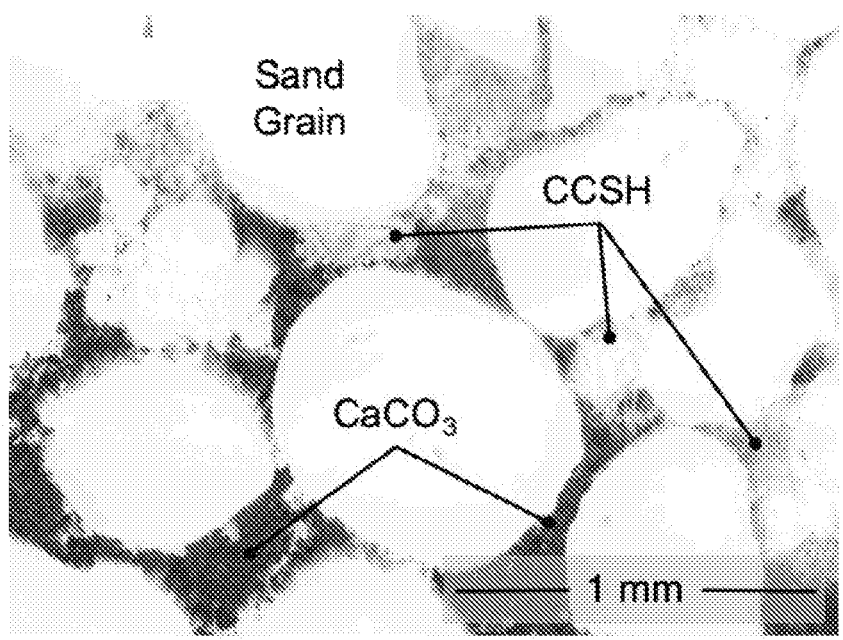
FIG. 34 shows a calcium μCRF map of CCSH mortars. CCSH phases tend to grow in pore throats between sand grains, effectively cementing the grains together and limiting permeability, whereas the carbonates grow more evenly throughout, binding CO$_2$ in the bulk mortar.

Synthesis of Crystalline Calcium Silicate Hydrates. The co-precipitation of crystalline calcium silicate hydrates (CCSH) phases and carbonates is possible using pseudowollastonite, a polymorph of wollastonite (both $CaSiO_3$). While wollastonite has a chain crystal structure, pseudowollastonite has a ring crystal structure that makes it more reactive (Eq. 6). The formation of CCSH phases, represented in eqns. 8 and 9 above, may occur in parallel or sequence with the carbonation reactions that proceed via eq. 7 but typically, one class of precipitate predominates, depending on reaction conditions. FIG. 34 shows how CCSHs tend to precipitate along solid interfaces such as sand grains, whereas carbonates tend to precipitate indiscriminately throughout pore bodies. These samples were produced by reacting pseudowollastonite and sand mortars reacted at 150° C. and 1.1 MPa $CO_2$ for 96 hours.

The relative abundance of $CaCO_3$ to CCSH phases appears to be influenced by at least three factors. (1) The reactivity of the parent silicate (eq. 6) is important because pseudowollastonite dissolves congruently whereas wollastonite dissolves incongruently. Since many of the CCSH mineral phases have Ca:Si ratios <1, the dissolution of mineral species like wollastonite, that leach calcium selectively resulting in a solid layer of cross-linked silica, do not have the molar ratios needed to produce CCSHs. (2) $CO_2$ is important in driving the reactions even though it is not incorporated into the CCSH phases, it accelerates the dissolution (eq. 6) and formation of $CaCO_3$ may be a necessary intermediate in the formation of some CCSHs. (3) The presence of NaOH is important because the $OH^-$ buffers the pH of the solution and the $Na^+$ plays an important role in nucleating the CCSH phases. $Na^+$ can also be incorporated directly in some of the CCSH mineral phases [e.g. Eq. 9]. Compressive Strength and Carbon Utilization of Various Cement Types.

Figure 35:
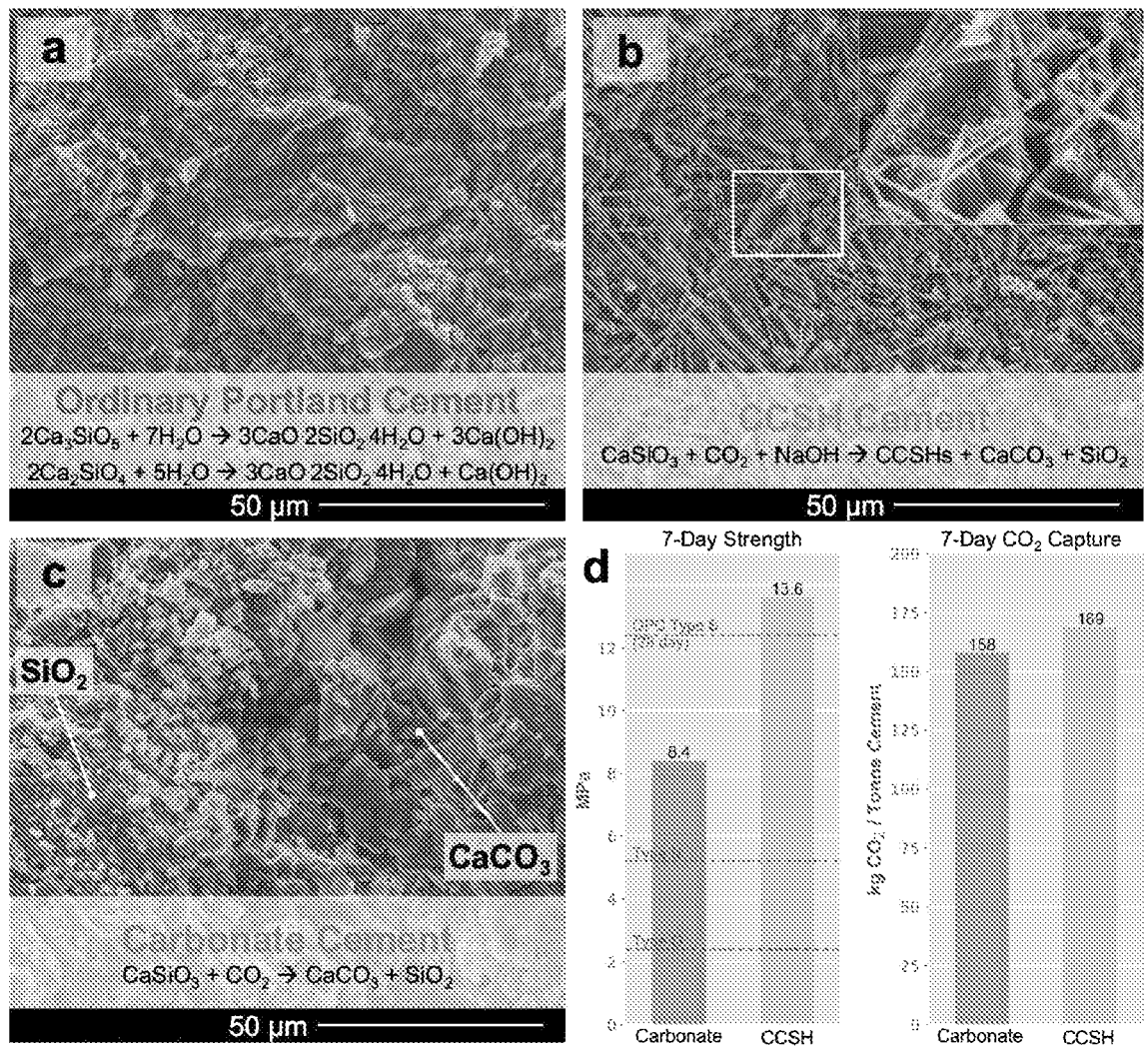
FIG. 35 compares the structural, mechanical, and CO$_2$ uptake capacity of cements. Macro- and micro-scale differences between (panel a) ordinary Portland cement mortar, (panel b) CCSH cement mortar, and (panel c) carbonate cement mortar. Panel (d) shows the compressive strength of 28-day OPC formulations (based on ASTM C270) relative to 7-day compressive strengths of the alternative cements, along with 7-day CO$_2$ uptake measurements.

Ordinary Portland cement derives its strength from the hydration of tricalcium and dicalcium silicates (alite and belite) that forms amorphous calcium silicate hydrate (CSH) gels, shown in FIG. 35, panel a. The CSH gels form around aggregate (sand grains in the case of mortar), binding the materials together and increasing in strength over the course of weeks.

FIG. 35, panel b shows how distinct the morphology of CCSH phases synthesized in this work are from the CSH phases in OPC. In our experiments, pseudowollastonite was reacted with $CO_2$ at elevated pH to produce interlocked platy crystalline phases. From FIG. 35, panel b, it appears that micrometer-scale plate/needle-like CCSH phases form initially in the vicinity of pseudowollastonite particles, replacing the original pseudowollastonite pseudomorphically. This stoichiometric dissolution mechanism may distinguish pseudowollastonite from wollastonite. An exogenous increase in pH may also be important for generating CCSH phases that are reminiscent of those credited with providing the strength and durability to ancient Roman concrete along with calcium carbonate and amorphous silica, as generalized in the equation in FIG. 35, panel b. The CCSH phases presented here tend to precipitate on solid-fluid interfaces (e.g., on sand grains) and form a lattice-like structure that has low permeability, compared to calcium carbonate precipitation, which occurs under the same conditions when pH is not buffered (shown in FIG. 35, panel c). While it is clear that the CCSH phases are cementitious, this example seeks to quantify the macroscale strength of mortar made from them and compare the strength to carbonate-based mortar and standards for OPC.

A Taguchi design of experiments was employed to optimize certain curing conditions and mix ratios for 2-in mortar cubes to serve as a proof-of-concept that these precipitates could serve as alternative cement materials. The design is further described in the methods. In short, we investigated the impacts of buffered pH in the water used to mix the specimens, the pressure of $CO_2$ during an initial 3-day setting phase in a $CO_2$ gas atmosphere, and the temperature, pH, and $pCO_2$ during a subsequent 4-day wet curing phase where the specimens were submerged in buffered water in a pressure vessel with $CO_2$ in the headspace.

Mortar specimens were tested in triplicate and generally followed the ASTM C109 procedure in order to compare compressive strength with OPC standard strengths of unit masonry from ASTM C270 (ASTM C270-19ae1, entitled "Standard Specification for Mortar for Unit Masonry" (2019), which is hereby incorporated by reference in its entirety), presented as dashed horizontal lines in FIG. 35, panel d. Our experiments concluded that CCSH mortar achieved compressive strengths as high as 13.6 MPa in 7 days of curing when the initial mix water pH (equilibrated with $CO_2$ in the headspace of the pressure vessel) was increased to 6.5, the pressure of $CO_2$ was 0.55 MPa, the pH of the 4-day curing water (equilibrated with headspace $CO_2$) was increased to 6.5 with 0.76 MPa $CO_2$ at 140° C. The analysis of variance of this Taguchi design indicated that the pH of the initial mix water, the pressure of $CO_2$ in the initial setting phase, and the temperature during the wet curing phase had the largest impacts on compressive strength. To test the strength of carbonate-mortar, similar specimens without any pH adjustment were tested in parallel and were found to have a compressive strength of 8.4 MPa, indicated in FIG. 35, panel d.

The carbon content of the optimal CCSH-mortars and the carbonate-mortar were measured by sampling fractured pieces from the compression tests. We found that for the optimized CCSH mortar, an average of 1.23% (mass) was carbon, which indicates that 169 kg of $CO_2$ per tonne of pseudowollastonite cement could be captured and utilized during the (7-day) curing phase. For two specimens that were cured for 28 days, that percent increased to 2.46%, or 338 kg $CO_2$ per tonne of cement. The carbon uptake in 7-day carbonate mortar was 1.15%, indicating utilization of 158 kg $CO_2$ per tonne of cement and the percent increased to 1.93% (265 kg $CO_2$ per tonne) in 28 days. While there is some calcium carbonate present in the CCSH mortar, the fact that its carbon uptake was greater than that of the carbonate mortar could be indicative of the CCSH phases incorporating carbon as phases such as scawtite [$Ca_7(Si_3O_9)_2CO_3 \cdot 2H_2O$)] or spurrite [$Ca_5(SiO_4)_2(CO_3)$], in addition to non-carbon-containing phases similar to tobermorite. The CCSH phases that form under such conditions are of mixed composition, with a range of calcium-to-silicon ratios (median of approximately 1) and a variety of crystal lattice parameters.

Figure 36:
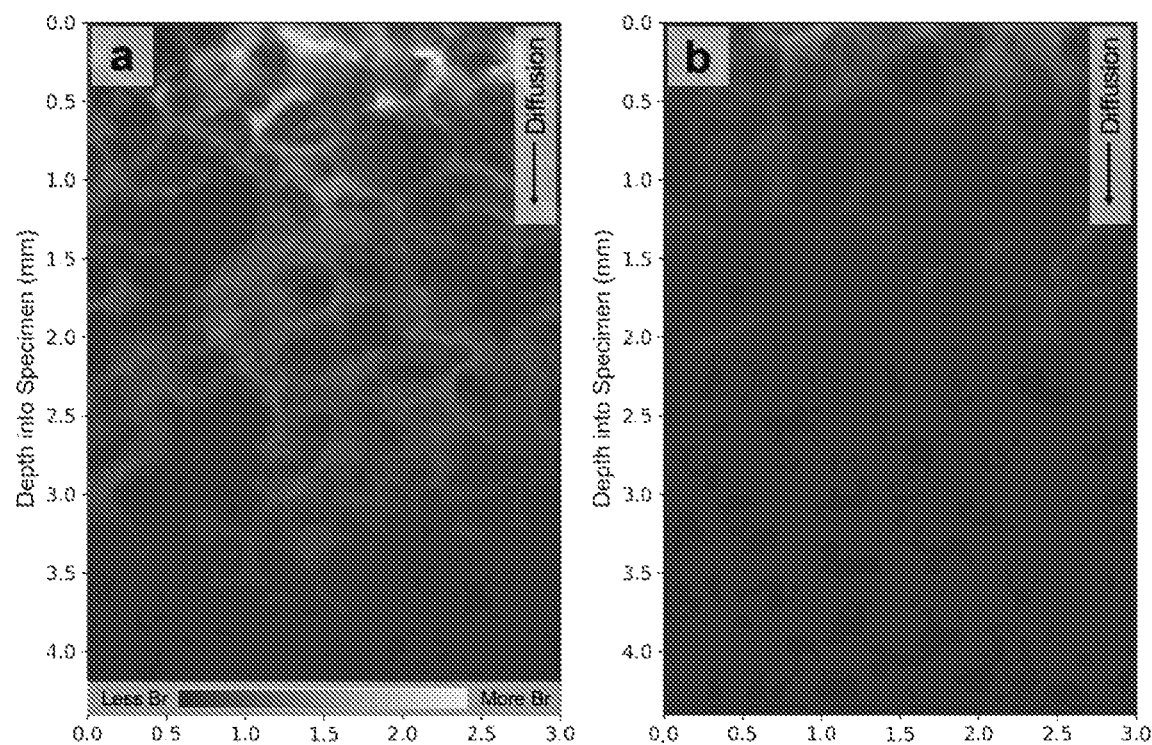
FIG. 36 shows an assessment of durability via ion diffusivity. Diffusion of a Br tracer into (sample a) a 7-day OPC mortar specimen and (sample b) a 72-hr CCSH cement mortar specimen measured by synchrotron-based X-ray fluorescence. The top of both maps align with the outer edge of the specimens and color map is shared, allowing a comparison of relative Br concentrations.

Comparisons of Durability. Cement durability is often reported in terms of solute diffusivity into the bulk material because interactions between the cement (or steel reinforcement) and dissolved ions is the principal failure mode in many applications. To evaluate the diffusivity of ions into our experimental and control samples, mortar samples were produced and submerged in a 0.1 M NaBr solution. Chlorine is often used for this purpose in the cement literature but in order to visualize the ion diffusion using synchrotron-based fluorescence, we used bromide, which behaves like chloride in the cement but is much more easily detectable in μXRF. The results shown in FIG. 36 show that over a relative short 6-hr exposure to the NaBr solution, the bromide penetrated much further into the OPC sample (FIG. 36, sample a) than it did into the CCSH sample (FIG. 36, sample b). These results are consistent with air permeability measurements which show order of magnitude differences between CCSH materials and alternative cements.

Figure 37:
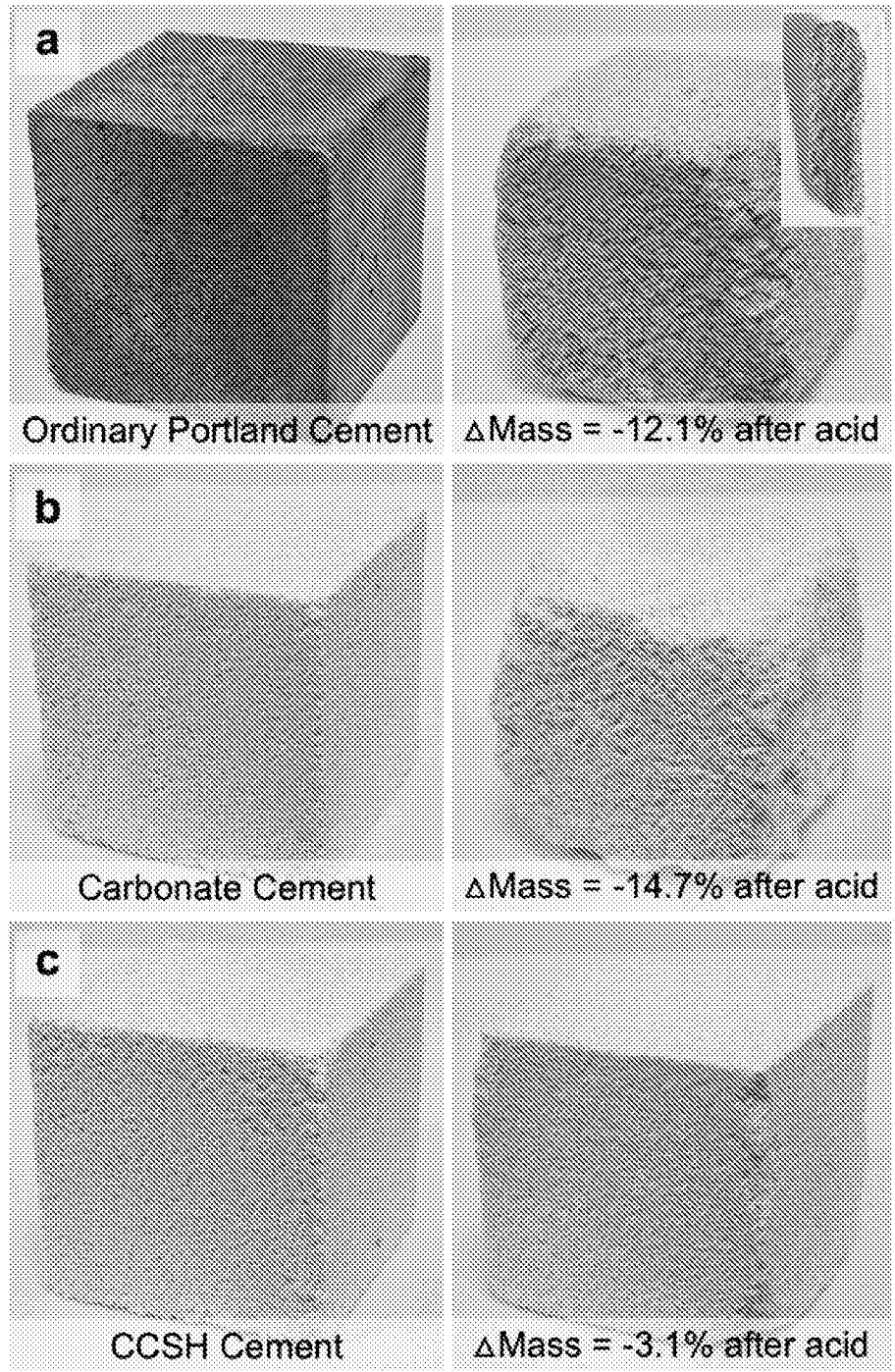
FIG. 37 includes a comparison of acid resistance. 2-inch mortar cubes made with (sample a) ordinary Portland cement, (sample b) carbonate-based cement, and (sample c) CCSH-based cement were aged for 7 days in an acidic solution (pH=5). The visible corrosion and change in mass reveal the extent to which CCSH phases are resistant to acid attack when compared to the alternatives presented in this work.

The performance of cements is also evaluated in terms of its reactivity under acidic conditions, which are common in the environment and which can lead to deterioration and premature failure. To evaluate the efficacy of CCSH cements relative to OPC and carbonate alternatives, 2-inch mortar cubes (2 OPC, CCSH, and carbonate cubes, each) were submerged in aqueous solutions with a pH of 5 (acetic acid and sodium acetate) and were aged for 7 days. The resulting samples exhibited clear visual differences as shown in FIG. 37. Both the OPC specimens and the carbonate-mortar specimens (FIGS. 36, sample a and 36, sample b, respectively) exhibited significant deterioration around the edges. The OPC specimens also experienced discoloration that was clearly visible in cross sections (FIG. 37, sample a inset). In contrast, the CCSH specimens (FIG. 37, sample c) remained largely intact under identical conditions. The mass of all specimens was recorded before and after aging. The OPC and carbonate specimens lost 12.1 and 14.7% of their mass after drying. In contrast, the CCSH specimens lost only 3.1%. This difference in reactivity suggests that CCSH-based cements could be well-suited for relatively aggressive applications and/or would provide a more permanent form of $CO_2$ storage than other cement types that might dissociate even under modestly low pH conditions.

Carbonation Mechanism and Competing Effects. The aqueous carbonation of pseudowollastonite is complex but it may offer insight into underlying chemical reaction pathways that could lead to the synthesis of low carbon cements. For example, the dissolution rate of pseudowollastonite (assumed to be the rate-limiting step) will increase with temperature (and indeed, higher strength cements were synthesized at higher temperatures) but the dissolved concentration of $CO_2$ (and its diffusivity) will decrease with increasing temperature. We suggest that the conditions analyzed here may not necessarily include the optimal conditions for pseudowollastonite dissolution and subsequent carbonation but instead provide insight into the parameters of greatest importance. Clearly, buffered pH and elevated temperature play a critical role in CCSH formation and those phases are capable of yielding high strength and durability in concrete applications. Similar carbonation has been observed in wollastonite under comparable conditions but after only 30 minutes of reaction, which suggested that particle size, stirring rate of the aqueous phase (or the presence of stirring), and the diffusion of $CO_2$ were all largely impactful on the rate of carbonation. Each of these factors can likewise be investigated in the context of curing rate in this work.

Figure 38:
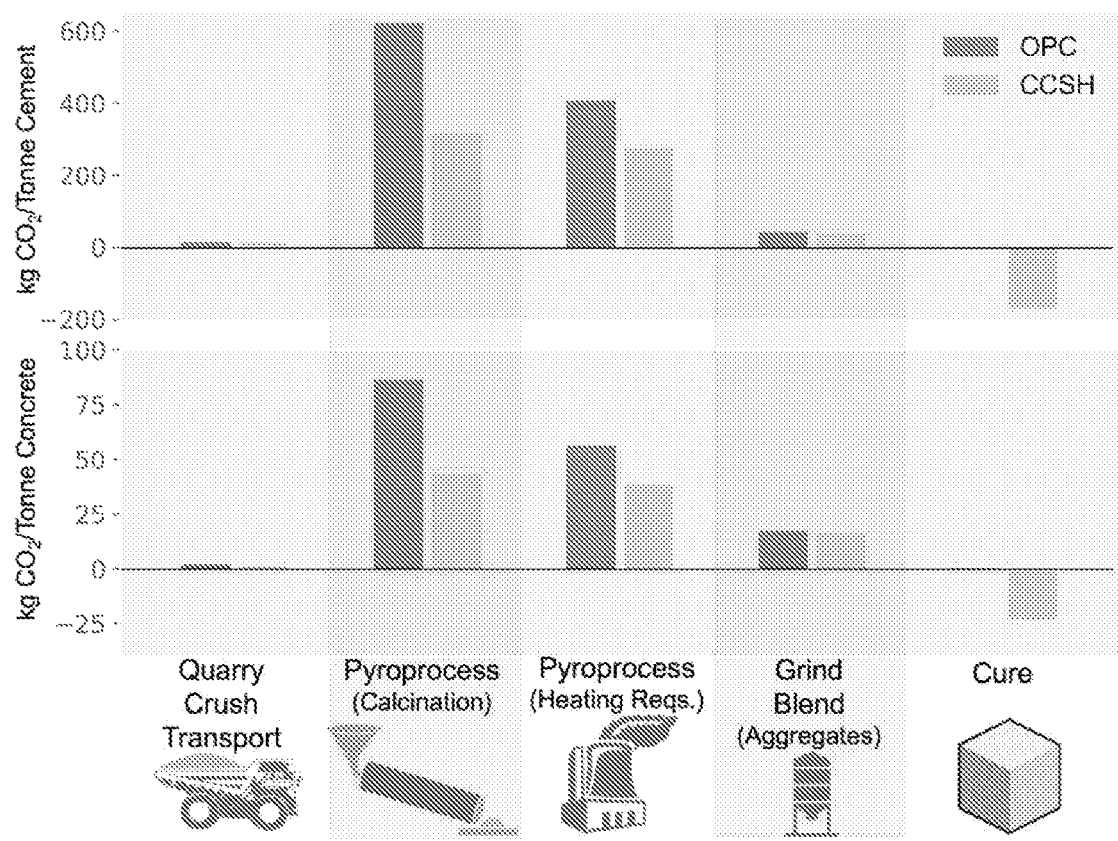
FIG. 38 illustrates lifecycle analysis results of OPC and CCSH cement. Our data suggest three major ways in which emission profiles are significantly different. First, significantly less limestone is required for CCSH cement, leading to fewer emissions from calcination. Second, during pyroprocessing, the lower temperatures required to make pseudowollastonite saves on fuel emissions, compared to compared to OPC clinker. Finally, while curing, CCSH cement uptakes a significant amount of $CO_2$ (here, shown in terms of data from 7-day curing).

Lifecycle Analysis of CCSH Cement. Lifecycle analysis was used to quantify the carbon emissions profiles of CCSH materials relative to conventional OPC. The results, presented in FIG. 38, show the $CO_2$ emissions that would result from the manufacturing of one tonne of concrete (assuming 14% cement by mass) and one tonne of cement. The results suggest that three lifecycle phases in particular—the limestone feedstock required, calcination/pyroprocessing, and $CO_2$-uptake during curing—contribute most of the emissions savings observed for CCSH cements when compared to OPC.

During the calcination process for one tonne of OPC, approximately 1.41 tonnes of limestone must be calcined to produce CaO. The dissociation process results in 620 kg of $CO_2$ emissions. In contrast, we estimate that between 0.57 and 0.72 tonnes of limestone must be calcined to manufacture one tonne of cured CCSH-cement using the general process and materials we used in this work to make pseudowollastonite. That would produce approximately 251-315 kg $CO_2$, or 40-51% of the emissions from this process in OPC manufacture.

During pyroprocessing for OPC clinker production, CaO and sources of silica and alumina must be heated to 1450° C. to produce clinker. There are numerous kiln configurations and techniques for this process but we used Huntzinger and Eatmon's estimations of coal, fuel oil, and natural gas quantities used to heat one tonne of OPC, along with U.S. Energy Information Agency emissions factors for those sources to estimate that 406 kg $CO_2$ are emitted per tonne of OPC cement. Conversely, pseudowollastonite for CCSH cement must be heated to 1175° C., which results in much lower fossil energy-related emissions for heating—approximately 218-273 kg per tonne of cured cement, assuming the same mix of heating sources.

Additionally, when CCSH cement is cured, there is uptake and utilization of approximately 169-338 kg $CO_2$ per tonne of cement (calculated from total carbon measurements of cured 7-day and 28-day specimens in this example), resulting in a pulse of negative emissions, which does not exist during OPC curing, at least for this period (see Methods). Taken collectively, we estimate that CCSH cement and concrete would have $CO_2$ emissions of 165-461 and 35-75 kg $CO_2$/tonne whereas conventional OPC has emissions of 1,077 and 160 kg $CO_2$/tonne.

Discussion

The results presented in this example provide the first connection between formulations, curing methods, mechanical properties, and environmental footprint of CCSH phases in the context of high-performance and low-environmental-impact cement. We demonstrated that the incorporation of CCSH phases similar to those that formed in ancient Roman cement may be produced in short periods by utilizing the right combination of heat, $CO_2$, pH, and feedstock. The properties of the cement formed with the CCSH phases here were shown to be of relatively high strength and low diffusivity, which could yield more resilient concrete infrastructure. CCSH-based cements outperformed OPC and carbonate-based mortars in terms of compressive strength, permeability, and chemical resistance. While this study was designed to provide a proof-of-concept of enabling chemistry, other important metrics of cement performance could be carried out and optimized moving forward. For example, besides compressive strength, cement and concrete are often evaluated in terms of their flexural strength, toughness, and ductility. For instance, a tough (or ductile) concrete is able to deflect under stress without cracking, thereby limiting freeze-thaw and solute transport effects. The ductility of ancient Roman cements has been identified as one of the reasons they performed as well as they did. In addition, we report moderate strength achieved by CCSH-mortar in only 7 days, while investigation and optimization of longer periods is ongoing. The curing process reported here is meant to demonstrate that there are feasible pathways that lead to CCSH cements and that those cements should be of interest to the scientific community because of the lifecycle analyses and performance metrics presented here, including strength, durability, chemical stability, and carbon uptake. Although our proposed curing process is most appropriate for precast and unit concrete/masonry, which is relatively limited in use compared to pour-in-place, it is the fastest growing share of the cement market and is expected to exceed 20% in the coming years.

At the systems-scale, our analysis suggests that these materials could be synthesized with a fraction of the energy demand and climate impact of conventional Portland cement. Considerable effort has focused on identifying industrial waste streams that could be used as additives to conventional cement blends. The curing approach proposed here could increase the value of some of these waste streams. This matters in the context of cement production because the scales are so large that mining minerals that are not abundant in earth's crust (such as pseudowollastonite) will be limiting from an industrial perspective. When discussing the decarbonization of the cement industry, it is important to keep the scales in mind. For example, the mass of cement production in the United States is approximately five orders of magnitude larger than the mass of the wollastonite that is mined. But an important characteristic of the chemistry reported here is that it would be enabling for a number of different pathways for making cements. For example, pseudowollastonite can be synthesized and blended with industrial waste streams, recycled Portland cement, or virgin limestone to produce the right ratio of calcium and silica needed to produce high-value feedstocks and low-impact cements. Alternatively, one may bypass the need for pseudowollastonite in our process, and instead create the critical concentrations (and dissolution timing) of Ca and Si ions in the solution via chemical treatments of low-cost industrial wastes such as fly ash, slag, incinerated ash, mining tailings, etc. that are rich in Ca and Si. This strategy could address the limited supply of pseudowollastonite, enabling viable paths for turning wastes to scalable value-added feedstocks for creating low-$CO_2$, and high-performing CCSH cement.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative components, compositions, and method steps disclosed herein are specifically described, other combinations of the components, compositions, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A method of forming a cured cementitious material, the method comprising:
   (a) contacting a cementitious material comprising a calcium silicate precursor with water and carbon dioxide under conditions effective to form crystalline calcium silicate hydrates within the cementitious material, wherein the calcium silicate precursor comprises a molar ratio of elemental Ca to elemental Si of from about 0.90 to about 1.10; and
   (b) allowing the cementitious material to harden to form the cured cementitious material.

2. The method of claim 1, wherein step (a) comprises:
   (i) mixing the cementitious material with water;
   (ii) introducing the cementitious material into a mold, and
   (iii) incubating the cementitious material at a temperature of at least about 50° C. and at an elevated pressure of $CO_2$ gas for a period of time effective to solidify the cementitious material.

3. The method of claim 1, wherein the water further comprises an alkali agent.

4. The method of claim 2, wherein step (iii) comprises incubating the cementitious material at a temperature of from about 50° C. to about 250° C.

5. The method of claim 2, wherein step (iii) comprises incubating the cementitious material at a partial pressure of $CO_2$ of from greater than 0 psi to 200 psi.

6. The method of claim 2, wherein step (iii) comprises incubating the cementitious material at a pressure of from 15 psi to 500 psi.

7. The method of claim 2, wherein step (a) further comprises (iv) demolding the cementitious material following incubating step (iii).

8. The method of claim 1, wherein step (b) comprises a wet-curing phase, a dry-curing phase, or any combination thereof.

9. The method of claim 8, wherein the wet-curing phase comprises aqueous carbonation of the cementitious material.

10. The method of claim 8, wherein the wet-curing phase comprises immersing the cementitious material in an aqueous solution of carbon dioxide at a temperature of at least about 50° C.

11. The method of claim 8, wherein the dry-curing phase comprises incubating the cementitious material at a temperature of at least about 50° C., at an elevated pressure of $CO_2$ gas, or a combination thereof.

12. The method of claim 1, wherein the calcium silicate precursor comprises a discrete calcium silicate phase that exhibits congruent dissolution in water.

13. The method of claim 12, wherein the discrete calcium silicate phase comprises pseudowollastonite.

14. The method of claim 13, wherein the method further comprises:

mixing limestone and fumed silica and calcining the mixture to form the pseudowollastonite;
reacting a calcia-rich calcium silicate to form the pseudowollastonite;
reacting an industrial waste material to form the pseudowollastonite;
or any combination thereof.

15. The method of claim 1, wherein the calcium silicate precursor comprises an industrial waste material.

16. The method of claim 1, wherein the cementitious material further comprises $Al_2O_3$, and wherein step (a) comprises contacting the cementitious material with water and carbon dioxide under conditions effective to form crystalline calcium silicate hydrates and calcium alumino silicate hydrates within the cementitious material.

17. The method of claim 1, wherein the crystalline calcium silicate hydrates comprise plate-like crystals.

18. The method of claim 1, wherein the crystalline calcium silicate hydrates comprise k-phase, nekoite, truscottite, gyrolite, tobermorite, xonotlite, afwillite, jaffeite, scawtite, spurrite, magadiite, or any combination thereof.

19. The method of claim 1, wherein the cured cementitious material exhibits one or more of the following:
   a compressive strength of at least 1450 psi, as measured using the standard method described in ASTM C109/C109M-16a entitled "Standard Test Method for Compressive Strength of Hydraulic Cement Mortars Using 2-in. or [50-mm] Cube Specimens" (2016);
   a compressive strength of at least 1450 psi, as measured using the standard method described in ASTM C39/C39M-18 entitled "Standard Test Method for Compressive Strength of Cylindrical Concrete Specimens" (2018);
   at least 20% less permeability to chloride ion penetration than ordinary Portland cement, as measured using the standard method described in ASTM C1202-19 entitled "Standard Test Method for Electrical Indication of Concrete's Ability to Resist Chloride Ion Penetration" (2019);
   at least 1% by weight carbon, based on the total weight of the cured cementitious material
   less than a 5% reduction in compressive strength following immersion in an aqueous solution having a pH of 5 for 90 days
   less than a 10% reduction in mass following immersion in an aqueous solution having a pH of 5 for 7 days;
   or any combination thereof.

20. A method of forming a cured cementitious material, the method comprising:
   (a) contacting a cementitious material comprising a calcium silicate precursor with water and carbon dioxide under conditions effective to form crystalline calcium silicate hydrates within the cementitious material; and
   (b) allowing the cementitious material to harden to form the cured cementitious material wherein the cured cementitious material exhibits one or more of the following:
   a compressive strength of at least 1450 psi, as measured using the standard method described in ASTM C109/C109M-16a entitled "Standard Test Method for Compressive Strength of Hydraulic Cement Mortars Using 2-in. or [50-mm] Cube Specimens" (2016);
   a compressive strength of at least 1450 psi, as measured using the standard method described in ASTM C39/C39M-18 entitled "Standard Test Method for Compressive Strength of Cylindrical Concrete Specimens" (2018);

at least 20% less permeability to chloride ion penetration than ordinary Portland cement, as measured using the standard method described in ASTM C1202-19 entitled "Standard Test Method for Electrical Indication of Concrete's Ability to Resist Chloride Ion Penetration" (2019);

at least 1% by weight carbon, based on the total weight of the cured cementitious material less than a 5% reduction in compressive strength following immersion in an aqueous solution having a pH of 5 for 90 days less than a 10% reduction in mass following immersion in an aqueous solution having a pH of 5 for 7 days;

or any combination thereof.

21. A method of forming a cured cementitious material, the method comprising:
  (a) contacting a cementitious material comprising a calcium silicate precursor with water and carbon dioxide under conditions effective to form crystalline calcium silicate hydrates within the cementitious material; and
  (b) allowing the cementitious material to harden to form the cured cementitious material;
  wherein step (a) comprises:
    (i) mixing the cementitious material with water;
    (ii) introducing the cementitious material into a mold, and
    (iii) incubating the cementitious material at a temperature of at least about 50° C. and at an elevated pressure of $CO_2$ gas for a period of time effective to solidify the cementitious material.

* * * * *